(12) United States Patent
Fan et al.

(10) Patent No.: US 7,463,573 B2
(45) Date of Patent: Dec. 9, 2008

(54) PATTERNED MEDIA FOR A HIGH DENSITY DATA STORAGE DEVICE

(75) Inventors: Zhaohui Fan, Fremont, CA (US); Nickolai Belov, Los Gatos, CA (US)

(73) Assignee: Nanochip, Inc., Fremont, CA (US)

( * ) Notice: Subject to any disclaimer, the term of this patent is extended or adjusted under 35 U.S.C. 154(b) by 633 days.

(21) Appl. No.: 11/177,639

(22) Filed: Jul. 8, 2005

(65) Prior Publication Data
US 2007/0008864 A1 Jan. 11, 2007

Related U.S. Application Data

(60) Provisional application No. 60/693,950, filed on Jun. 24, 2005.

(51) Int. Cl.
*G11B 9/00* (2006.01)
(52) U.S. Cl. ..................................... 369/126
(58) Field of Classification Search ............... 369/126
See application file for complete search history.

(56) References Cited

U.S. PATENT DOCUMENTS

| 4,300,350 A | 11/1981 | Becker ............... 60/528 |
| 4,340,953 A | 7/1982 | Iwamura et al. ......... 369/126 |

(Continued)

FOREIGN PATENT DOCUMENTS

| EP | 0 438 256 B1 | 7/1991 |
| EP | 0 734 017 B1 | 9/1996 |
| EP | 0 788 149 A1 | 6/1997 |

(Continued)

OTHER PUBLICATIONS

International Search Report for PCT/US05/12788 dated Oct. 20, 2006, 10 pages.

(Continued)

*Primary Examiner*—Aristotelis M Psitos
(74) *Attorney, Agent, or Firm*—Fliesler Meyer LLP

(57) ABSTRACT

Systems in accordance with the present invention can include a tip contactable with a media, the media including a substrate and a plurality of cells disposed over the substrate, one or more of the cells being electrically isolated from the other of the cells by a material having insulating properties. One or more of the plurality of cells can include a phase change material. The media is either grounded or electrically connected with a voltage source such that when the tip is placed in contact with the media and a voltage is applied to the tip, a current is drawn through the cell over which the tip is arranged. The current is drawn through the isolated cell at least a portion of the phase change material within the cell beneath the tip is heated to a sufficient temperature such that the material become amorphous in structure. The current is then removed from the phase change material, which is quickly cooled to form an amorphous domain having a resistance representing a "1" (or a "0"). In another embodiment the one or more of the plurality of cells can include a polarity dependent material. In an embodiment, the one or more cells can have a sidewall structure that tapers along the depth of the cell so that the cell has a wider cross-section near where a tip contacts the media and a narrower cross-section near where the cell contacts one of the substrate and an underlayer.

9 Claims, 30 Drawing Sheets

U.S. PATENT DOCUMENTS

| | | | |
|---|---|---|---|
| 4,575,822 A | 3/1986 | Quate | 365/174 |
| 4,710,899 A | 12/1987 | Young et al. | 365/113 |
| 4,719,594 A | 1/1988 | Young et al. | 365/113 |
| 4,737,934 A | 4/1988 | Ross et al. | 365/106 |
| 4,744,055 A | 5/1988 | Hennessey | 365/113 |
| 4,769,338 A | 9/1988 | Ovshinsky | 437/39 |
| 4,769,682 A | 9/1988 | Yang et al. | 357/2 |
| 4,775,425 A | 10/1988 | Guha et al. | 136/249 |
| 4,792,501 A | 12/1988 | Allred et al. | 428/699 |
| 4,820,394 A | 4/1989 | Young et al. | 204/192.21 |
| 4,829,507 A | 5/1989 | Kazan et al. | 369/126 |
| 4,831,614 A | 5/1989 | Duerig et al. | 369/101 |
| 4,843,443 A | 6/1989 | Ovshinsky et al. | 357/23.7 |
| 4,845,533 A | 7/1989 | Pryor et al. | 357/2 |
| 4,868,616 A | 9/1989 | Johnson et al. | 357/17 |
| 4,876,667 A | 10/1989 | Ross et al. | 365/113 |
| 4,882,295 A | 11/1989 | Czubatyj et al. | 437/101 |
| 4,883,686 A | 11/1989 | Doehler et al. | 427/38 |
| 4,891,330 A | 1/1990 | Guha et al. | 437/81 |
| 4,916,002 A | 4/1990 | Carver | 428/139 |
| 4,916,688 A | 4/1990 | Foster et al. | 369/126 |
| 4,924,436 A | 5/1990 | Strand | 365/113 |
| 4,943,719 A | 7/1990 | Akamine et al. | 250/306 |
| 4,945,515 A | 7/1990 | Ooumi et al. | 365/174 |
| 4,962,480 A | 10/1990 | Ooumi et al. | 365/151 |
| 4,968,585 A | 11/1990 | Albrecht et al. | 430/320 |
| 4,987,312 A | 1/1991 | Eigler | 250/492.3 |
| 5,008,617 A | 4/1991 | Czubatyj et al. | 324/158 |
| 5,038,322 A | 8/1991 | Van Loenen | 365/114 |
| 5,043,577 A | 8/1991 | Pohl et al. | 250/306 |
| 5,043,578 A | 8/1991 | Guethner et al. | 250/307 |
| 5,051,977 A | 9/1991 | Goldberg | 369/126 |
| 5,091,880 A | 2/1992 | Isono et al. | 365/151 |
| 5,095,479 A | 3/1992 | Harigaya et al. | 369/288 |
| 5,097,443 A | 3/1992 | Kaneko et al. | 365/153 |
| 5,103,284 A | 4/1992 | Ovshinsky et al. | 357/60 |
| 5,126,635 A | 6/1992 | Doehler et al. | 315/111.21 |
| 5,128,099 A | 7/1992 | Strand et al. | 420/579 |
| 5,132,934 A | 7/1992 | Quate et al. | 369/126 |
| 5,144,148 A | 9/1992 | Eigler | 250/492.3 |
| 5,144,581 A | 9/1992 | Toda et al. | 369/126 |
| 5,159,661 A | 10/1992 | Ovshinsky et al. | 395/24 |
| 5,166,758 A | 11/1992 | Ovshinsky et al. | 257/3 |
| 5,166,919 A | 11/1992 | Eigler et al. | 369/126 |
| 5,177,567 A | 1/1993 | Klersy et al. | 257/4 |
| 5,180,686 A | 1/1993 | Barnerjee et al. | 437/181 |
| 5,180,690 A | 1/1993 | Czubatyj et al. | 437/233 |
| 5,182,724 A | 1/1993 | Yanagisawa et al. | 365/151 |
| 5,187,367 A | 2/1993 | Miyazaki et al. | 250/306 |
| 5,196,701 A | 3/1993 | Foster et al. | 250/306 |
| 5,210,714 A | 5/1993 | Pohl et al. | 365/157 |
| 5,216,631 A | 6/1993 | Sliwa, Jr. | 365/174 |
| 5,222,060 A | 6/1993 | Kuroda et al. | 369/126 |
| 5,223,308 A | 6/1993 | Doehler | 427/575 |
| 5,231,047 A | 7/1993 | Ovshinsky et al. | 437/101 |
| 5,251,200 A | 10/1993 | Hatanaka et al. | 369/126 |
| 5,260,567 A | 11/1993 | Kuroda et al. | 250/227.19 |
| 5,262,981 A | 11/1993 | Rabe et al. | 365/120 |
| 5,264,876 A | 11/1993 | Kawade et al. | 346/153.1 |
| 5,265,046 A | 11/1993 | Fuchs et al. | 365/151 |
| 5,268,571 A | 12/1993 | Yamamoto et al. | 250/306 |
| 5,283,442 A | 2/1994 | Martin et al. | 250/307 |
| 5,289,455 A | 2/1994 | Kuroda et al. | 369/126 |
| 5,296,716 A | 3/1994 | Ovshinsky et al. | 257/3 |
| 5,307,311 A | 4/1994 | Sliwa, Jr. | 365/174 |
| 5,323,375 A | 6/1994 | Ihara et al. | 369/126 |
| 5,324,553 A | 6/1994 | Ovshinsky et al. | 427/571 |
| 5,329,122 A | 7/1994 | Sakai et al. | 250/306 |
| 5,329,514 A | 7/1994 | Eguchi et al. | 369/126 |
| 5,330,630 A | 7/1994 | Klersy et al. | 204/192.05 |
| 5,331,589 A | 7/1994 | Gambino et al. | 365/151 |
| 5,335,197 A | 8/1994 | Kaneko et al. | 365/153 |
| 5,341,328 A | 8/1994 | Ovshinsky et al. | 365/163 |
| 5,343,042 A | 8/1994 | Fuchs et al. | 250/307 |
| 5,359,205 A | 10/1994 | Ovshinsky et al. | 257/3 |
| 5,373,494 A | 12/1994 | Kawagishi et al. | 369/126 |
| 5,389,475 A | 2/1995 | Yanagisawa et al. | 430/19 |
| 5,390,161 A | 2/1995 | Kurihara et al. | 369/126 |
| 5,396,453 A | 3/1995 | Kawada et al. | 365/151 |
| 5,396,483 A | 3/1995 | Matsuda et al. | 369/283 |
| 5,398,229 A | 3/1995 | Nakayama et al. | 369/126 |
| 5,406,509 A | 4/1995 | Ovshinsky et al. | 365/113 |
| 5,411,591 A | 5/1995 | Izu et al. | 118/718 |
| 5,412,597 A | 5/1995 | Miyazaki et al. | 365/174 |
| 5,414,271 A | 5/1995 | Ovshinsky et al. | 257/3 |
| 5,416,331 A | 5/1995 | Ichikawa et al. | 250/492.2 |
| 5,426,092 A | 6/1995 | Ovshinsky et al. | 505/461 |
| 5,432,771 A | 7/1995 | Shido et al. | 369/126 |
| 5,439,777 A | 8/1995 | Kawada et al. | 430/270 |
| 5,444,191 A | 8/1995 | Yamamoto et al. | 178/18.01 |
| 5,446,684 A | 8/1995 | Kaneko et al. | 365/46 |
| 5,453,970 A | 9/1995 | Rust et al. | 369/176 |
| 5,471,064 A | 11/1995 | Koyanagi et al. | 250/452.2 |
| 5,471,458 A | 11/1995 | Oguchi et al. | 369/126 |
| 5,475,318 A | 12/1995 | Marcus et al. | 324/762 |
| 5,481,528 A | 1/1996 | Eguchi et al. | 369/126 |
| 5,526,334 A | 6/1996 | Yamano et al. | 369/53 |
| 5,534,711 A | 7/1996 | Ovshinsky et al. | 257/3 |
| 5,534,712 A | 7/1996 | Ovshinsky et al. | 217/3 |
| 5,536,947 A | 7/1996 | Klersy et al. | 257/3 |
| 5,537,372 A | 7/1996 | Albrecht et al. | 369/43 |
| 5,543,737 A | 8/1996 | Ovshinsky et al. | 326/104 |
| 5,547,774 A | 8/1996 | Gimzewski et al. | 428/694 |
| 5,557,596 A | 9/1996 | Gibson et al. | 369/101 |
| 5,561,300 A | 10/1996 | Wada et al. | 250/492.2 |
| 5,562,776 A | 10/1996 | Sapru et al. | 118/723 |
| 5,567,241 A | 10/1996 | Tsu et al. | 118/723 |
| 5,591,501 A | 1/1997 | Ovshinsky et al. | 428/64.1 |
| 5,596,522 A | 1/1997 | Ovshinsky et al. | 365/113 |
| 5,597,411 A | 1/1997 | Fritzsche et al. | 117/104 |
| 5,606,162 A | 2/1997 | Buser et al. | 250/306 |
| 5,615,143 A | 3/1997 | MacDonald et al. | 365/112 |
| 5,623,295 A | 4/1997 | Kishi | 347/111 |
| 5,623,476 A | 4/1997 | Eguchi et al. | 369/126 |
| 5,670,224 A | 9/1997 | Izu et al. | 428/35.8 |
| 5,679,952 A | 10/1997 | Lutwyche et al. | 250/306 |
| 5,687,112 A | 11/1997 | Ovshinsky | 365/163 |
| 5,689,494 A | 11/1997 | Ichikawa et al. | 369/126 |
| 5,694,054 A | 12/1997 | Ovshinsky et al. | 326/35 |
| 5,694,146 A | 12/1997 | Ovshinsky et al. | 345/91 |
| 5,714,768 A | 2/1998 | Ovshinsky et al. | 257/40 |
| 5,721,721 A | 2/1998 | Yanagisawa et al. | 369/126 |
| 5,751,683 A | 5/1998 | Kley | 369/126 |
| 5,751,685 A | 5/1998 | Yi | 369/126 |
| 5,757,446 A | 5/1998 | Ovshinsky et al. | 349/49 |
| 5,777,977 A | 7/1998 | Fujiwara et al. | 369/126 |
| 5,778,134 A | 7/1998 | Sakai et al. | 386/46 |
| 5,793,743 A | 8/1998 | Duerig et al. | 369/126 |
| 5,801,472 A | 9/1998 | Wada et al. | 310/309 |
| 5,804,710 A | 9/1998 | Mamin et al. | 73/105 |
| 5,808,973 A | 9/1998 | Tanaka | 369/14 |
| 5,812,516 A | 9/1998 | Nose et al. | 369/126 |
| 5,822,285 A | 10/1998 | Rugar et al. | 369/44.26 |
| 5,825,046 A | 10/1998 | Czubatyj | 257/2 |
| 5,835,477 A | 11/1998 | Binnig et al. | 369/126 |
| 5,848,077 A | 12/1998 | Kamae et al. | 371/53 |
| 5,851,902 A | 12/1998 | Sakai et al. | 438/459 |
| 5,856,672 A | 1/1999 | Ried | 250/306 |
| 5,856,967 A | 1/1999 | Mamin et al. | 369/126 |
| 5,861,754 A | 1/1999 | Ueno et al. | 324/660 |
| 5,877,497 A | 3/1999 | Binnig et al. | 250/306 |
| 5,886,922 A | 3/1999 | Saito et al. | 365/164 |
| 5,912,839 A | 6/1999 | Ovshinsky et al. | 365/185.03 |
| 5,929,438 A | 7/1999 | Suzuki et al. | 250/306 |

| Patent No. | Kind | Date | Inventor | Class |
|---|---|---|---|---|
| 5,933,365 | A | 8/1999 | Klersy et al. | 365/148 |
| 5,935,339 | A | 8/1999 | Henderson et al. | 134/1 |
| 5,953,306 | A | 9/1999 | Yi | 369/126 |
| 5,962,949 | A | 10/1999 | Dhuler et al. | 310/307 |
| 6,000,021 | A | 12/1999 | Saito et al. | 711/163 |
| 6,000,047 | A | 12/1999 | Kamae et al. | 714/710 |
| 6,001,519 | A | 12/1999 | Yang et al. | 430/20 |
| 6,017,618 | A | 1/2000 | Gupta et al. | 428/321.1 |
| 6,027,951 | A | 2/2000 | MacDonald et al. | 438/20 |
| 6,028,393 | A | 2/2000 | Izu | 315/111.01 |
| RE36,603 | E | 3/2000 | Pohl et al. | 365/151 |
| 6,038,916 | A | 3/2000 | Cleveland et al. | 73/105 |
| 6,054,745 | A | 4/2000 | Nakos et al. | 257/415 |
| 6,075,719 | A | 6/2000 | Lowrey | 365/148 |
| 6,084,849 | A | 7/2000 | Durig et al. | 369/126 |
| 6,087,580 | A | 7/2000 | Ovshinsky | 136/261 |
| 6,087,674 | A | 7/2000 | Ovshinsky | 257/2 |
| 6,088,320 | A | 7/2000 | Bayer et al. | 369/101 |
| 6,101,164 | A | 8/2000 | Kado et al. | |
| 6,124,663 | A | 9/2000 | Haake et al. | 310/307 |
| 6,141,241 | A | 10/2000 | Ovshinsky | 365/163 |
| 6,186,090 | B1 | 2/2001 | Dotter, II | 118/718 |
| 6,196,061 | B1 | 3/2001 | Adderton et al. | 73/105 |
| 6,236,589 | B1 | 5/2001 | Gupta et al. | 365/151 |
| 6,245,280 | B1 | 6/2001 | Tan et al. | 264/430 |
| 6,249,747 | B1 | 6/2001 | Binnig et al. | 369/126 |
| 6,252,226 | B1 | 6/2001 | Kley | 250/306 |
| RE37,259 | E | 7/2001 | Ovshinsky | |
| 6,275,410 | B1 | 8/2001 | Morford | 365/151 |
| 6,305,788 | B1 | 10/2001 | Silverbrook | 347/54 |
| 6,314,014 | B1 | 11/2001 | Lowrey | 365/100 |
| 6,337,479 | B1 | 1/2002 | Kley | 250/234 |
| 6,339,217 | B1 | 1/2002 | Kley | 250/216 |
| 6,359,755 | B1 | 3/2002 | Dietzel et al. | 360/244.3 |
| 6,366,340 | B1 | 4/2002 | Ishibashi et al. | 355/69 |
| 6,369,400 | B1 | 4/2002 | Haeberle et al. | 250/548 |
| 6,370,306 | B1 | 4/2002 | Sato | 385/129 |
| 6,411,589 | B1 | 6/2002 | Hoen et al. | 369/126 |
| 6,452,891 | B1 | 9/2002 | Hennessey | 369/116 |
| 6,463,874 | B1 | 10/2002 | Dotter, II et al. | 118/723 |
| 6,480,438 | B1 | 11/2002 | Park | 365/260.06 |
| 6,487,113 | B1 | 11/2002 | Park | 365/163 |
| 6,501,210 | B1 | 12/2002 | Ueno et al. | 310/331 |
| 6,507,552 | B2 | 1/2003 | Gibson | 369/126 |
| 6,507,553 | B2 | 1/2003 | Kley | 369/126 |
| 6,511,862 | B2 | 1/2003 | Hudgens | 438/95 |
| 6,511,867 | B2 | 1/2003 | Lowrey | 438/128 |
| 6,515,898 | B2 | 2/2003 | Baumeister et al. | 365/174 |
| 6,515,957 | B1 | 2/2003 | Newns | 360/55 |
| 6,521,921 | B2 | 2/2003 | Lim et al. | 257/255 |
| 6,522,566 | B2 | 2/2003 | Carter | 365/118 |
| 6,531,373 | B2 | 3/2003 | Gill | 438/400 |
| 6,534,781 | B2 | 3/2003 | Dennison | 257/5 |
| 6,542,400 | B2 | 4/2003 | Chen et al. | 365/151 |
| 6,545,907 | B1 | 4/2003 | Lowrey et al. | 365/163 |
| 6,563,164 | B2 | 5/2003 | Lowrey et al. | 257/314 |
| 6,566,700 | B2 | 5/2003 | Xu | 257/296 |
| 6,567,293 | B1 | 5/2003 | Lowrey et al. | 365/100 |
| 6,567,296 | B1 | 5/2003 | Casagrande et al. | 265/105 |
| 6,570,784 | B2 | 5/2003 | Lowrey | 365/163 |
| 6,589,714 | B2 | 7/2003 | Maimon | 430/313 |
| 6,593,176 | B2 | 7/2003 | Dennison | 438/200 |
| 6,597,639 | B1 | 7/2003 | Hamann | 369/14 |
| 6,608,773 | B2 | 8/2003 | Lowrey | 365/100 |
| 6,611,033 | B2 | 8/2003 | Hsu et al. | 257/414 |
| 6,611,140 | B1 | 8/2003 | Bloechl et al. | 324/207 |
| 6,613,604 | B2 | 9/2003 | Maimon | 438/95 |
| 6,617,192 | B1 | 9/2003 | Lowrey | 438/95 |
| 6,617,569 | B2 | 9/2003 | Narita et al. | 250/216 |
| 6,621,095 | B2 | 9/2003 | Chiang | 257/5 |
| 6,628,452 | B2 | 9/2003 | Haeberle | 359/298 |
| 6,646,297 | B2 | 11/2003 | Dennison | 257/296 |
| 6,647,766 | B2 | 11/2003 | Despont et al. | 73/105 |
| 6,665,258 | B1 | 12/2003 | Dietzel et al. | 369/126 |
| 6,667,900 | B2 | 12/2003 | Lowrey | 365/171 |
| 6,671,710 | B2 | 12/2003 | Ovshinsky | 708/493 |
| 6,673,700 | B2 | 1/2004 | Dennison | 438/466 |
| 6,680,808 | B2 | 1/2004 | Allenspach et al. | 360/59 |
| 6,692,145 | B2 | 2/2004 | Gianchandani et al. | 374/185 |
| 6,696,355 | B2 | 2/2004 | Dennison | 438/597 |
| 6,723,421 | B2 | 4/2004 | Ovshinsky | 428/315.7 |
| 6,724,712 | B2 | 4/2004 | Kley | 369/126 |
| 6,733,956 | B2 | 5/2004 | Maimon | 430/314 |
| 6,762,402 | B2 | 7/2004 | Choi et al. | 250/234 |
| 6,784,475 | B2 | 8/2004 | Hong et al. | 257/295 |
| 6,800,865 | B2 | 10/2004 | Nakayama et al. | 250/492.3 |
| 6,819,587 | B1 | 11/2004 | Sharma et al. | 365/173 |
| 6,819,588 | B2 | 11/2004 | Baumeister et al. | 365/174 |
| 6,841,220 | B2 | 1/2005 | Onoe | 428/66.7 |
| 6,854,648 | B2 | 2/2005 | Hong et al. | 235/451 |
| 6,862,206 | B1 | 3/2005 | Carter et al. | 365/151 |
| 6,912,193 | B2 | 6/2005 | Cho | 369/126 |
| 6,930,368 | B2 | 8/2005 | Hartwell et al. | 257/418 |
| 6,942,914 | B2 | 9/2005 | Onoe | 428/701 |
| 6,982,898 | B2 | 1/2006 | Rust | |
| 6,985,377 | B2 | 1/2006 | Rust | |
| 7,002,226 | B2 | 2/2006 | Hsu et al. | 257/414 |
| 7,020,064 | B2 | 3/2006 | Kim et al. | 369/126 |
| 7,026,676 | B2 | 4/2006 | Ahner et al. | 257/295 |
| 7,027,364 | B2 | 4/2006 | Hong et al. | 369/13.01 |
| 7,041,394 | B2 | 5/2006 | Weller et al. | 428/836 |
| 7,042,828 | B2 | 5/2006 | Kley | 369/126 |
| 7,065,033 | B2 | 6/2006 | Onoe | 369/125 |
| 7,071,031 | B2 | 7/2006 | Pogge et al. | 216/2 |
| 7,149,180 | B2 | 12/2006 | Onoe | 369/276 |
| 7,151,739 | B2 | 12/2006 | Cho | 369/126 |
| 7,212,484 | B2 | 5/2007 | Maeda | 369/101 |
| 7,218,600 | B2 | 5/2007 | Cho | 369/126 |
| 7,221,639 | B2 | 5/2007 | Onoe | 369/126 |
| 7,233,517 | B2 | 6/2007 | Rust | 365/151 |
| 7,227,830 | B2 | 7/2007 | Cho | 369/126 |
| 7,242,661 | B2 | 7/2007 | Cho | 369/126 |
| 7,260,051 | B1 | 8/2007 | Culver | 369/246 |
| 7,265,937 | B1 | 9/2007 | Erden | 360/55 |
| 7,276,173 | B2 | 10/2007 | Onoe | 523/466 |
| 7,277,314 | B2 * | 10/2007 | Busta | 365/118 |
| 7,283,453 | B2 | 10/2007 | Onoe | 369/126 |
| 2001/0045530 | A1 | 11/2001 | Haeberle et al. | |
| 2002/0021139 | A1 | 2/2002 | Jackson | |
| 2002/0037438 | A1 | 3/2002 | Takami | |
| 2002/0101573 | A1 | 8/2002 | Ishibashi et al. | |
| 2002/0110074 | A1 | 8/2002 | Gibson | |
| 2002/0135917 | A1 | 9/2002 | Davidson | |
| 2002/0173153 | A1 | 11/2002 | Lee et al. | |
| 2003/0007443 | A1 | 1/2003 | Nickel | |
| 2003/0032290 | A1 | 2/2003 | Lee et al. | |
| 2003/0081527 | A1 | 5/2003 | Gibson et al. | |
| 2003/0081532 | A1 | 5/2003 | Gibson | |
| 2003/0108777 | A1 | 6/2003 | Gunsel et al. | |
| 2003/0128494 | A1 | 7/2003 | Birecki et al. | |
| 2003/0133324 | A1 | 7/2003 | Baumeister et al. | |
| 2003/0185139 | A1 | 10/2003 | Ives | |
| 2003/0189200 | A1 | 10/2003 | Lee et al. | |
| 2003/0207525 | A1 | 11/2003 | Trivedi | |
| 2003/0218960 | A1 | 11/2003 | Albrecht et al. | |
| 2004/0027935 | A1 | 2/2004 | Cho | |
| 2004/0042351 | A1 | 3/2004 | Onoe | |
| 2004/0047275 | A1 | 3/2004 | Cherubini et al. | |
| 2004/0071021 | A1 | 4/2004 | Binnig et al. | |
| 2004/0076047 | A1 | 4/2004 | Cho | |
| 2004/0077123 | A1 | 4/2004 | Lee et al. | |
| 2004/0090823 | A1 | 5/2004 | Brocklin et al. | |
| 2004/0095868 | A1 | 5/2004 | Birecki et al. | |
| 2004/0097002 | A1 | 5/2004 | Pogge et al. | |
| 2004/0105323 | A1 | 6/2004 | Giovanni et al. | |
| 2004/0107770 | A1 | 6/2004 | Despont et al. | |

| 2004/0113641 A1 | 6/2004 | Birecki et al. |
|---|---|---|
| 2004/0114490 A1 | 6/2004 | Antonakopolous et al. |
| 2004/0136277 A1 | 7/2004 | Binnig et al. |
| 2004/0145941 A1 | 7/2004 | Rust |
| 2004/0150472 A1 | 8/2004 | Rust et al. |
| 2004/0168527 A1 | 9/2004 | Nakayama et al. |
| 2004/0218507 A1 | 11/2004 | Binnig et al. |
| 2004/0233817 A1 | 11/2004 | Antonakopoulos et al. |
| 2004/0245462 A1 | 12/2004 | Binning |
| 2004/0245547 A1 | 12/2004 | Stipe |
| 2004/0252553 A1 | 12/2004 | Sharma |
| 2004/0252590 A1 | 12/2004 | Sharma |
| 2004/0252621 A1 | 12/2004 | Cho |
| 2004/0257887 A1 | 12/2004 | Binnig et al. |
| 2005/0013230 A1 | 1/2005 | Adelmann |
| 2005/0018588 A1 | 1/2005 | Duerig et al. |
| 2005/0025034 A1 | 2/2005 | Gibson |
| 2005/0029920 A1 | 2/2005 | Birecki et al. |
| 2005/0036428 A1 | 2/2005 | Adelmann |
| 2005/0037560 A1 | 2/2005 | Duerig et al. |
| 2005/0038950 A1 | 2/2005 | Adelmann |
| 2005/0047288 A1 | 3/2005 | Maeda |
| 2005/0047307 A1 | 3/2005 | Frommer et al. |
| 2005/0050258 A1 | 3/2005 | Frommer et al. |
| 2005/0055170 A1 | 3/2005 | Gibson et al. |
| 2005/0066107 A1 | 3/2005 | Bachtold et al. |
| 2005/0082598 A1 | 4/2005 | Liao et al. |
| 2005/0088873 A1 | 4/2005 | Tran et al. |
| 2005/0095389 A1 | 5/2005 | Newns |
| 2005/0099430 A1 | 5/2005 | Nauka |
| 2005/0099895 A1 | 5/2005 | Maeda |
| 2005/0122786 A1 | 6/2005 | Antonakopoulos et al. |
| 2005/0122886 A1 | 6/2005 | Takahashi |
| 2005/0128616 A1 | 6/2005 | Johns et al. |
| 2005/0128927 A1 | 6/2005 | Milligan et al. |
| 2005/0128928 A1 | 6/2005 | Takahashi |
| 2005/0135199 A1 | 6/2005 | Mejia et al. |
| 2005/0135200 A1 | 6/2005 | Mejia et al. |
| 2005/0135203 A1 | 6/2005 | Mejia et al. |
| 2005/0135224 A1 | 6/2005 | Mejia et al. |
| 2005/0139883 A1 | 6/2005 | Sharma |
| 2005/0147017 A1 | 7/2005 | Gibson |
| 2005/0152175 A1 | 7/2005 | Ashton |
| 2005/0156271 A1 | 7/2005 | Lam et al. |
| 2005/0157562 A1 | 7/2005 | Smith et al. |
| 2005/0157575 A1 | 7/2005 | Binnig et al. |
| 2005/0169063 A1 | 8/2005 | Cherubini et al. |
| 2005/0185567 A1 | 8/2005 | Adelmann |
| 2005/0190684 A1 | 9/2005 | Kley |
| 2005/0201255 A1 | 9/2005 | Champion et al. |
| 2005/0201256 A1 | 9/2005 | Champion et al. |
| 2005/0201257 A1 | 9/2005 | Champion et al. |
| 2005/0201528 A1 | 9/2005 | Champion et al. |
| 2005/0207234 A1 | 9/2005 | Baechtold et al. |
| 2005/0226117 A1 | 10/2005 | Champion et al. |
| 2005/0232004 A1 | 10/2005 | Rust et al. |
| 2005/0232061 A1 | 10/2005 | Rust et al. |
| 2005/0233596 A1 | 10/2005 | Chen et al. |
| 2005/0237906 A1 | 10/2005 | Gibson |
| 2005/0243592 A1 | 11/2005 | Rust et al. |
| 2005/0243659 A1 | 11/2005 | Rust et al. |
| 2005/0243660 A1 | 11/2005 | Rust et al. |
| 2005/0247873 A1 | 11/2005 | Hilton |
| 2005/0259366 A1 | 11/2005 | Champion et al. |
| 2005/0259503 A1 | 11/2005 | Hilton |
| 2005/0281075 A1 | 12/2005 | Chen et al. |
| 2005/0281174 A1 | 12/2005 | Gotsmann et al |
| 2005/0286321 A1 | 12/2005 | Adelmann |
| 2006/0003493 A1 | 1/2006 | Milligan et al. |
| 2006/0006471 A1 | 1/2006 | Rossel et al. |
| 2006/0023606 A1 | 2/2006 | Lutwyche |
| 2006/0023612 A1 | 2/2006 | Hilton et al. |
| 2006/0023613 A1 | 2/2006 | Mejia et al. |
| 2006/0028964 A1 | 2/2006 | Mejia et al. |
| 2006/0028965 A1 | 2/2006 | Fasen et al. |
| 2006/0039250 A1 | 2/2006 | Cherubini et al. |
| 2006/0043288 A1 | 3/2006 | Binnig et al. |
| 2006/0064624 A1 | 3/2006 | Albrecht |
| 2006/0072420 A1 | 4/2006 | Albrecht |
| 2006/0083152 A1 | 4/2006 | Albrecht |
| 2006/0182004 A1 | 8/2006 | Maeda |
| 2006/0187803 A1 | 8/2006 | Baechtold |
| 2006/0211154 A1 | 9/2006 | Buehlmann |
| 2006/0219655 A1 | 10/2006 | Cho |
| 2006/0238185 A1 | 10/2006 | Kozicki |
| 2006/0239129 A1 | 10/2006 | Kley |
| 2006/0245312 A1 | 11/2006 | Maeda |
| 2006/0291364 A1 | 12/2006 | Kozicki |
| 2007/0014047 A1 | 1/2007 | Cho |
| 2007/0041233 A1 | 2/2007 | Roelofs |
| 2007/0047427 A1 | 3/2007 | Cherubini |
| 2007/0125961 A1 | 6/2007 | Despont |
| 2007/0152253 A1 | 7/2007 | Lee |
| 2007/0158731 A1 | 7/2007 | Bae |
| 2007/0195682 A1 | 8/2007 | Duerig |
| 2007/0196645 A1 | 8/2007 | Duerig |
| 2007/0210812 A1 | 9/2007 | Yoo |
| 2007/0253314 A1 | 11/2007 | Jones |
| 2007/0254383 A1 | 11/2007 | Buehlmann |
| 2007/0296101 A1 | 12/2007 | DiPietro |
| 2007/0296500 A1 | 12/2007 | Yang |
| 2008/0013437 A1 | 1/2008 | Albrecht |
| 2008/0017609 A1 | 1/2008 | Takahashi |
| 2008/0020489 A1 | 1/2008 | Im |

FOREIGN PATENT DOCUMENTS

| JP | 3295043 | 12/1991 |
|---|---|---|
| JP | 3295044 | 12/1991 |
| JP | 4159636 | 6/1992 |
| JP | 9198726 | 7/1997 |
| WO | WO 96/11472 | 4/1996 |
| WO | WO 97/05610 | 2/1997 |
| WO | WO 02/34788 A1 | 5/2002 |

OTHER PUBLICATIONS

Bo Hong, *Exploring the Usage of MEMS-based Storage as Metadata Storage and Disk Cache in Storage Hierarchy*, Storage Systems Research Center, Jack Baskin School of Engineering, University of California at Santa Cruz http://www.cse.ucsc.edu/~hongbo/publications/mems-metadata.pdf.

Sumio Hosaka, Hajime Koyanagi and Atsushi Kikukawa, Nanometer Recording on Graphite and Si Substrate Using an Atomic Force Microscope in Air, Japan Journal of Applied Physics, vol. 32 (1993) pp. L464-467, Part 2, No. 3B, Mar. 15, 1993, Central Research Laboratory, Hitachi Limited, Kokubunji, Tokyo 185.

Atsushi Kikukawa, Sumio Hosaka, Yukio Honda[1] and Ryo Imura, Phase-Controlled Scanning Force Microscope, Japanese Journal of Applied Physics, vol. 33 (1994) pp. L1286-L1288, Part 2, No. 9A, Sep. 1, 1994, Advanced Research Laboratory, Hitachi Limited, 1-280 Higashi-koigakubo, Kokubunji-shi, Tokyo 185, [1]Central Research Laboratory, Hitachi Limited, 1-280 Higashi-koigakubo, Kokubunji-shi, Tokyo 185.

William P King, Daniel A. Fletcher and Y. Sungtaek Ju, Nanometer-Scale Thermal Processing for Advanced Manufacturing (YIP '96), Office of Naval Research Annual Grant Report, First Annual Report: May 1, 1996-Apr. 30, 1997, pp. 1-8.

T. C. Reiley, T.R. Albrecht, D. W. Albrecht, K. Kuroki and M. Aoyagi, A Micro Hard Disk Drive, I.B. M.—Almaden Research Center, I.B. M. Storage System Division, Electrochemical Society Proceeding, vol. 98-20, pp. 10-18.

Seiji Heiki, Yasuo Wada and Tomihiro Hashizume, Correlation Between Tip-Apex Shape and Surface Modification by Scanning Tunneling Microscopy, Journal of Applied Physics, vol. 86, No. 8, pp. 4220-4224.

Michael Brooks, Hole in One, New Scientist, Mar. 27, 1999, pp. 46-48.

H. Jonathon Mamin, Robert P. Ried, Bruce D. Terris and Daniel Rugar, High-Density Data Storage Based on the Atomic Force Microscope, Proceeding of the IEEE, vol. 87, No. 6, Jun. 1999, pp. 1014-1027.

Steven W. Schlosser, John Linwood Griffin, David F. Nagle, and Gregory R. Ganer, Filling the Memory Access Gap: A Case for On-Chip Magnetic Storage, School of Computer Science, Carnegie Mellon University, Nov. 1999.

Steven W. Schlosser, John Linwood Griffin, David F. Nagle and Gregory R. Ganger, Carnegie Mellon University, Designing Computer Systems with MEMS-Based Storage, 9th International Conference on Architectural Support for Programming Languages and Operating Systems, 2000.

S. Hosaka, K. Etoh, A. Kikukawa and H. Koyanagi, Megahertz Silicon Atomic Force Microscopy (AFM) Catilever and High-Speed Readout in AFM-Based Recording, Journal of Vacuum Science Technology, vol. 18, No. 1, Jan./Feb. 2000, pp. 94-99.

Robert P. Ried, Air-Bearing Sliders and Plane-Plane-Concave Tips for Atomic Force Microscope Cantilevers, Journal of Microelectromechanical Systems, vol. 9, No. 1, Mar. 2000, pp. 52-57.

L. Richard Carley, Gregory R. Ganger and David F. Nagle, Mems-Based Integrated-Circuit Mass-Storage Systems, Communications of the ACM, vol. 43, No. 11, Nov. 2000, pp. 73-80.

P. Vettiger, M. Despont, U. Drechsler, U. Durig, W. Haberle, M. I. Lutwyche, H.E. Rothuizen, R. Stutz, R. Widmer and G. K. Binnig, The "Millipede"—More than one thousand tips for future AFM data storage, I.B.M. J. Res. Develop., vol. 44, No. 3, May 2000, pp. 323-340.

R. B. Zmood, L. Qin, D. K. Sood, T. Vinay and D. Meyrick, School of Electrical and Computer System Engineering, Royal Melbourne Institute of Technology, Melbourne, Victoria 3000, Australia, Magnetic MEMS Used in Smart Structures Which Exploit Magnetic Materials Properties, Smart Structures and Devices, Proceeding of the SPIE, vol. 4235, 2001, pp. 173-187.

Michael Gross, Small is Great!, New Scientist, Jul. 14, 2001, pp. 1-4.

G. Cherubini, T. Antonakopoulos, P. Bachtold, G. K. Binnig, M. Despont, U. Drechsler, A. Dholakia, U. Durig, E. Eleftheriou, B. Gotsmann, W. Haberle, M. A. Lantz, T. Loeliger, H. Pozidis, H. E. Rothuizen, R. Stutz and P. Vettiger, I.B.M. Research, Zurich Research Laboratory, The Millipede, a Very Dense, Highly Parallel Scanning-Probe Data-Storage System, ESSCIRC 2002, pp. 121-125.

E. Eleftheriou, G. Cherubini, H. Pozidis, H. E. Rothuizen and P. Vettiger, Millipede—a MEMS-Based Scanning-Probe Data-Storage, APMRC 2002, pp. 1-8.

Satoshi Kawamura, Electronics Device Division, Hitachi Maxell, Limited, Coil on Chip RFID System by Super EF2 Technology, Nippon Oyo Jiki Gakkai Kenkyukai Shiryo, vol. 123, pp. 21-25.

Molecular Chip Patent, Poptronics, vol. 3, No. 5, May 2002, pp. 11-12.

Kenneth J. Korane, A King-Size Future for Nanosize Machines, Machine Design vol. 74, No. 18, Sep. 19, 2002, pp. 88-94.

Peter Vettiger and Gerd Binnig, The Nanodrive Project: Inventing a Nanotechnology Device for Mass Production and Consumer Use is Trickier than it Sounds, Scientific American, vol. 288, No. 1, 2002, pp. 47-53.

Mustafa Uysal, Arif Merchant, Guillermo A. Alvarez, Hewlett Packard Laboratories, Using MEMs-Based Storage in Disk Arrays, Proceedings of FAST '03: 2nd USENIX Conference on File and Storage Technologies, USENIX Association, pp. 89-101.

Kiyoshi, T., et al., "Switching and memory phenomenon in Langmuir-Blodgett film using a scanning tunneling microscope," Canon, Inc., IEIC Technical Report (1994), vol. 93, No. 524 (OME93 54-59), pp. 7012, Fig. 6, Ref. 15.

Kiyoshi T. et al., Application and Progress in the Scanning Probe Microscopy, High Density Information Storage Using Langmuir-Blodgett Film and Atomic Force Microscopy, Canon, Inc., Journal of the Surface Science Society of Japan (1997), vol. 18, No. 4, pp. 213-218, Fig. 7, Ref. 14.

Kado, H. and Tohda, T., "Nanometer-scale recording on chalcogenide films with an atomic force microscope," Appl. Phys./Lett., vol. 66, No. 22, May 29, 1995, pp. 2961-2962.

Yano, K., et al., "Nanometer scale conductance change in a Langmuir-Blodgett film with the atomic force microscope," Appl. Phys. Lett., vol. 68, vol. 2, Jan. 8, 1996, pp. 188-190.

Yano, K. and Ikeda, T., "Stable bit formation in polyimide Langmuir-Blodgett film using an atomic force microscope," Appl. Phys. Lett., vol. 80, vol. 6, Feb. 11, 2002, pp. 1067-1069.

Barrett, R.C. and Quate, C.F., "Large-scale charge storage by scanning capacitance microscopy," Ultramicroscopy 42-44 (1992) pp. 262-267.

Gardner, E., "AFM Fabricates a Tiny Transistor," Science, vol. 266, Oct. 28, 1994, p. 543.

Hagan, H.P., et al., "Temporal behaviour of nanofeatures on Au," Ultramicroscopy, 42-44 (1992), pp. 587-593.

Majumdar, A., et al., "Nanometer-scale lithography using the atomic force microscope," Appl. Phys. Lett., vol. 61, No. 19, Nov. 9, 1992, pp. 2293-2295.

Mamin, H.J., and Ruger, D., "Thermomechanical writing with an atomic force microscope tip," App. Phys. Lett., vol. 61, No. 8, Aug. 24, 1992, pp. 1003-1005.

Mamin, H.J., et al., "High Density data storage using proximal probe techniques," The IBM Journal of Research and Development, vol. 39, No. 6, Nov. 1995, pp. 681-699.

Manalis, S., et al., "Submicron studies of recording media using thin-film magnetic scanning probes," Applied Physics Letters, vol. 66, No. 19, May 8, 1995, pp. 2585-2587.

Terris, B.D., et al., "Atomic force microscope-base data storage: track servo and wear study," Applied Physics A vol. 66, pp. S809-S813 (1998), (IBM Almaden Research Center, presented STM 97).

Uesugi, K. and Yao, T., "Nanometer-scale fabrication on graphite surfaces by scanning tunneling microscopy," Ultramicroscopy, 42-44 (1992), pp. 1443-1445.

PCT Written Opinion mailed Dec. 18, 2000, International Application No. PCT/US99/30326, filed Dec. 20, 1999.

T.C. Shen et al; Ion irradiation effects on graphite with the scanning tunneling microscope; J.Vac.Sci. Technol. B9(2), Mar./Apr. 1991; pp. 1376-1379.

U. Staufer et al; Tailoring nanostructures with a scanning tunneling microscope; J.Vac.Sci. Technol. B9(2), Mar./Apr. 1991; pp. 1389-1393.

H.J. Mamin; Gold deposition from a scanning tunneling microscope tip;, et al.; J.Vac.Sci. Technol. B9(2), Mar./Apr. 1991; pp. 1398-1402.

J.A. Dagata, et al. Pattern generation on semiconductor surfaces by a scanning tunneling microscope operating in air;; J.Vac.Sci. Technol. B9(2), Mar./Apr. 1991; pp. 1384-1388.

T.R. Albrecht, et al. Nanometer-scale hole formation on graphite using a scanning tunneling microscope;; Appl.Phys.Lett., vol. 55, No. 17, Oct. 23, 1989; pp. 1727-1729.

M.Aono; Has Japan Begun to Move Toward Atomic Level Material Processing?; Science, vol. 258, Oct. 23, 1992.

Rosei, Federico, "Nanostructured surfaces: Challenges and frontiers in nanotechnology," 2004 Journal of Physics: Condensed Matter, Apr. 16, 2004, pp. 1373-1436.

Lapshin, Rostislav V., "Digital data readback for a probe storage device," Review of Scientific Instruments, vol. 71, Issue 12, Dec. 2000, pp. 4607-4610.

Serry, F.M., et al., "Electric Force Microscopy, Surface Potential Imaging, and Surface Electric Modification," Veeco Instruments, Inc., 2004, pp. 1-8.

Honda, Koichiro, et al., "Visualization of electronc and holes localized in the thin gate film of metal-oxide-nitride-oxide-semiconductor type Flash memory by scanning nonlinear dielectric microscopy," Nanotechnology, Institute of Physics Publishing, 2005, pp. 590-593.

Kalinin, et al., "A Decade of Piezoresponse Force Microscopy: Progress, Challenges and Opportunities," IEEE Tuff, pp. 1-41.

Kalinin, et al., "Electric scanning probe imaging and modification of ferroelectric surfaces," pp. 0-42.

International Search Report, in connection with Application No. PCT/US2007/67800 dated Feb. 12, 2008, 8 pages.

International Search Report, in connection with Application No. PCT/US2007/67805 dated Feb. 25, 2008, 8 pages.

* cited by examiner

Servo Amplitude Position Information

Servo Timing Position Information

PATTERNED MEDIA FOR A HIGH DENSITY DATA STORAGE DEVICE

PRIORITY CLAIM

This application claims priority to the following U.S. Provisional Patent Application:

U.S. Provisional Patent Application No. 60/693,950, entitled "Media for Writing Highly Resolved Domains," filed Jun. 24, 2005.

CROSS-REFERENCE TO RELATED PATENT APPLICATIONS

This application incorporates by reference all of the following co-pending applications and the following issued patent:

U.S. patent application Ser. No. 11/177,550, entitled "Media for Writing Highly Resolved Domains," filed Jul. 8, 2005;

U.S. patent application Ser. No. 11/177,062, entitled "Method for Forming Patterned Media for a High Density Data Storage Device," filed Jul. 8, 2005;

U.S. patent application Ser. No. 11/177,599, entitled "Method For Forming A Reinforced Tip For A Probe Storage Device," filed Jul. 8, 2005;

U.S. patent application Ser. No. 11/177,731, entitled "Methods for Forming High Density Data Storage Devices with Read/Write Probes with Hollow or Reinforced Tips," filed Jul. 8, 2005;

U.S. patent application Ser. No. 11/177,642, entitled "High Density Data Storage Devices with Polarity-Dependent Memory Switching Media," filed Jul. 8, 2005;

U.S. patent application Ser. No. 11/178,060, entitled "Methods for Writing and Reading in a Polarity-Dependent Memory Switching Media," filed Jul. 8, 2005;

U.S. patent application Ser. No. 11/178,061, entitled "High Density Data Storage Devices with a Lubricant Layer Comprised of a Field of Polymer Chains," filed Jul. 8, 2005;

U.S. patent application Ser. No. 11/004,153, entitled "Methods for Writing and Reading Highly Resolved Domains for High Density Data Storage," filed Dec. 3, 2004;

U.S. patent application Ser. No. 11/003,953, entitled "Systems for Writing and Reading Highly Resolved Domains for High Density Data Storage," filed Dec. 3, 2004;

U.S. patent application Ser. No. 11/004,709, entitled "Methods for Erasing Bit Cells in a High Density Data Storage Device," filed Dec. 3, 2004;

U.S. patent application Ser. No. 11/003,541, entitled "High Density Data Storage Device Having Erasable Bit Cells," filed Dec. 3, 2004;

U.S. patent application Ser. No. 11/003,955, entitled "Methods for Erasing Bit Cells in a High Density Data Storage Device," filed Dec. 3, 2004;

U.S. patent application Ser. No. 10/684,883, entitled "Molecular Memory Integrated Circuit Utilizing Non-Vibrating Cantilevers," filed Oct. 14, 2003;

U.S. patent application Ser. No. 10/684,661, entitled "Atomic Probes and Media for high Density Data Storage," filed Oct. 14, 2003;

U.S. patent application Ser. No. 10/684,760, entitled "Fault Tolerant Micro-Electro Mechanical Actuators," filed Oct. 14, 2003;

U.S. patent application Ser. No. 10/685,045, entitled "Phase Change Media for High Density Data Storage," filed Oct. 14, 2003;

U.S. patent application Ser. No. 09/465,592, entitled "Molecular Memory Medium and Molecular Memory Integrated Circuit," filed Dec. 17, 1999; and U.S. Pat. No. 5,453,970, entitled "Molecular Memory Medium and Molecular Memory Disk Drive for Storing Information Using a Tunnelling Probe," issued Sep. 26, 1995 to Rust, et al.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to high density data storage using molecular memory integrated circuits.

BACKGROUND

In 1965, Gordon Moore observed an exponential growth in the number of transistors in an integrated circuit and predicted that the trend would continue—and it has. Software developers have pushed each generation of integrated circuit to the limits of its capability, developing steadily more data intensive applications, such as ever-more sophisticated, and graphic intensive applications and operating systems (OS). Each generation of application or OS always seems to earn the derisive label in computing circles of being "a memory hog." Higher capacity data storage, both volatile and non-volatile, has been in persistent demand for storing code for such applications. Add to this need for capacity, the confluence of personal computing and consumer electronics in the form of personal MP3 players, such as the iPod, personal digital assistants (PDAs), sophisticated mobile phones, and laptop computers, which has placed a premium on compactness and reliability.

Nearly every personal computer and server in use today contains one or more hard disk drives for permanently storing frequently accessed data. Every mainframe and supercomputer is connected to hundreds of hard disk drives. Consumer electronic goods ranging from camcorders to TiVo® use hard disk drives. While hard disk drives store large amounts of data, they consume a great deal of power, require long access times, and require "spin-up" time on power-up. FLASH memory is a more readily accessible form of data storage and a solid-state solution to the lag time and high power consumption problems inherent in hard disk drives. Like hard disk drives, FLASH memory can store data in a non-volatile fashion, but the cost per megabyte is dramatically higher than the cost per megabyte of an equivalent amount of space on a hard disk drive, and is therefore sparingly used.

Phase change media are used in the data storage industry as an alternative to traditional recording devices such as magnetic recorders (tape recorders and hard disk drives) and solid state transistors (EEPROM and FLASH). CD-RW data storage discs and recording drives use phase change technology to enable write-erase capability on a compact disc-style media format. CD-RWs take advantage of changes in optical properties (e.g., reflectivity) when phase change material is heated to induce a phase change from a crystalline state to an amorphous state. A "bit" is read when the phase change material subsequently passes under a laser, the reflection of which is dependent on the optical properties of the material. Unfortunately, current technology is limited by the wavelength of the laser, and does not enable the very high densities required for use in today's high capacity portable electronics and tomorrow's next generation technology such as systems-on-a-chip and micro-electric mechanical systems (MEMS). Consequently, there is a need for solutions which permit higher density data storage, while still providing the flexibility of current phase change media solutions.

BRIEF DESCRIPTION OF THE DRAWINGS

Further details of the present invention are explained with the help of the attached drawings in which.

DETAILED DESCRIPTION

Media Comprising Phase Change Material

Figure 1A:
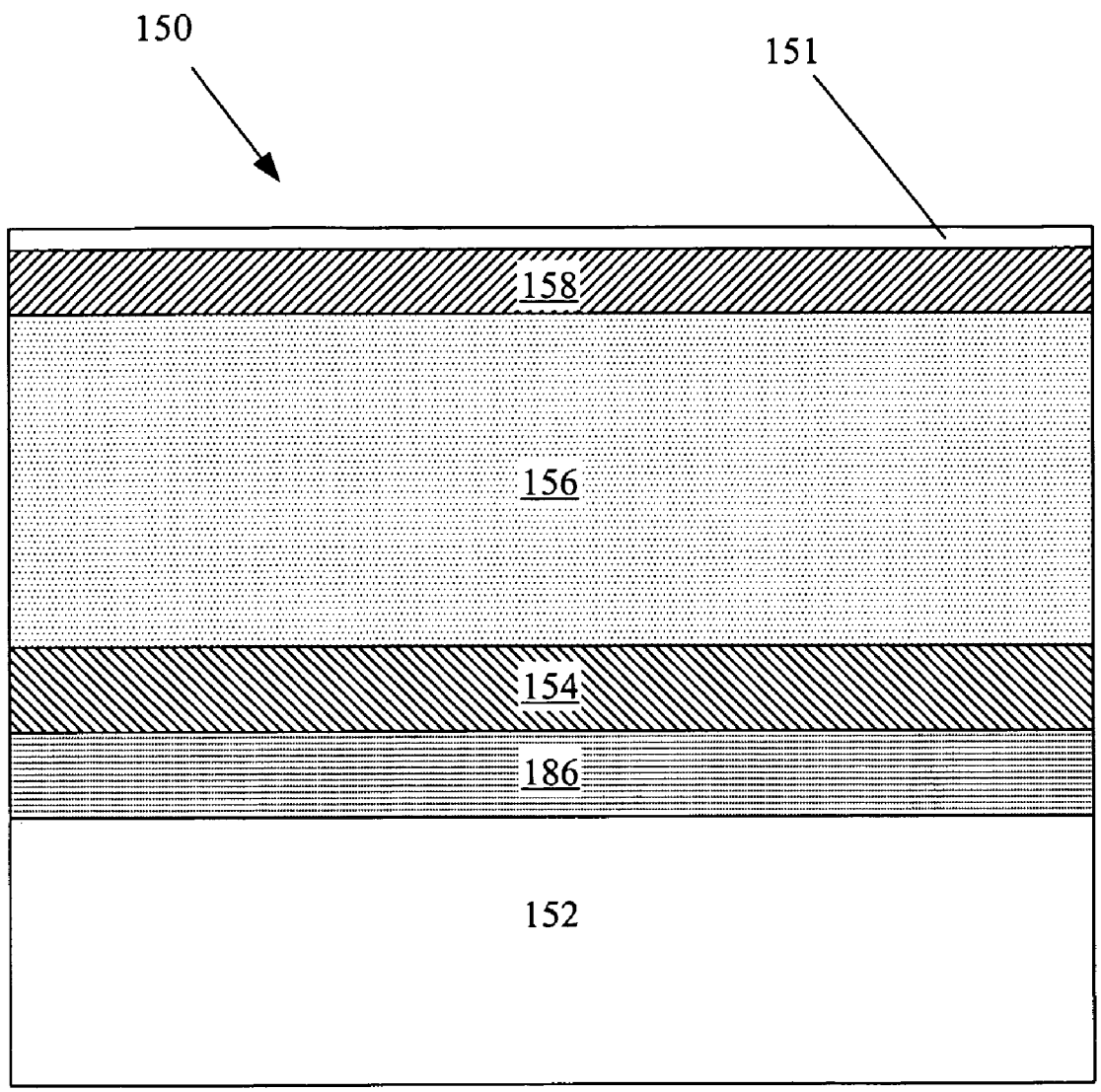
FIG. 1A is a cross-sectional view of a portion of an embodiment of a media device including a recording media comprising GST in accordance with the present invention, the portion being in an unwritten state.

FIG. 1A is a cross-section of a portion of a media device 150 in an unwritten state for use with embodiments of systems and methods in accordance with the present invention. The media device 150 includes a substrate 152, an under-layer 154 disposed over the substrate 152, a recording media 156 formed over the under-layer, and an over-layer 158 formed over the recording media 156. The substrate 152 can comprise silicon (Si), gallium arsenide (GaAs), or some other semiconductor material. The under-layer 154 can comprise a highly conductive material, the under-layer 154 drawing heat away from the recording media 156 to facilitate fast cooling of the recording media 156. In an embodiment, the under-layer 154 can comprise tungsten, while in other embodiments the under-layer 154 can comprise one or more of platinum, gold, aluminum, and copper. In still other embodiments, the under-layer 154 can comprise some other material having high conductivity. It may be desired that the material forming the under-layer 154 further be chosen based on additional properties, such as thermal expansion characteristics (a low thermal expansion coefficient being preferable), adhesion characteristics (high adhesion being preferable), and uniformity of deposition, smoothness, etc. One of ordinary skill in the art can appreciate the myriad different materials having high conductivity and one or more favorable properties for forming the under-layer. Where it is desired that the under-layer 154 be insulated from the substrate 152, there may be an insulating layer 186 disposed between the under-layer 154 and the substrate 152. For example, in an embodiment the insulating layer 186 can comprise one of an oxide and a nitride material. The insulating layer 186 insulates the media 156 from the substrate 152 both thermally and electrically.

In an embodiment, the recording media 156 can comprise a phase change material such as a chalcogenide comprising one or more of germanium (Ge), antimony (Sb), and tellurium (Te) (also referred to herein as "GST," wherein "GST" also refers to stoichiometric and off-stoichiometric GeSbTe alloys). As a portion of the phase change material is heated beyond some threshold temperature and then cooled very quickly (i.e., quenched) the phase of the material changes from a crystalline state to a disordered state. Conversely, if the phase change material is heated above some threshold and then allowed to cool slowly, the material will tend to re-crystallize. As a result of these phase changes, the resistivity of the phase change material changes. This resistivity change is quite large in phase change materials and can be detected by a tip 142 (see FIG. 1B) that is conductive or that includes a conductive coating by passing current through the tip 142 and the media device 150. Phase change materials are well known in the art and can be found disclosed in numerous references, for example U.S. Pat. Nos. 3,271,591 and 3,530,441 both issued to Ovshinsky and incorporated herein by reference. In other embodiments, as described in detail below, the recording media can be an alternative material, such as a polarity-dependent memory material.

The media device 150 further includes an over-layer 158 comprising a material selected to prevent physical damage to the recording media 156 and/or to the tip 142 when the tip 142 contacts the over-layer 158. The over-layer 158 can comprise a material that is resistant to wear, thereby extending the lifetime of the over-layer 158 and/or the tip 142. The over-layer 158 can include a low conductance characteristic, and a high hardness characteristic. For example, in an embodiment the over-layer 158 can comprise titanium nitride (TiN), a hard material that conducts poorly. However, it should be noted that it can be advantageous (as described in detail below) to employ a material that conducts current more readily through a film than across a film. Some metal nitrides, such as molybdenum nitride (MoN) and TiN are anisotropic columnar material that can exhibit such properties to a degree.

In still other embodiments, for example where a polarity-dependent memory layer is used as a recording media, the over-layer 158 can comprise diamond-like carbon (DLC), which has conductive properties that can be adjusted in the manufacturing process through a variety of techniques. One such technique includes using a dopant such as nitrogen in the formation of the DLC. In still other embodiments, the over-layer 158 can comprise an insulator, for example such as silicon nitride (SiN) or oxide. Where an insulator is used as an over-layer 158, current applied to the media device 150 from the tip must tunnel through the over-layer 158 before reaching the recording media 156; thus, the over-layer 158 should be sufficiently thin to limit the amount of tunneling required before a current can interact with the recording media 156. For example, where silicon dioxide (SiO2) is used as a tunneling oxide, the over-layer 158 can be approximately less than 10 nm.

The media device 150 can be formed using traditional semiconductor manufacturing processes for depositing or growing layers of film in sequence using deposition chambers (e.g., chemical vapor deposition (CVD) chambers, plasma vapor deposition (PVD) chambers) and/or furnaces, for instance. Alternatively, the media device 150 can be formed using a shadow mask. Where a shadow mask is used, a mask wafer that contains at least one aperture is placed over a final wafer to form a media device 150. The mask wafer and final wafer are then subjected to a deposition process. During the deposition process, chemicals pass through the shadow mask and are deposited to form a media device 150. Additionally, the media and/or media stack can be deposited over a lift-off resist layer. The resist layer and excess media stack can be removed by placing a wafer on which the media device 150 is formed in a solvent bath that dissolves the resist and allows excess material to be removed. One of ordinary skill in the art can appreciate the myriad different techniques for forming a media device 150.

In yet further embodiments the over-layer 158 can comprise a cermet-like material to limit shunting of current across the over-layer 158. Cermets are combinations of insulators and metal conductors that form a matrix. The matrix can have a concrete-like structure, where the metal is analogous to rocks in concrete and the insulator is analogous to the "glue" that holds the rocks together. It can also have a columnar structure much like TiN. Either form will allow a relative anisotropic conductivity such that the current will preferably flow through the over-layer 158 rather than flow laterally across the over-layer 158. In still other embodiments, the recording media 156 can be a cermet that comprises a phase change material as a conductor, surrounded by a matrix of an insulator. In still other embodiments, the recording media 156 can comprise isolated dots of phase change material, surrounded by insulating material. Discrete conductors can be arranged over the dots, electrically isolated from adjacent dots. In still other embodiments, the over-layer 158 can comprise a material that exhibits non-linear conductive properties with voltage, particularly those that have increasing conductivity with higher voltage potential. Such materials include tin oxide (SnO). In still another embodiment, the over-layer 158 can comprise a material that exhibits non-linear conductive properties with temperature, particularly those that have increasing conductivity with higher temperature. Such materials include many semiconductors such as silicon. Many of these alternative materials can be used together such that the combination increases the anisotropic conductivity characteristic of the over-layer. Further, these over-layer materials can be used sequentially, rather than mixed together, to enhance the performance characteristics of the over-layer 158. For example, a very thin layer of carbon can be added over TiN to form a barrier to oxidization, as well as to improve lubricity of the surface.

Figure 1B:
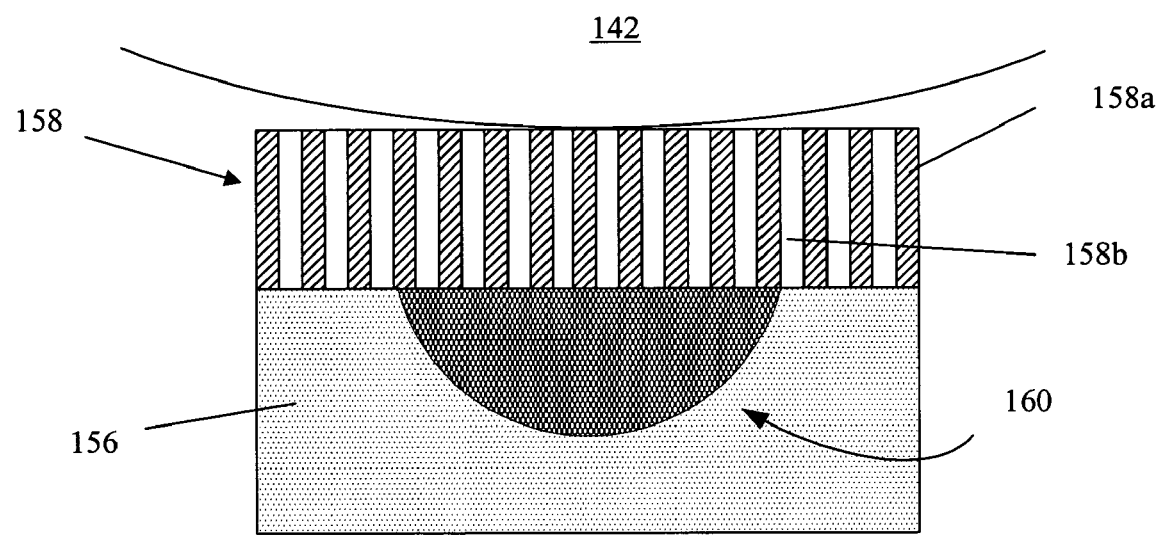
FIG. 1B is a cross-sectional view of an embodiment of an over-layer having substantially anisotropic resistivity for use with media in accordance with the present invention.
Figure 4A:
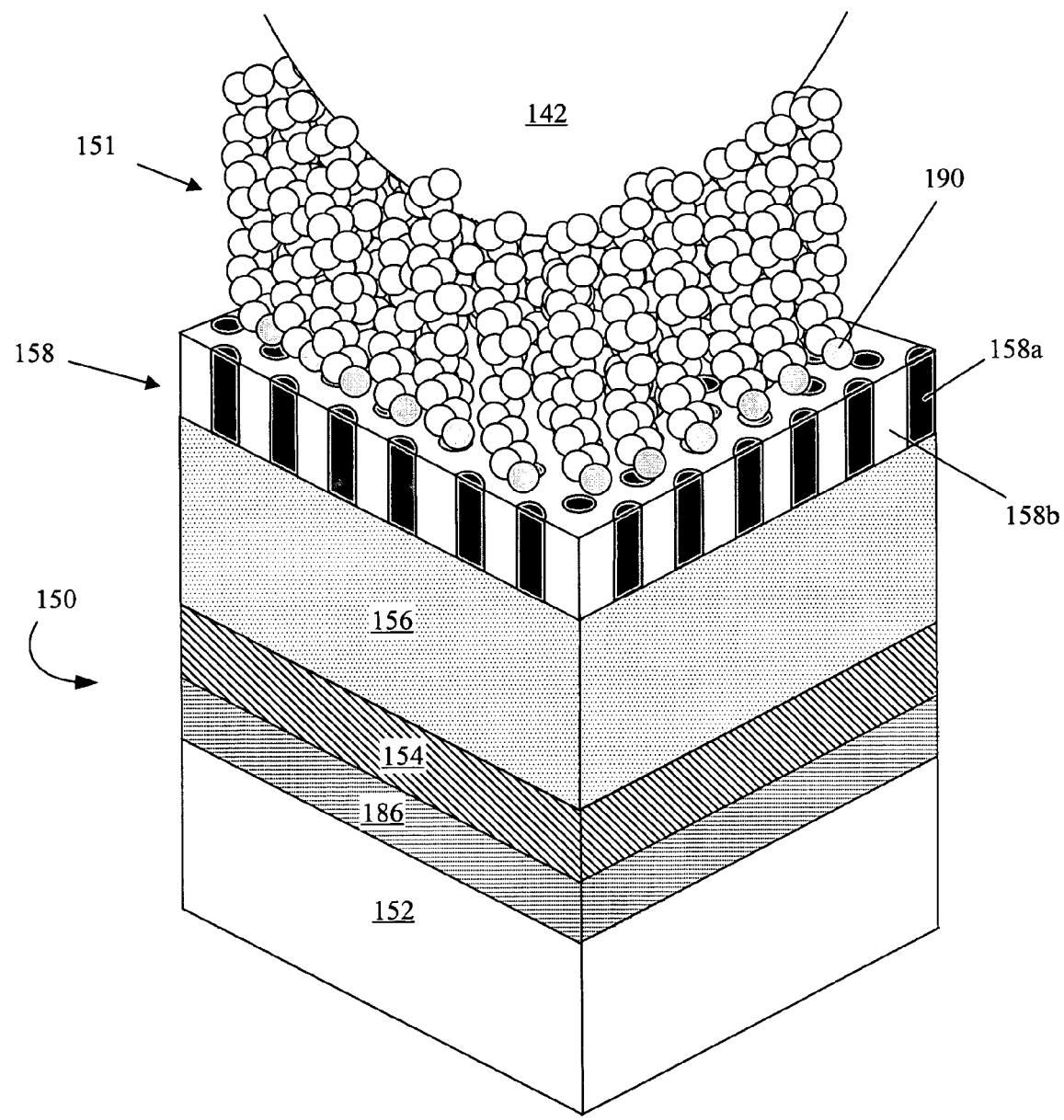
FIG. 4A is a perspective view of an embodiment of a lubricant for use with media in accordance with the present invention.

FIG. 1B is a close-up view of a portion of one such over-layer 158 comprising a co-deposited film for use with embodiments of a media device 150 in accordance with the present invention. The over-layer 158 can comprise a continuous or discontinuous cover layer disposed over the recording media 156 and having highly anisotropic conductance characteristics. Co-deposited films are described, for example, in U.S. Pat. No. 6,770,353 to Mardilovich et al. and U.S. Pat. No. 6,541,392 to Avniel et al., both incorporated herein by reference. Such references teach deposition of co-deposited films using multiple targets from which multiple materials are alternately sputtered. It is further known in the art to produce granular films with ferric grains surrounded by insulator from a single composite target. See for example "Magnetic Properties and Structure of (Co-alloy)-SiO2 Granular Films" by Kaitsu et al., *IEEE Transactions on Magnetics*, Vol. 32, No. 5, September 1996, incorporated herein by reference. Embodiments of methods in accordance with the present invention can include co-depositing a metal and a dielectric by sputtering material from a single metal and dielectric composite target in a series of process steps to a structure approximately as shown in FIGS. 1B and 4A. As can be seen in those figures, co-deposited films can comprise a continuous non-conductive film with discontinuous conductive structures. Such co-deposited films can substantially limit shunting, exhibiting high electrical resistance across the film (i.e., in the lateral direction) relative to electrical resistance through the film (i.e., in the vertical direction). The co-deposited film can thus be said to be substantially "anisotropic" in conductance because the co-deposited film favors electrical conductance dependent on direction (the direction favored being through the co-deposited film rather than across the co-deposited film). A maximum resistance contrast can be approached in over-layers with isotropic conductance characteristics having resistivity, $\rho = \sqrt{\rho_{low} * \rho_{high}}$. Over-layers with anisotropic conductance characteristics should have resistivity, $\rho \geq \sqrt{\rho_{low} * \rho_{high}}$. For example, GST has a resistivity that varies such that $0.1\ \Omega\text{-cm} < \sqrt{\rho_{low} * \rho_{high}} < 1\ \Omega\text{-cm}$.

The conductive portion 158a preferably comprises an environmentally robust material, such as a metal having a conductive oxide. For example, the metal can comprise one or more of molybdenum (Mo), iridium (Ir), and ruthenium (Ru) or some other refractory metal. The insulating portion 158b preferably comprises a dielectric that is dense and hard. For example, the dielectric can comprise silicon dioxide ($SiO_2$), silicon nitride ($SiN_x$) or aluminum oxide ($Al_2O_3$). Further, preferably (though not necessarily) the grain size and spacing of the conductive portion 158a is sufficiently small relative to the radius of curvature of the tip 142 so that a substantial number of conductive portions 158a are "seen" by the tip 142. For example, approximately 50 or more grains. Thus, in a preferred embodiment, where a bit (or indicium) has a diameter of 25 nm each grain should be approximately 4 nm or smaller in size given a 1:1 ratio of the width of the conductive portion 158a and the distance between conductive portions 158a within the matrix of insulating portions 158b. Deposition of metal oxides having sufficiently small grain size has been described, for example, in "CoPtCr—$SiO_2$ Granular Media for High-Density Perpendicular Recording" by Uwazumi et al., *IEEE Transactions on Magnetics*, Vol. 39, No. 4, p. 1914, July 2003, incorporated herein by reference.

Figure 1C:
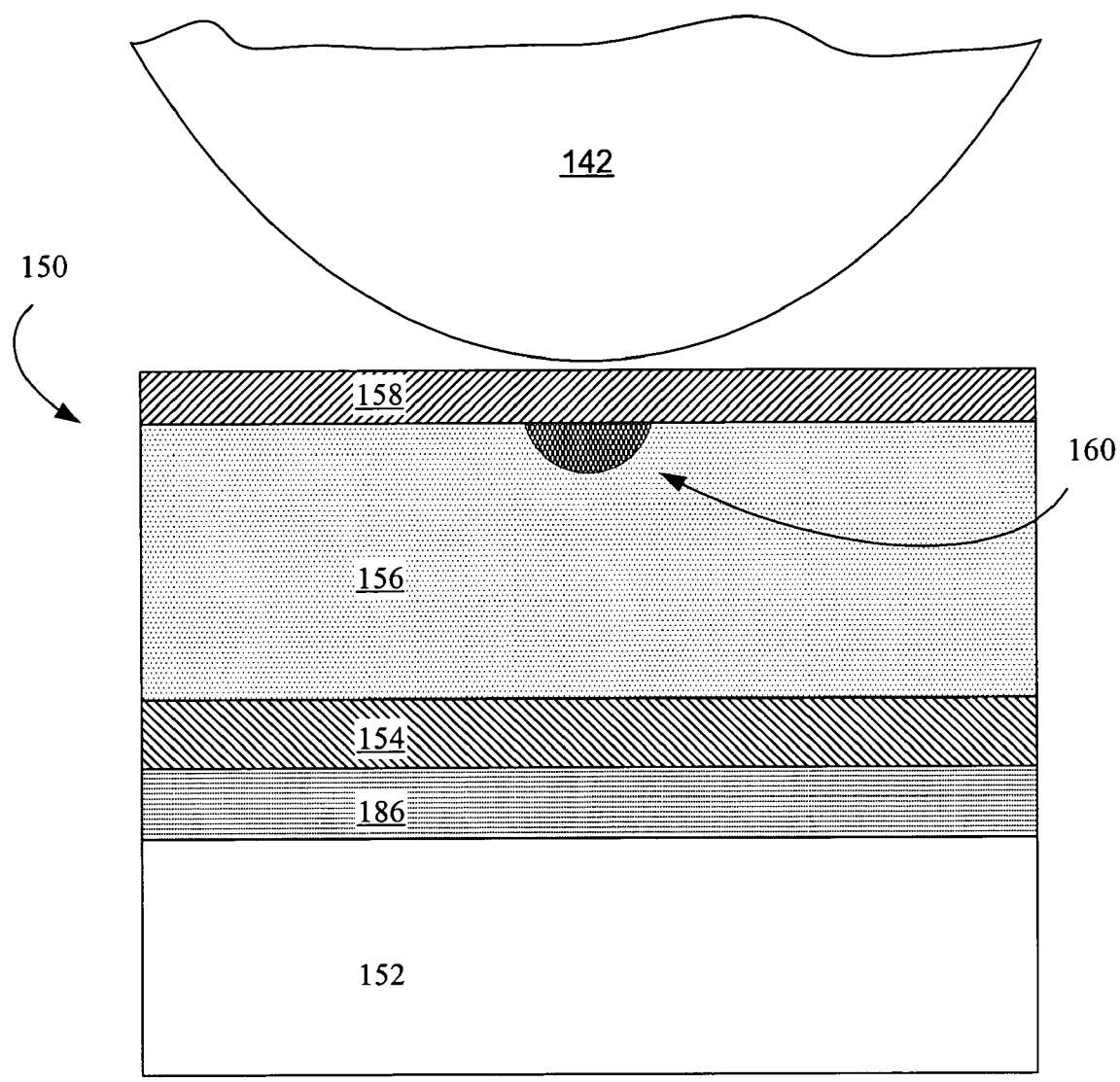
FIG. 1C is a cross-sectional view of the portion of FIG. 1A including a data bit.
Figure 2:
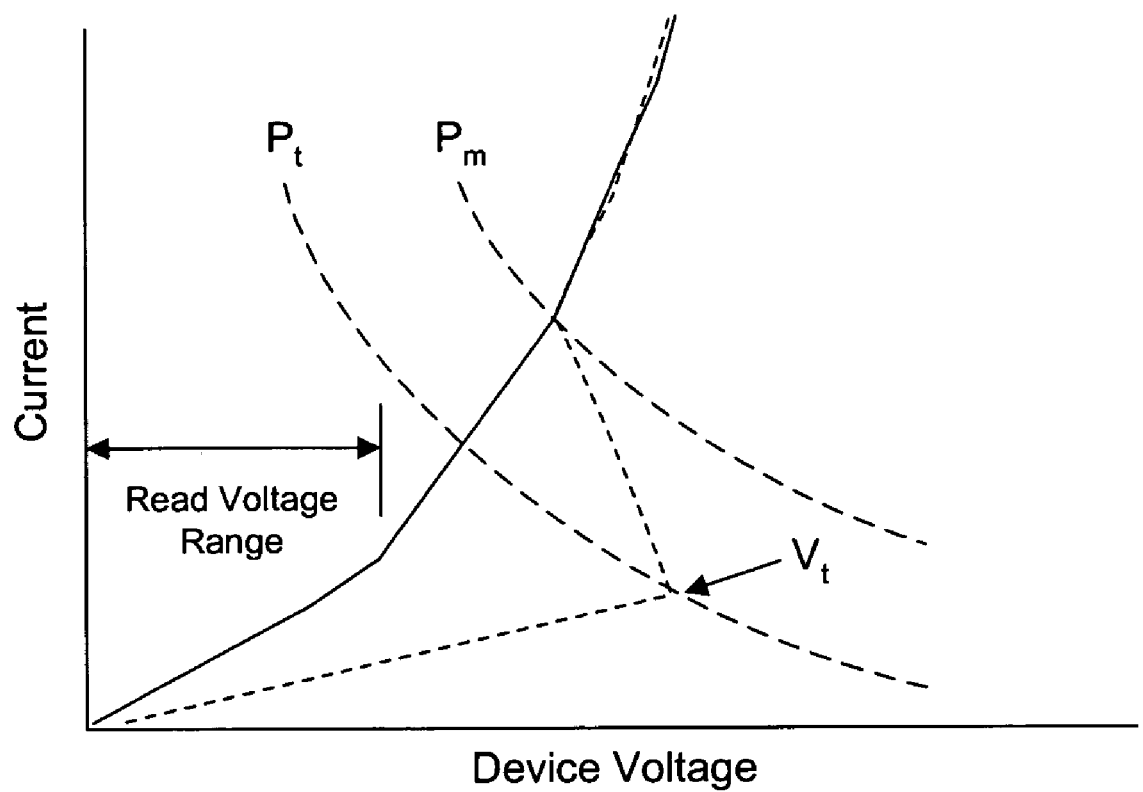
FIG. 2 is a phase change chart of an exemplary phase change material for use with systems and methods in accordance with the present invention.

FIGS. 1B and 1C are cross-sections of a portion of the media device 150 of FIG. 1A in which an indicia 160 (which can represent a data bit, and which for convenience is referred to herein as a data bit) has been formed. In an embodiment a data bit 160 can be formed by passing current through the recording media 156 from a tip 142 positioned in contact or near contact with the over-layer 158, thereby heating the recording media 156 near the tip 142. As described above, when the temperature of the phase change material exceeds a threshold temperature the phase change material becomes semi-molten or molten, and can be quenched to form a disordered bit. In other embodiments, the bulk phase change material can have a disordered structure and when heated can be more slowly cooled to form a crystalline structure. FIG. 2 is a chart illustrating the characteristics of a chalcogenide media device. The threshold temperature corresponds to a temperature produced in the GST material at a voltage intersecting along the iso-power line $P_t$. As can be seen, the voltage ramped across a disordered region of a chalcogenide must exceed a threshold voltage $V_t$ (as defined along an iso-power line $P_t$) before the disordered region can be cooled to form crystalline structure.

Quenching is defined as a rate of cooling that achieves a disordered structure, or a partially non-crystalline structure, from a molten or semi-molten phase change material. Cooling, slow cooling, or simple cooling is defined as a rate of cooling that is slow enough that the phase change material forms a crystalline structure from a molten or semi-molten material. In an embodiment, quenching can be achieved by removing current from the heated portion, and allowing a conductive under-layer to remove heat from the heated portion, while simple cooling can be achieved by ramping down current from the heated portion and allowing the conductive under-layer 154 to remove heat from the heated portion. In other embodiments, quenching can be achieved by not only removing current, but by diverting current from the heated portion via a clamp (described below), while simple cooling can include removing current from the heated portion. An exact technique for achieving quenching can depend on the phase change material, the conductivity of the under-layer 154, and the temperature to which the portion is heated, as well as environmental and other factors. Further, where multiple resistivity states are used (i.e., data is stored in a non-binary fashion), cooling and quenching can have varying cooling rates and can be combined with heating temperature to achieve multiple different resistivity states as desired and designed.

In a binary system, the data bit 160 has an incongruous resistance relative to the surrounding bulk phase change material of the recording media 156, the incongruity representing data stored in the media device 150. To erase the data bit 160 from the media device 150, a second current is applied to a portion of the recording media 156 that includes the data bit 160 to heat the portion and properly cool the portion to form the structure of the bulk phase change material (whether disordered or crystalline). The resistivity of the data bit 160 is consequently changed to that of an unwritten state. For example, where the bulk phase change material has a disordered structure, a crystalline bit 160 can be erased by heating a portion of the phase change material containing the crystalline bit 160 to a second, higher temperature than was applied to form the crystalline bit 160. The portion is then quenched to ambient temperature, thereby causing the portion to form a disordered structure having a resistivity similar to the original resistivity of the bulk phase change material.

For example, in an embodiment of the media device 150 in accordance with the present invention the phase change material can comprise a chalcogenide. The bulk of the phase change material can have a crystalline structure, and can correspond to an unwritten state. To set the data bit 160 to a written state, a first current can be applied to a target portion of the phase change material causing the portion of the phase change material to heat to a threshold temperature (which can be a melting temperature of a phase change material), which in one embodiment of a chalcogenide can be approximately 600° C. The phase change material can be quenched to ambient temperature, and the portion of the phase change material heated to the threshold temperature will have a resistivity higher than the bulk, unwritten phase change material, thereby forming an indicia that can be interpreted as a data bit 160. In such an embodiment, quenching can be achieved by removing the first current so that the current drops substantially within a time ranging from 10 to 100 nanoseconds although the rate and time can vary substantially. To reset the data bit 160 to an unwritten state (also referred to herein as a reset state, and an erased state), a second current can be applied to the recording media 156 so that the portion of the phase change material is heated to a temperature approximately equal to a temperature ranging from 170° C. to 250° C. or greater, including up to the threshold temperature. The temperature range can depend on the composition of the chalcogenide, and in some embodiments can have some other range, such as from 100° C. to 250° C., or greater. As the portion of the phase change material cools to ambient temperature, a data bit 160 forms having a crystalline structure, the crystalline structure having a resistivity that approximates the resistivity of the bulk, unwritten phase change material. Different materials can be used for the phase change material of the recording media 156 to adjust the operating range for writing and erasing a data bit 160. Altering the proportions of the elements in a chalcogenide is one way of altering the written and erased temperatures.

It should be noted that although temperatures have been described with some level of specificity, the state of the portion to which heat is applied is generally most influenced by a rate of cooling of the portion. A rate of cooling can be influenced by a rate at which the current through the heated portion is removed from the heated portion, and how quickly the heat can be carried away from the heated portion (i.e., the conductivity of the materials of the media device 150 stack). It is largely thought that where a minimum temperature is reached (i.e., the crystallization temperature, which in the embodiment described above is approximately 170° C.) and maintained, the material can be cooled slowly enough that the material can re-crystallize. Such cooling can be achieved using a number of different techniques, including ramping down a current applied to the heated portion. In some embodiments, the current can be ramped down in stages, and the heated portion can be maintained at desired temperature levels for desired times, so that crystallization is achieved across substantially the entire portion. One of ordinary skill in the art can appreciate the different applications of phase change material for use as a recording media 156 and the techniques for achieving changes in material properties of the phase change material.

In other embodiments, the phase change material can comprise a chalcogenide, the bulk of which includes an disordered structure corresponding to an unwritten state. In such embodiments, targeted portions of the phase change material can be heated and slowly cooled so that the portion crystallizes, forming an indicia that can be interpreted as a data bit 160 having a written state. Systems and methods in accordance with the present invention should not be interpreted as being limited to the conventions disclosed herein or the temperature range or material characteristics described. Systems and methods in accordance with the present invention are meant to apply to all such applications of phase change material 156 having indicia corresponding to material property.

As described in the embodiment above, to erase an disordered data bit 160, a second current can be applied to the portion of the phase change material including the data bit 160. As the portion cools, the resistivity of the portion returns to a value approximately equal to the original value of the bulk phase change material, thereby erasing the data bit 160. Multiple data bits 160 can be reset to an unwritten state by applying heat to a large region of the media device 150. For instance, the media device 150 can apply a current to a buried heater under the media device 150. This heating can be applied to all of the memory locations in the media device 150 or a portion of the media device 150 such that the resistivity of heated portion of the phase change material is returned to an unwritten value. For example, in an embodiment strip heaters can be positioned to heat up bands within the media device 150. In still other embodiments, a laser can be applied to at least a portion of the media device 150 to heat the portion. For example, where a platform on which the media device is mounted comprises a transparent material, such as silicon dioxide, a laser can be applied through the platform 108 to heat the media device 150. In still other embodiments, a matrix of diode heaters can be formed to selectively heat portions of a media device 150. Such bulk erasing can potentially provide benefits such as reduced tip wear.

In still another embodiment of a media device 150 in accordance with the present invention, the phase change material is capable of having a plurality of resistance states. For example, in the unwritten state, the phase change material can have a first resistance. The phase change material can then be heated to different temperatures and quenched, thereby changing the resistance of the phase change material. In an embodiment, a read voltage can be applied across a tip 142 and recording media 156 to sense whether the resistance of the phase change material is at or near the initial, unwritten state for the bulk phase change material or at some state that is sufficiently different to be measured as a state other than the unwritten state. The phase change material can have a first resistance characteristic at an initial, or unwritten state. A first current can then be applied to the recording media 156, heating the phase change material to a first temperature. The first current can be removed from the recording media 156 and the phase change material cools to form a structure having a second resistance characteristic. In an embodiment, the resistance of the phase change material in this second state can be measured. The second resistance can vary depending on the temperature that the phase change material is heated to by the first current, and the cooling time of the phase change material. A range of resistance measurements can correspond to a data value, with different ranges corresponding to different data values. A plurality of resistance ranges can be employed as a plurality of data values using a data storage scheme other than binary, for example. In an embodiment, a data storage scheme including three data values can utilize a base-3 system rather than a binary system for storing data. In another data storage scheme, where four different resistance states are possible for each data cell, each data cell can contain two bits (e.g., each can contain 00, 01, 10 or 11). Alternatively, the precise value of the resistance characteristic for phase change material can be measured for more precise analog data storage. Measurements of the resistance are preferentially obtained by taking measurements which are relative to a first state of the media, but can also be obtained by taking absolute value measurements. Another method of measurement extracts the data as the derivative of the measured data.

The phase change material can posses a large dynamic range for resistance states, thereby allowing analog data storage. The dynamic range for the resistivity characteristic of the phase change material can be approximately 3 to 4 orders of magnitude (i.e., 1000-10,000×). For example, the resistivity of GST can range from lower than 0.1 ohm-centimeters to 1000 ohm-centimeters or more. In one embodiment, however, heating from the tip 142 on the phase change material can cause only a very small area of the phase change material to undergo a change in its resistivity. In this form a smaller dynamic range may be observed, as only a small region of the phase change material is altered. Media systems typically display a range of values in the initially deposited state, such that the resistance values measured vary at different locations. Additionally, variations in the thickness of the recording media 156 and the over-layer 158 can form differences in the measured resistance as sensed through a tip 142. These differences manifest as noise in a signal read from the tip 142. One method of reducing noise uses the analog nature of the recording medium. Initially, the state of the portion of the media device 150 under the tip 142 can be detected, for example by measuring the resistivity of the portion. A voltage waveform is then applied to the tip 142 to heat and cool the recording media 156 such that the recording media 156 changes state. The portion of the media device 150 under the tip 142 is then read again. If the value is not within the desired noise tolerance for the location, another voltage waveform is applied to change the value to within the desired tolerance range. The waveform can consist of a crystalline pulse or an amorphizing pulse, or some combination of such pulses. Multiple cycles of reading and writing can be used to drive the value to the desired tolerance range. In this way, the media device 150 can be adaptively written to reduce noise in the subsequent read back signal. Alternatively, the waveforms used to drive the recording media 156 to a desired state can operate during the heating and cooling process itself by measuring the resistance state while heating and cooling.

A tip 142 formed as described below can include a distal end having a radius of curvature of about 25 nm, in one embodiment. As the tip 142 moves across the surface of the media device 150, in contact or near contact with the surface, the tip 142 wears such that after some initial period the nominal radius of curvature of the distal end ranges from 50 to 100 nm (or more), in one embodiment. A voltage is applied across the recording media 156 to form domains of low (or high) resistivity. The distal end of the tip 142 is typically not completely flat, therefore the distal end is likely not in uniform contact or near-contact with the recording media 156 (or the over-layer 158 where present). The portion of the distal end in contact or near-contact with the surface of the media device 150 is limited by the radius of curvature of the distal end. The portion of the tip 142 in contact or near contact is also referred to herein as the terminus of the tip 142. It should be noted that while the distal end is described as having a radius of curvature, the distal end need not be shaped so that the terminus lies along a perfect arc. The radius of curvature can be thought of as an increase in width of the distal end of the tip from the terminus, and as referred to herein is not meant to be limited to geometries wherein a distal end includes a smooth, arced shape. The distal end can, for example, have a parabolic shape, a trapezoidal shape, or a non-uniform shape. The tip 142 is electrically conductive, and when a voltage potential is applied between the tip 142 and the media device 150, current passes from the tip 142, through the over-layer 158 and recording media 156 to the underlying substrate 152 (in the case where the tip 142 is a voltage source rather than a voltage sink). The current flowing between the media device 150 and the tip 142 varies across the radius of curvature as the electric field between the tip 142 and the media device 150 decays inversely with distance from the surface of the media device 150.

Figure 3:
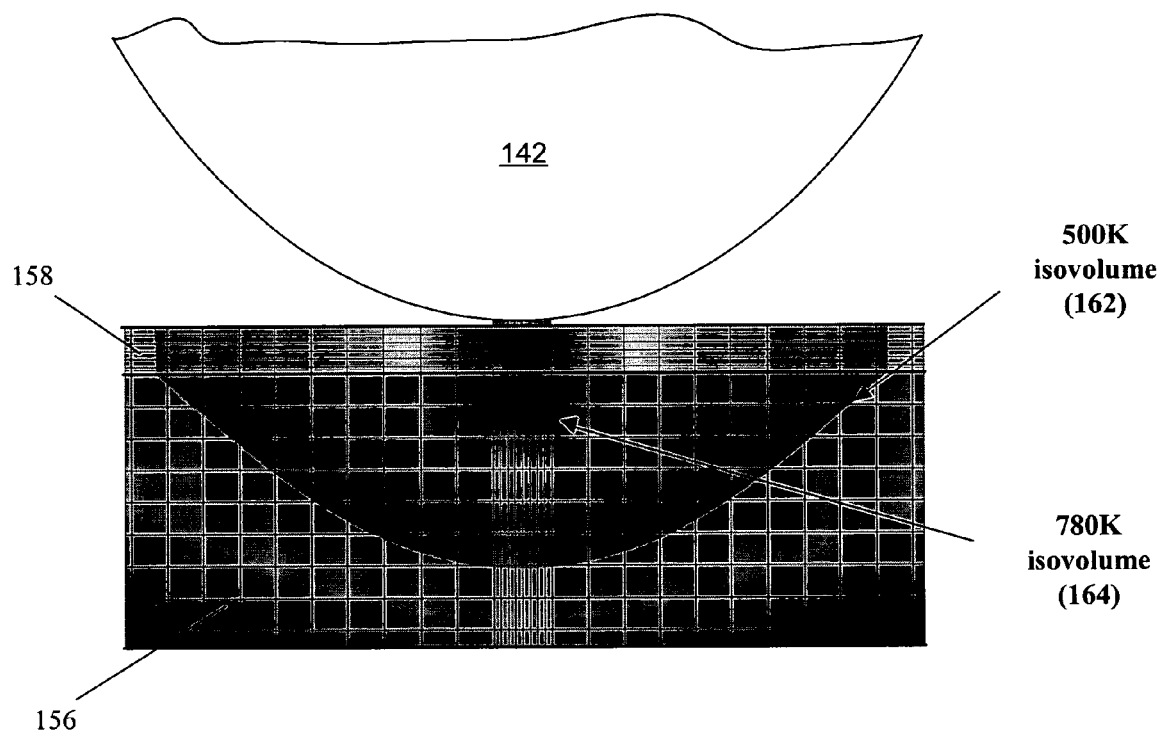
FIG. 3 illustrates heating characteristics of the media device of FIG. 1A.

The current passing from the tip 142 to the media device 150 heats the phase change material near the tip 142. The recording media 156, the over-layer 158, the recording media/over-layer interface and the tip/over-layer interface act as resistors. As the voltage potential across the media device 150 increases, the current increases, and the temperature of the phase change material increases. FIG. 3 is a first order model of the heating characteristics of an exemplary media device 150 as a voltage potential is applied across the media device 150 in accordance with an embodiment of the present invention. The exemplary media device 150 includes a film stack comprising a titanium nitride over-layer 158 deposited over a recording media 156 comprising phase change material. The heat generated by the current can be distributed in a substantially parabolic fashion from the contact or near contact point of the tip 142 and the surface of the media device 150. A small portion of the phase change material near the surface of the film stack (the first isovolume 164) is heated above 780 K, and the material surrounding the first isovolume 164 to the second isovolume 162 ranges from 780 K to 500 K. The portion of the phase change material heated above about 575 K, in one embodiment, becomes molten or semi-molten. If the bulk phase change media is disordered, the semi-molten/molten portion can be cooled slowly to form a crystalline structure having a relative resistivity orders of magnitude lower than a resistivity of the bulk phase change material. If the bulk phase change material has a crystalline structure, the semi-molten/molten portion can be quenched quickly, causing the semi-molten/molten portion to become predominantly disordered and to have a relative resistivity orders of magnitude higher than the resistivity of the bulk phase change material. The temperature achieved during heating, and the cooling characteristics depend on the composition of the phase change material, and can vary greatly.

As can be seen in FIG. 3, the portion of the recording media 156 heated to a molten state, and thereafter properly cooled to form a domain having a resistivity substantially different than the bulk phase change material can be substantially small in width relative to the radius of curvature of the tip 142. For example, where methods in accordance with the present invention are applied to create a voltage potential between the recording media 156 and the tip 142, it has been demonstrated that a tip 142 having an approximate radius of curvature ranging from 50 nm to 100 nm can produce a domain having a width of approximately 15 nm. The domain can be said to be "super resolved." Such super resolution can result in part from properties of the over-layer, which can be a material having anisotropic electrical conductivity (as described above) that conducts current better through the film rather than across the film. This property can focus electron flow near the center of the tip 142. Further, a portion of the phase change material near the center of the tip 142 is heated first, the portion consequently exhibiting lower resistance than the surrounding media, even the unheated crystalline material. Electron flow follows the lowest resistance, and thus the electron flow is further focused.

The amount of focusing of the current through the recording media 156 (and thus the size of the domain that results) can vary with the voltage potential across the recording media 156 and the pressure between the tip 142 and the surface of the media device 150. The voltage potential can determine the size of an air gap across which the current can arc, and current may or may not flow between the tip 142 and the recording media 156 where an air gap exists (i.e. where the tip is not in direct contact with the media due to curvature). The pressure applied by the tip 142 against the surface can likewise affect the portion of the tip 142 in direct contact with the surface and a size of the air gap where the tip curves away from the surface.

Once a domain has been defined within the recording media 156, the resistivity of the domain can be measured by applying a smaller voltage potential across the portion of the media device 150 including the domain (e.g., in one embodiment less than 1 volt) and measuring the current through the portion. The small voltage potential drives a small current, insufficient to heat the portion to a crystallization or threshold temperature. Thus, the resistance (and resistivity) of the portion including the domain can be measured without substantially heating the phase change material and causing the electrical characteristics of the phase change material to be altered.

A media device 150 can optionally include a lubricant 151 (see FIG. 1A) that is formed, deposited, adhered, or otherwise placed, positioned or applied over the over-layer 158. In some embodiments, the lubricant 151 can be a liquid, while in other embodiments, the lubricant 151 can be a non-liquid, such as molybdenum disulfide. In still other embodiments, the lubricant 151 can be a form of carbon. The lubricant 151 can be applied to an over-layer 158 using myriad different techniques. In an embodiment, the lubricant 151 can be deposited on the over-layer 158 using a deposition process. In another embodiment, the lubricant 151 can be sprayed onto the over-layer 158.

Figure 4B:
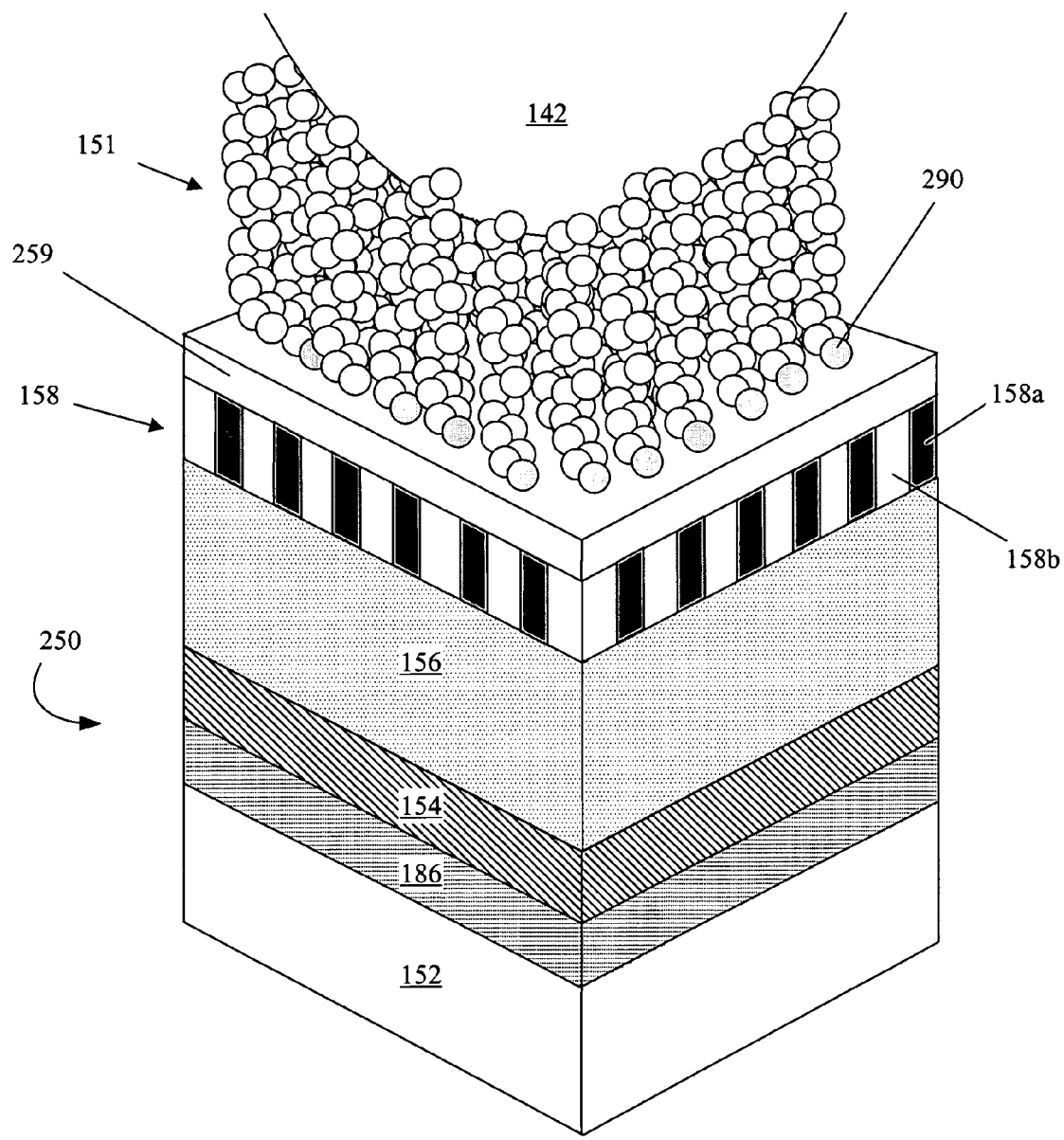
FIG. 4B is a perspective view of an embodiment of a lubricant disposed over an adhesion layer for use with media in accordance with the present invention.

Referring to FIGS. 4A and 4B, in a preferred embodiment the lubricant 151 is a monolayer comprising a plurality of polymer chains, the polymer chains being adapted to bond to the recording media 156, the over-layer 158 or alternatively some adhesion layer. Monolayers decrease wear and extend the operational lifetime of the tip and/or the media stack and improve parameters of the tip-media interface. In such embodiments, it can be preferable to dispose a lubricant adhesion layer 259, such as amorphous carbon, nitrogenated amorphous carbon, hydrogenated amorphous carbon, and DLC, over the recording media 156 or over the over-layer 158. Polymer chains can preferentially bond to the lubricant adhesion layer 259 to resist adhesion of the polymer chains to the contact (i.e., the tip 142) or to resist becoming displaced as a result of one or both of friction and stiction with the contact. As shown in FIG. 4B, the lubricant adhesion layer 259 can be disposed over a selectively conductive over-layer 158 so that shunting can be limited while providing a surface to which the polymer chains can preferentially bond. The polymer chains are further bonded at a proximal end 190,290 of the polymer chain and appear as hairs or cilia on the surface of the media device 150,250. The lubricant 151 and lubricant adhesion layer 259 preferably are sufficiently conductive so that current flow is not inhibited and heat is not excessively generated at the tip/lubricant/adhesion layer/over-layer interfaces. Alternatively, the lubricant 151 and lubricant adhesion layer 259 may be substantially non-conductive such that the current must tunnel through the lubricant 151 and lubricant adhesion layer 259.

In alternative embodiments, the lubricant 151 includes more than one layer of a plurality of polymer chains, the polymer chains from one layer being adapted to bond to the polymer chairs of another layer. Such lubricants 151 can have a layer that "floats" or moves over another lubricant layer disposed between the media surface and the "mobile" layer. The mobile layer can selectively bond to the adhesion layer 259 (or alternatively the recording media 156 or over-layer 158 where the adhesion layer 259 is not present) to heal defects in the surface caused by relative motion of a tip and the media.

In still further embodiments, it may be desired that the lubricant 151 be a monolayer having both bound and mobile phases. For example, Fomblin Z-DOL with additives is a lubricant system with bound and mobile phases that has traditionally been used as a lubricant on the surface of magnetizable disks of a hard disk drive (HDD). The lubricant limits damage caused when a read/write (R/W) head collides with a surface of a disk. Such lubricants are capable of providing self-healing surfaces that are effective at elevated temperatures. It has been demonstrated that monolayers having both bound and mobile phases resist wear better than bound monolayers. However, as discussed in "Thermal Stability of Fomblin Z and Fomblin Zdol Thin Films on Amorphous Hydrogenated Carbon" by Lei et al., *Tribology Letters*, Vol. 11, No. 1, 2001, incorporated herein by reference, desorption peaks of the mobile "non-bonded" lubricant occur at a lower temperature (e.g., 645K) than desorption peaks of the bound lubricant, which may or may not be undesirable where the phase change material must be heated above 600° C. to induce phase change. One of skill in the art will appreciate the myriad different lubricants that can be employed to provide a desired relationship between a tip and a media device 150, and the myriad different techniques for applying such lubricant 151.

Media Comprising Polarity-Dependent Memory Layer

Figure 5A:
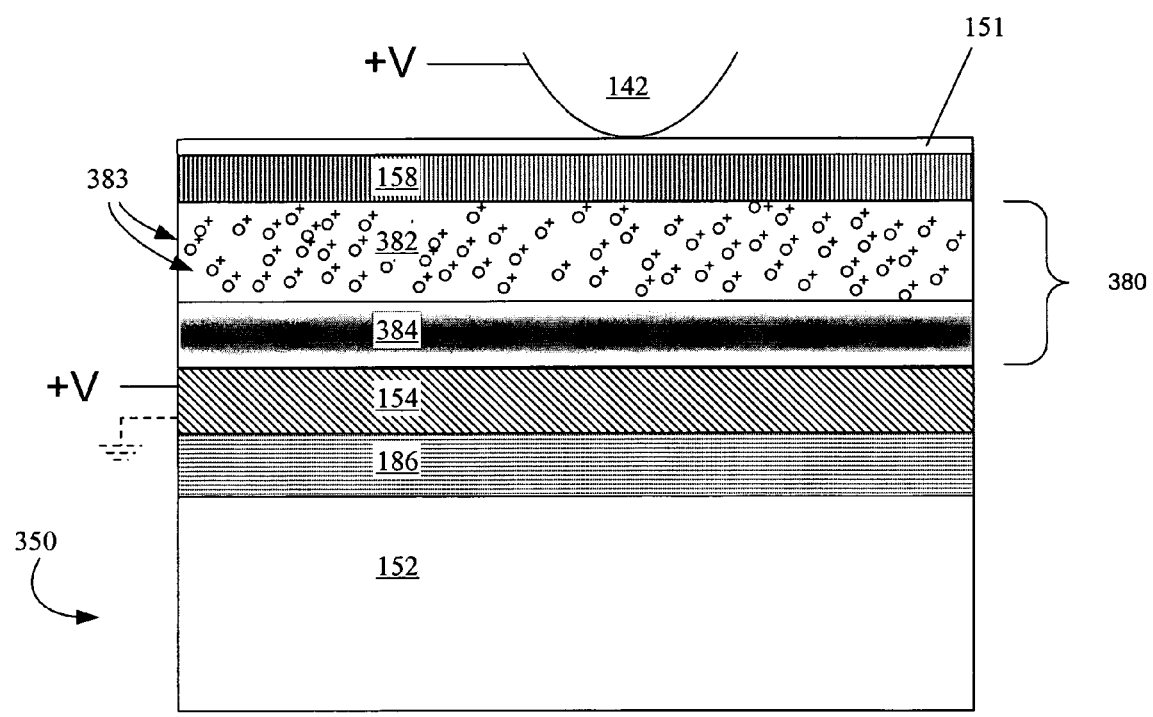
FIG. 5A is a cross-sectional view of a portion of an alternative embodiment of a media device in accordance with the present invention, the portion being in an unwritten state.
Figure 5B:
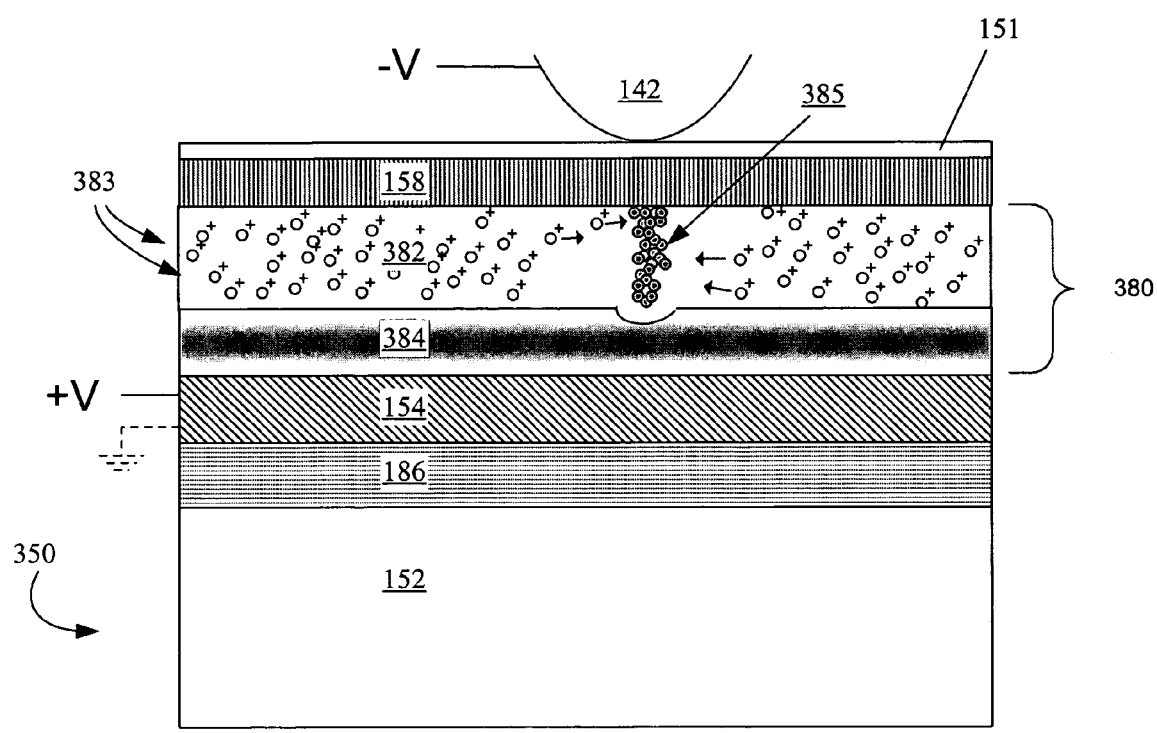
FIG. 5B is a cross-sectional view of the portion of FIG. 5A including a data bit.
Figure 5C:
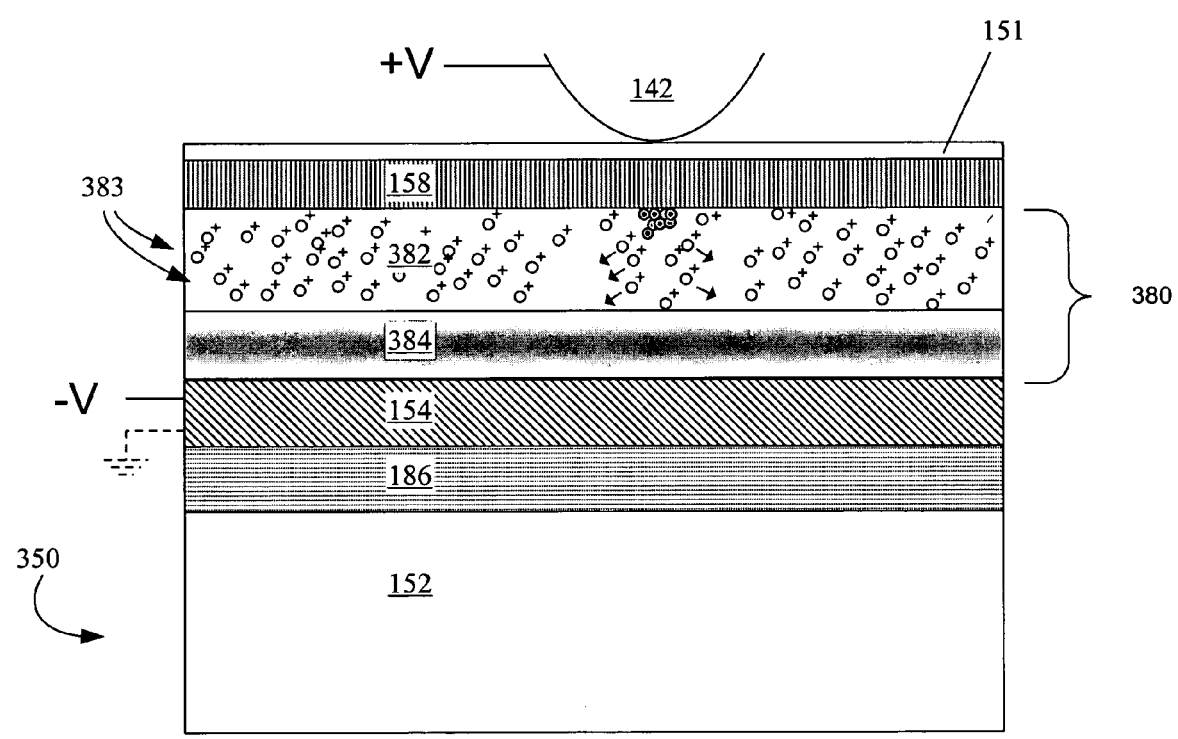
FIG. 5C is a cross-sectional view of the portion of FIG. 5B wherein the portion including the bit is erased so that the portion is in an unwritten state.

In other embodiments of a media device 350 for use with systems and methods in accordance with the present invention can include a recording media comprising a polarity-dependent memory layer 380. FIGS. 5A through 5C illustrate a media device 350 including a substrate 152, an optional insulating layer 186 disposed over the substrate 152, an under-layer (referred to as a bottom electrode when referencing embodiments including a polarity-dependent memory layer) 154 disposed over the insulating layer 186 (where present), a polarity-dependent memory layer 380 disposed over the bottom electrode 154, and an over-layer (referred to as a top electrode when referencing embodiments including a polarity-dependent memory layer) 158 disposed over the polarity-dependent memory layer 380.

As above, the substrate 152 can comprise silicon (Si), gallium arsenide (GaAs), or some other semiconductor material. In some applications, it can be desirable to ensure electrical and thermal isolation of the bottom electrode 154 and recording media from the substrate 152. To provide additional isolation, an insulating layer 186 can be disposed between the bottom electrode 154 and the substrate 152. The insulating layer 186 can be an oxide, such as silicon dioxide (SiO2), or some other material having thermal and electrical insulating properties. The bottom electrode 154 can comprise an electrically conductive metal, or some other material having similar electrical properties. In an embodiment, the bottom electrode 154 can comprise one or more of tungsten, platinum, gold, aluminum, and copper. It may be desired that the material chosen for forming the bottom electrode 154 further be chosen based on additional properties, such as adhesion characteristics, and uniformity of deposition, etc. One of skill in the art can appreciate the myriad different materials having good electrical conductivity and one or more favorable properties for forming the bottom electrode 154. The bottom electrode 154 should provide for good electrical conduction through the polarity-dependent memory layer 380, though it need not draw away heat as efficiently as in embodiments having a recording media comprising a phase change material. Much lower currents can be applied to the media device 350 where the polarity-dependent memory layer 380 is used, and the material is heated to a much lower temperature.

The top electrode 158 is disposed over the polarity-dependent memory layer 380. The top electrode 158 should provide an ion barrier to prevent unintentional migration of ions from the polarity-dependent memory layer 380 into the top electrode 158. As above, the top electrode 158 can be continuous or discontinuous. Where the top electrode 158 is continuous, the top electrode 158 preferably comprises a material that provides anisotropic resistivity characteristics and that is electrochemically inert when a voltage is applied across the media device 150. For example, as above, the top electrode 158 can include a co-deposited film comprising a conductive material such as a conductive metal oxide, and an insulating material, such as silicon dioxide. Electrical current is passed through the media device 150 from a tip 142 in contact with the top electrode 158, or in contact with a conductive layer disposed over the top electrode 158 (such as a lubricant 151).

The polarity-dependent memory layer 380 includes an ion source layer 384 and a solid electrolyte layer 382. Such polarity-dependent memory layers are described, for example, in "Non-Volatile Memory Based Solid Electrolytes" by Kozicki et. al, *Proceedings of the* 2004 *Non-Volatile Memory Technology Symposium,* 10-17 (2004), incorporated herein by reference. In a preferred embodiment, the ion source layer 384 comprises silver (Ag), however in other embodiments, the ion source layer 384 can comprise some other metal having mobile ions, such as copper (Cu). The solid electrolyte layer 382 is disposed over the ion source layer 384 and in the preferred embodiment comprises silver germanium sulfide (AgGeS) or silver germanium selenide (AgGeSe); however, in other embodiments, the solid electrolyte layer 382 can comprise some other metal chalcogenide exhibiting similar properties of metal ion mobility within a generally non-conductive matrix. Alternatively, the solid electrolyte layer 382 can comprise an oxide-based electrolyte such as silver tungsten oxide ($AgWO_3$) or copper tungsten oxide ($CuWO_3$). Such materials may or may not exhibit equally satisfactory results comparable to metal chalcogenides. In the preferred embodiment, the solid electrolyte layer 382 can be formed after deposition of the ion source layer 384 by depositing a chalcogenide layer such as GeS or GeSe over the ion source layer 384, and applying ultraviolet (UV) light to the material to diffuse Ag ions into the chalcogenide layer. Alternatively, Ag ions can be prompted to diffuse into the chalcogenide layer by annealing. Alternatively, the solid electrolyte layer 382 can comprise a co-deposited film sputtered from separate Ag and GeS or GeSe targets or the solid electrolyte layer 382 can be a co-deposited film sputtered from a single AgGeS or AgGeSe alloy target.

The solid electrolyte layer 382 can be useful in that positively charged metal ions 383 contained within the solid electrolyte layer 382 can be plentiful and highly mobile. Conversely, negatively charged counter-ions are fixed in the solid. Referring to FIG. 5B, the bottom electrode 154 acts as an anode (i.e., the positive electrode in an electrolytic circuit), and a positive voltage can be applied to the bottom electrode 154, or alternatively the bottom electrode 154 can be grounded. The top electrode 158 acts as a cathode (i.e., the negative electrode in the electrolytic circuit) and a negative voltage can be applied to the top electrode 158. An applied voltage as low as a few hundred mV will reduce ions to form metal atoms at the cathode (i.e., the top electrode 158) and put ions into the solid electrolyte layer 382 via oxidation at the ion source layer 384 arranged in electrical contact with the anode (i.e., the bottom electrode 154). Charge neutrality is maintained by balancing the oxidation and reduction via the ion source layer 384, preventing a charge build-up that would otherwise halt the electro-deposition process. The solid electrode layer 382 can be made to contain ions throughout the film. The ions near the top electrode 158 will move toward the top electrode 158 and be reduced first. Nucleation occurs at the top electrode 158 and the ions continue to be reduced from the nucleation site, where growth is favored as the source of the highest electrical field. A vein of reduced ions will extend out from the top electrode 158 toward the bottom electrode 384 forming a metallic filament 385 having a dendritic structure. In this way, the electro-deposition process effectively extends the top electrode 158 into the solid electrolyte layer 382. The resistivity of the filament 385 is many orders of magnitude lower than the bulk solid electrolyte layer 382, and once the filament 385 has grown from the top electrode 158 to the conductive ion source layer 384, the resistance of the media device 350 through the filament 385 drops significantly.

Referring to FIG. 5C, the electro-deposition process can be reversed, and the filament 385 "disassembled" by changing the polarity of the applied voltage bias, applying a positive voltage to the tip 142 and consequently the top electrode 158 and the filament 385. The filament 385 becomes the anode, dissolving by oxidation. The dissolved ions are returned to original source structures (i.e., the solid electrolyte layer 382 and the ion source layer 384). Disassembly of the filament 385 breaks a conductive link between the top electrode 158 and the bottom electrode 154, causing the resistance of the media device 350 through the portion formerly containing the filament 385 to increase significantly.

Use of a top electrode 158 having anisotropic electrical conductivity (e.g., a co-deposited film) and application of a small voltage potential across the recording media 380 (relative to a voltage potential applied to heat the phase change media 156) can allow for dense arrangement of filaments 385 in the recording media 380 by minifying the width of the filament 385 and the dendritic nature of the filament's structure. The small voltage potential can also reduce the amount of power consumed in the writing and reading process, simplifying the design of packaging, reducing the amount of battery power consumed by the writing and reading process in a portable device including such a media device 350, and potentially improving the operational life of the media device 350 by reducing thermal stresses.

As above, the media device 350 can optionally include a lubricant 151 that is formed, deposited, adhered, or otherwise placed, positioned or applied over the top electrode 158. In some embodiments, the lubricant 151 can be a liquid, while in other embodiments, the lubricant 151 can be a non-liquid, such as molybdenum disulfide. In still other embodiments, the lubricant 151 can be a form of carbon. The lubricant 151 can be applied to the top electrode 158 using myriad different techniques. In an embodiment, the lubricant can be deposited on the top electrode 158 using a deposition process. In another embodiment, the lubricant can be sprayed onto the top electrode 158. In a preferred embodiment the lubricant is a monolayer comprising a plurality of polymer chains, the polymer chains being adapted to bond to the top electrode 158. It can further be preferable to dispose a lubricant adhesion layer such as amorphous carbon, nitrogenated amorphous carbon, hydrogenated amorphous carbon, and DLC over the top electrode 158. The lubricant adhesion layer can be disposed over a selectively conductive top electrode 158 so that shunting can be limited while providing a surface to which the polymer chains can preferentially bond. In still further embodiments, it may be desired that the lubricant be a monolayer having both bound and mobile phase. One of skill in the art will appreciate the myriad different lubricants that can be employed to provide a desired relationship between a tip and a media device 350, and the myriad different techniques for applying such lubricant.

In other embodiments, the recording media can be a media other than a phase change material or a polarity-dependent memory layer. For example, the media device can be a charge storage-type media. Charge storage media stores data as trapped charges in dielectrics. Thus, for charge storage media, the media would be a dielectric material that traps charges when in a written state. Changing media back to an unwritten state simply requires the removal of the trapped charges. For instance, a positive current can be used to store charges in media. A negative current can then be used to remove the stored charges from media.

Patterned Media

Figure 6A:
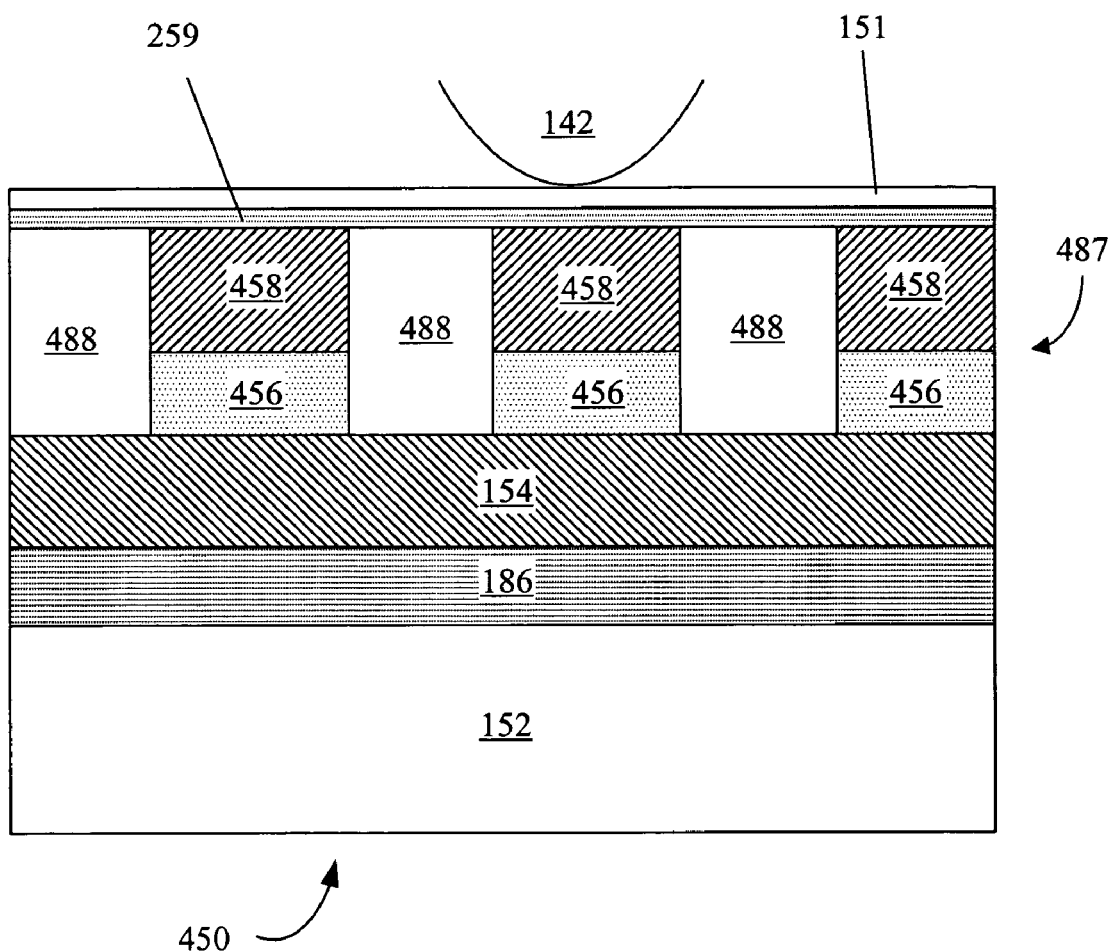
FIG. 6A is a cross-sectional view of a portion of still further embodiments of a media device in accordance with the present invention, the media device having isolated cells.
Figure 6B:
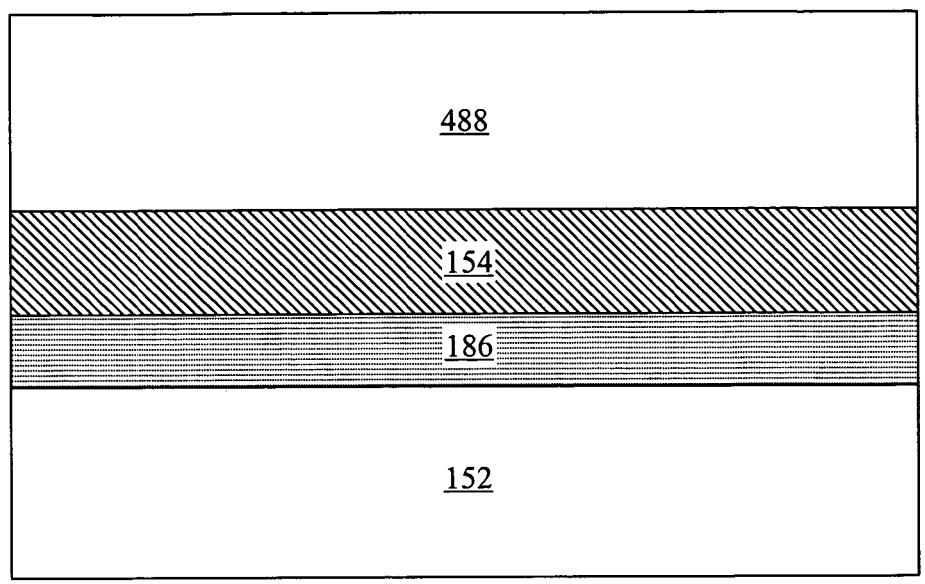
FIGS. 6B-6D are cross-sectional views of process steps of an embodiment of a method in accordance with the present invention for forming the media device of FIG. 6A.
Figure 6C:
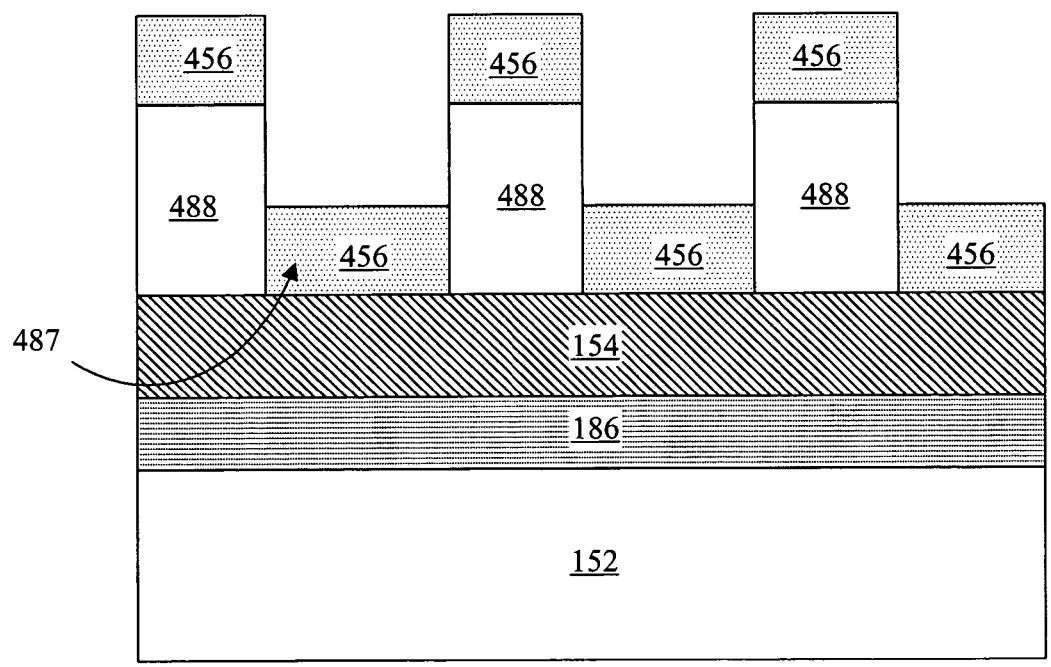
Figure 6D:
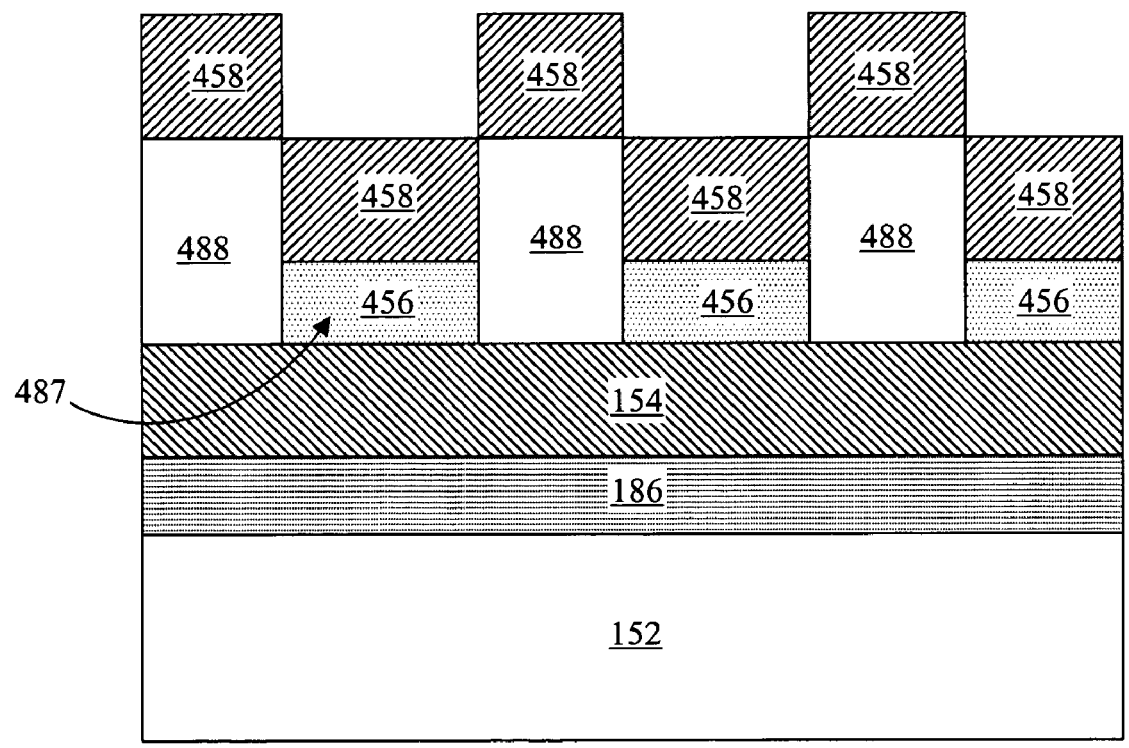
Figure 6F:
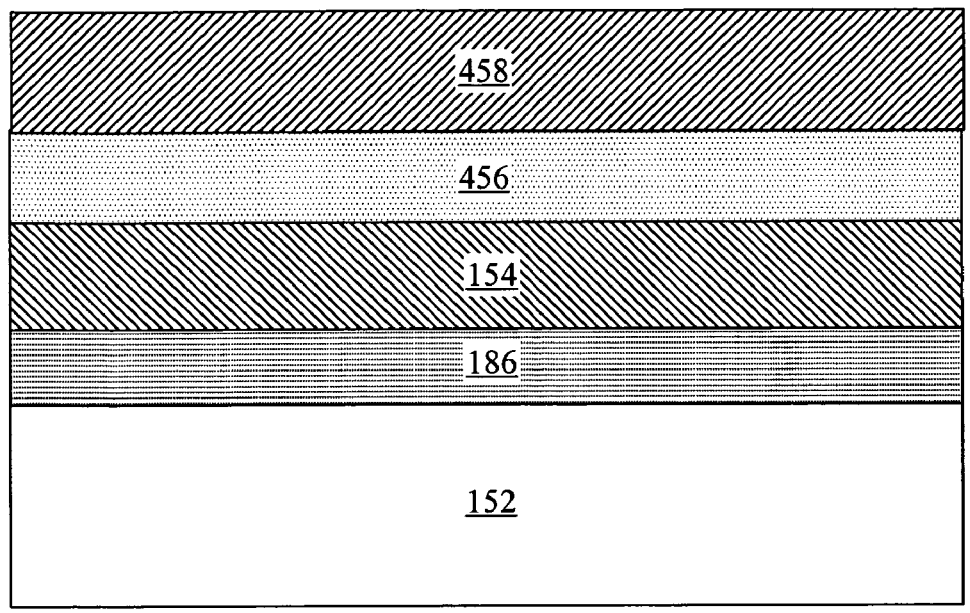
FIGS. 6F-6H are cross-sectional views of process steps of an alternative embodiment of a method in accordance with the present invention for forming the media device of FIG. 6A.
Figure 6G:
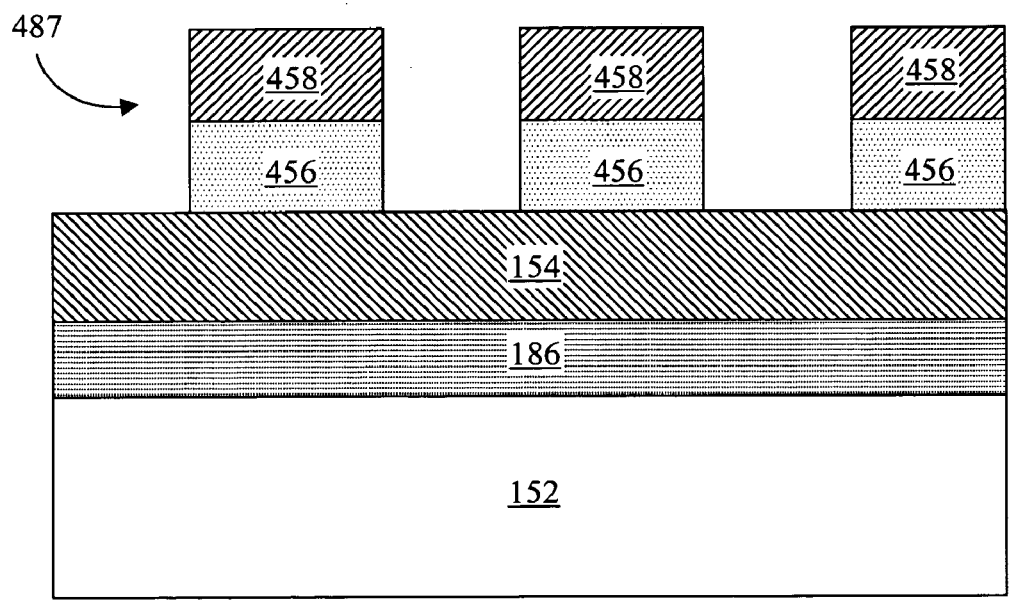
Figure 6H:
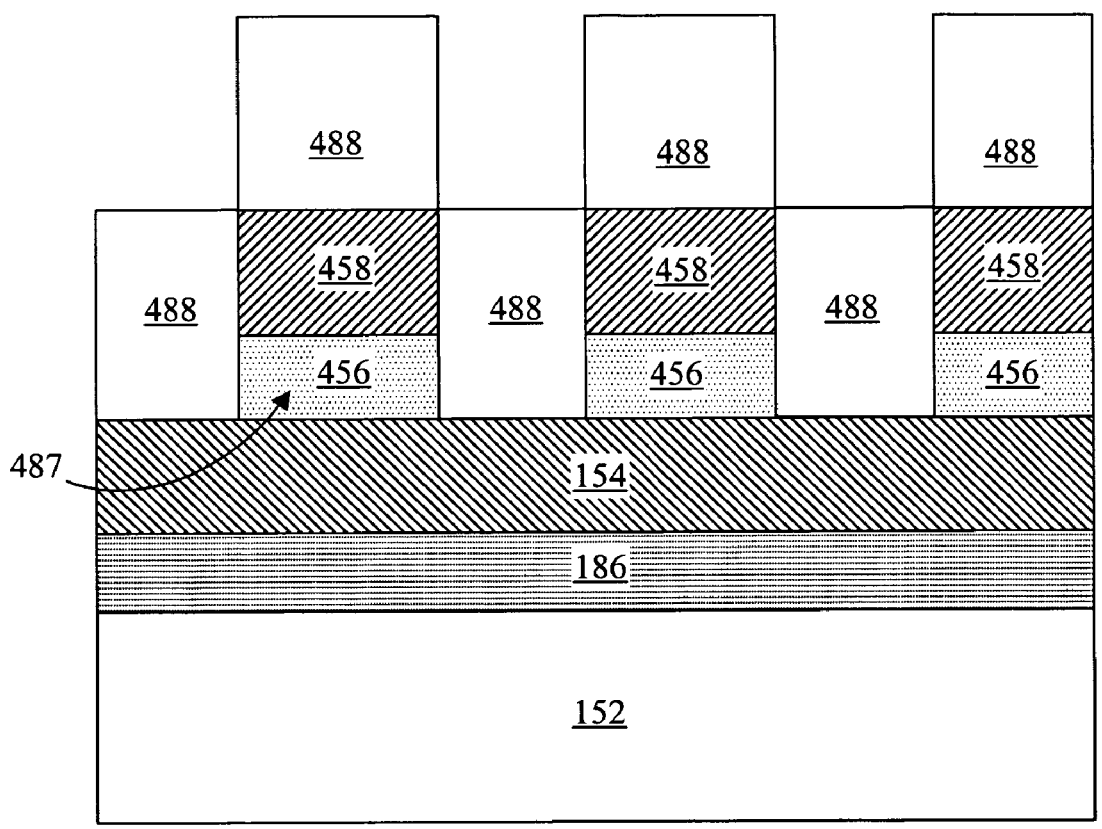
Figure 6I:
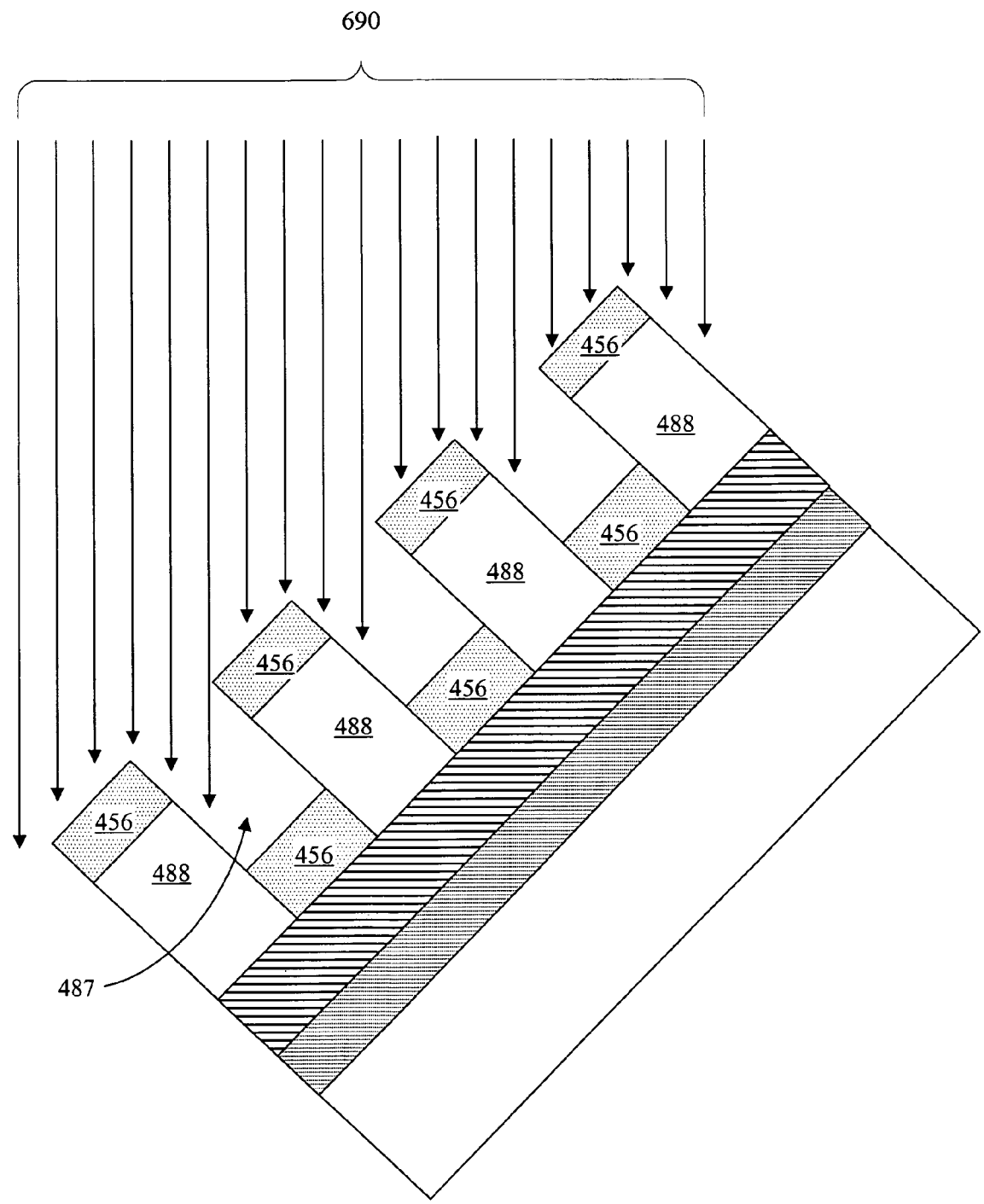
FIG. 6I illustrates an alternative technique for planarizing a surface of a film stack, the technique being usable in still another embodiment of a method in accordance with the present invention for forming the media device of FIG. 6A.
Figure 6J:
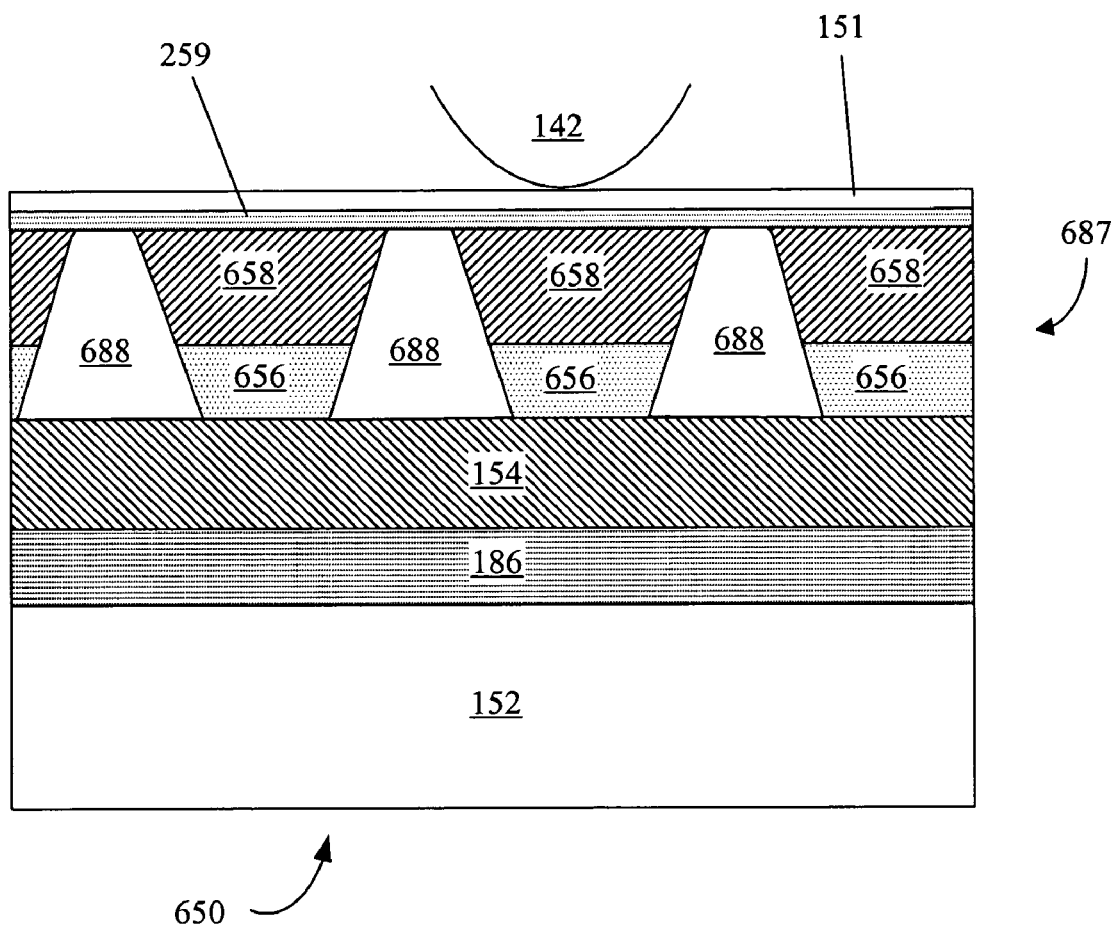
FIG. 6J is a cross-sectional view of a portion of a still further embodiment of a media device in accordance with the present invention, the isolated cells having tapered sidewalls.
Figure 7A:
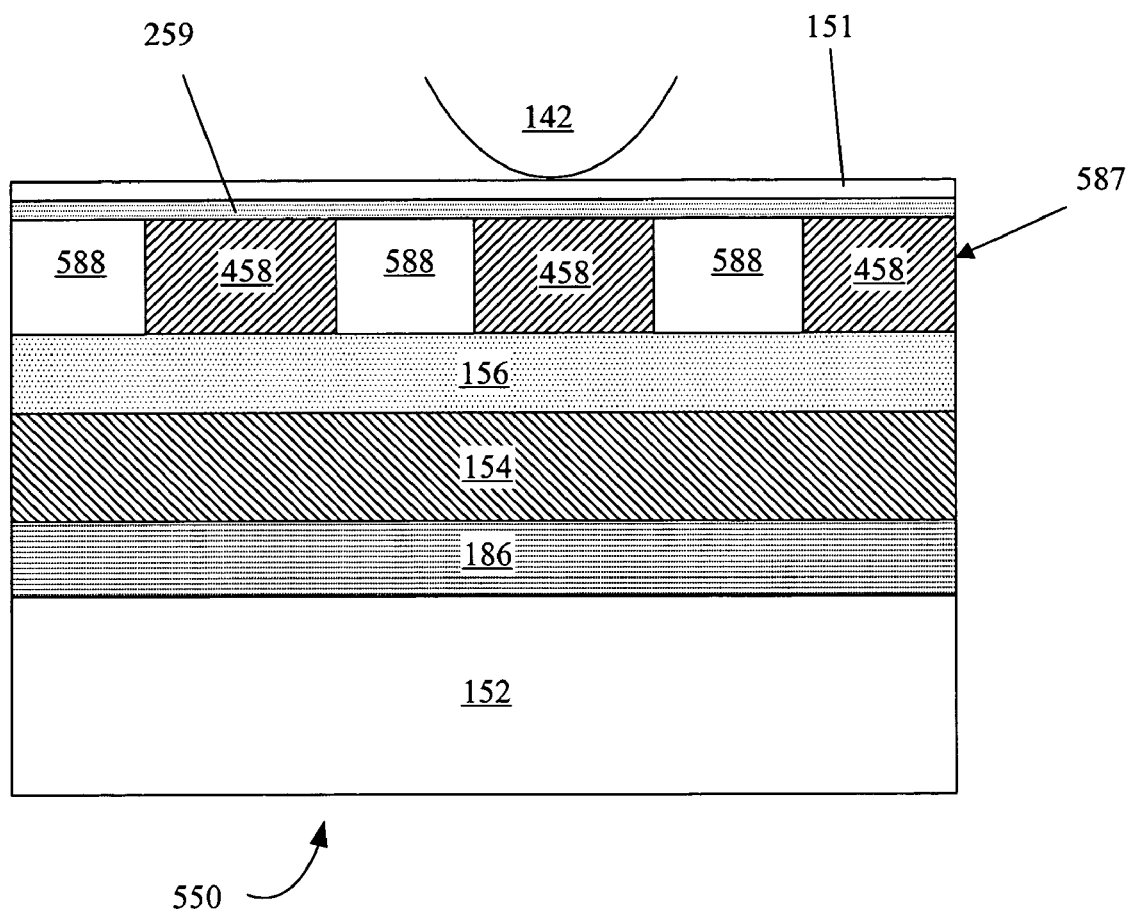
FIG. 7A is a cross-sectional view of a portion of an alternative embodiment of a media device in accordance with the present invention, the media device having isolated cells and a continuous recording media.

FIGS. 6A, 6J and 7A are cross-sections of patterned media devices for use with still further embodiments of systems and methods in accordance with the present invention. The media devices 450/550/650 include a substrate 152, an under-layer 154 disposed over the substrate 152, an optional insulating layer 186 disposed between the substrate 152 and the under-layer 154, a continuous or discontinuous layer of recording media 156/456/656 formed over the under-layer 154, a discontinuous over-layer 458/558/658 formed over the recording media 156/456/656, a lubricant 151 disposed over the surface of the media device 450/550/650, and optionally a lubricant adhesion layer 259 disposed between the lubricant 151 and the surface of the media device 450/550/650. As above, the substrate 152 can comprise silicon (Si), gallium arsenide (GaAs), or some other semiconductor material. The insulating layer 186 can optionally be included where it is desired that the under-layer 154 be insulated from the substrate 152. The insulating layer 186 can comprise one of an oxide and a nitride material, thereby insulating the media 156/456/656 from the substrate 152. The under-layer 154 can comprise a highly conductive material that draws heat away from the recording media 156/456/656 to facilitate fast cooling of the recording media 156/456/656. In an embodiment, the under-layer 154 can comprise tungsten, while in other embodiments the under-layer 154 can comprise one or more of platinum, gold, aluminum, and copper. In still other embodiments, the under-layer 154 can comprise some other material having high conductivity. It may be desired that the material forming the under-layer 154 further be chosen based on additional properties, such as thermal expansion characteristics, adhesion characteristics, and uniformity of deposition, etc. One of ordinary skill in the art can appreciate the myriad different materials having high conductivity and one or more favorable properties for forming the under-layer 154.

As can be seen in FIG. 6A, in an embodiment the media device 450 includes a plurality of cells 487 disposed within an inhibiting matrix 488. The inhibiting matrix 488 can comprise a material that inhibits the flow of current, such as a substantially electrically non-conductive material, or an electrically insulating material, or more specifically a dielectric. It can also be desired that the inhibiting matrix 488 inhibit thermal expansion, and therefore comprise a material that is thermally insulating. The plurality of cells 487 comprise a recording media 456 portion and an over-layer 458 portion. Thus it can be said that the recording media 456 is a discontinuous layer. As in the embodiment of FIG. 1A-1C, the recording media 456 can comprise a phase change material such as GST. As the recording media 456 is heated beyond some threshold temperature by driving current from a contact (i.e., a tip 142) through the recording media 456 and then quenched, the structure of some or all of the phase change material in the recording media 456 changes from a crystalline state to a disordered state. Conversely, if the phase change material is heated above some threshold and then allowed to cool slowly, the material will tend to re-crystallize. As a result of the change in structure of the phase change material, the resistivity of the recording media 456 changes. This resistivity change is quite large in phase change materials and can be easily detected by a tip 142 that is conductive or that includes a conductive coating by passing current through the tip 142 and the media device 450.

Further, it can be said that the over-layer 458 is a discontinuous layer. As above, the over-layer 458 can comprise a material selected to prevent physical damage to the recording media 456 and/or to the tip when the tip 142 contacts the over-layer 458. The over-layer 458 can comprise a material that is resistant to wear, thereby extending the lifetime of the over-layer 458 and/or the tip 142. It can be preferable that the over-layer 458 material exhibit wear characteristics similar to wear characteristics of the inhibiting matrix 488 so that undesired non-planarity does not develop through use of the media device 450. In a preferred embodiment, the over-layer 458 comprises a material having a high conductance, such as a conductive metal. The separation of the over-layer 458 by the inhibiting matrix 488 resists shunting of current applied to the over-layer 458, therefore the over-layer 458 need not have low lateral conductivity. However, where desired the over-layer 458 can comprise a material having a low conductance characteristic, and a high hardness characteristic. Alternatively, the over-layer 458 can comprise an anisotropic columnar material that conducts current more readily through a film than across a film, such as a co-deposited film as described above, or some metal nitride such as TiN or MoN having similar properties. Titanium nitride (TiN) is a hard material that conducts poorly.

In still other embodiments, the over-layer 458 can comprise an insulator. Where an insulator is used as an over-layer 458, current applied to the media device 450 from the tip 142 must tunnel through the over-layer 458 before reaching the recording media 456. Thus, in an embodiment, the over-layer 458 should be thin (relative to the recording media 456) so that the amount of tunneling required before a current can interact with the recording media 456 is minified. Again, use of an anisotropic columnar material, or an insulator in the over-layer 458 can be unnecessary because of the isolation of the over-layer 458.

As can be seen in FIG. 7A, in an alternative embodiment the plurality of cells 587 comprise the over-layer 458. In such embodiments, the plurality of cells 587 disposed within the inhibiting matrix 588 are disposed over a continuous recording media 156. As above, the over-layer 458 can comprise a material selected to prevent physical damage to the recording media 156 and/or to the tip 142 when the tip 142 contacts the over-layer 458.

As shown in FIGS. 6A and 7A, the media device 450/550 can optionally include a lubricant 151 comprising a continuous film over the surface of the media device 450/550. The lubricant 151 can be formed, deposited, adhered, or otherwise placed, positioned or applied over the surface of the media device 550. In some embodiments, the lubricant 151 can be a liquid, while in other embodiments, the lubricant 151 can be a non-liquid, such as molybdenum disulfide. In still other embodiments, the lubricant 151 can be a form of carbon. The lubricant 151 can be applied to the surface of the media device 450/550 using myriad different techniques. In an embodiment, the lubricant 151 can be deposited on the surface of the media 450/550 using a deposition process. In another embodiment, the lubricant 151 can be sprayed onto surface of the media 450/550.

In a preferred embodiment a lubricant adhesion layer 259, for example amorphous carbon, nitrogenated amorphous carbon, hydrogenated amorphous carbon, and DLC, is disposed between the lubricant 151 and the surface of the media device 450/550. The lubricant 151 is a monolayer comprising a plurality of polymer chains, the polymer chains being adapted to bond to the lubricant adhesion layer 259. Polymer chains can preferentially bond to the lubricant adhesion layer 259 to resist adhesion of the polymer chains to a contact (i.e., the tip 142) or to resist becoming displaced as a result of one or both of friction and stiction. The lubricant adhesion layer 259 provides a uniform surface to which the lubricant 151 can bond.

In still further embodiments, it may be desired that the lubricant 151 be a monolayer having both bound and mobile phase, for example Fomblin Z-DOL with additives. As described above, such lubricants are capable of providing self-healing surfaces that are effective at elevated temperatures. One of skill in the art will appreciate the myriad different lubricants that can be employed to provide a desired relationship between a tip 142 and the media device 450/550, and the myriad different techniques for applying such lubricant 151.

The media device 450/550 can be formed using traditional semiconductor manufacturing processes for depositing or growing layers of film in sequence using deposition chambers (e.g., chemical vapor deposition (CVD) chambers, plasma vapor deposition (PVD) chambers) and/or furnaces, for instance. For example, referring to the media device 450 of FIG. 6A, the insulating layer 186, the under-layer 154 are formed over the substrate 152. One of an insulating material (FIG. 6B) and both the recording media and the over-layer (FIG. 6F) is formed over the stack. Referring to FIG. 6C, where the insulating material is formed over the stack, the insulated material is patterned and etched to form an inhibiting matrix 488 having vias. The vias are then subsequently filled by successive forming of the recording media material and the over-layer, resulting in the plurality of cells 487 (FIGS. 6C and 6D). Alternatively as shown in FIG. 6G, where both the recording media and the over-layer are formed over the stack the recording media and over-layer are patterned and etched to form cells 487. The underlayer 154 not disposed beneath the cells 487 is exposed. A material having insulating properties is deposited or otherwise formed over the exposed underlayer 154, resulting in the inhibiting matrix 488 (FIG. 6H). The surface of the media device 450/550 can be substantially planarized by chemical-mechanical polishing (CMP), for example after deposition steps (FIGS. 6C, 6D, and 6H). Referring to FIG. 6D, the CMP step removes excess over-layer material 458 on top of the insulating matrix 488. In the alternative process illustrated in FIGS. 6F-6H the CMP step is used to remove excess insulating material 488 on top of the over-layer 458 (as shown in FIG. 6H). The lubricant adhesion layer 259 and the lubricant 151 are then formed over the planarized surface of the media device 450.

Alternatively, the media device 450 can be planarized by dry etching or ion milling rather than CMP.

Referring to FIG. 6I, ion milling can be effectively performed to remove recording media material 456 from the top of the insulating matrix 488. This process has some benefits, for example where GST is the recording media, because of the relatively high selectivity of ion milling processes to oxide/nitride when removing GST. For example, where the aspect ratio of the width to the height of each cell is 1 to 1, the media device 450 can be arranged at an angle of 45 degrees or larger relative to the angle of incidence of the ions that strike the media device 450 during processing. The sidewalls of the cells 487 will mask the GST within the cells 487 from ion bombardment, preventing etching of GST within the cell 487 while removing GST deposited over the inhibiting matrix 488. Ion milling can replace the CMP step following deposition of GST in a via, as shown in FIG. 6I and occurring between steps illustrated in FIGS. 6C and 6D. When the aspect ratio of the width to the height of each cell differs from 1:1, then the angle between the normal to the surface of the media device 450 and the direction of ion milling beam 690 can be adjusted accordingly to provide protection of the GST deposited in the cavities.

Figure 7B:
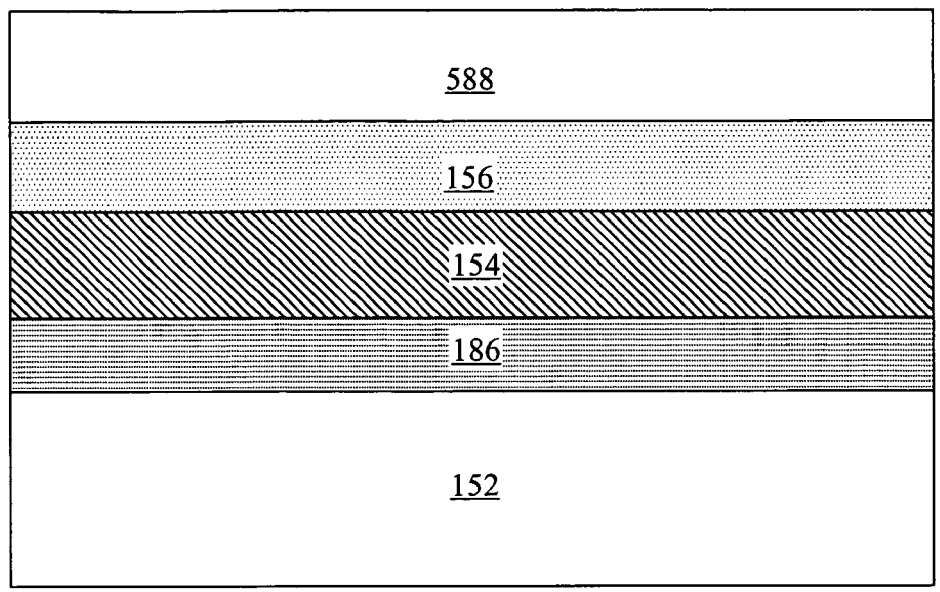
FIGS. 7B and 7C are cross-sectional views of process steps of an embodiment of a method in accordance with the present invention for forming the media device of FIG. 7A.
Figure 7C:
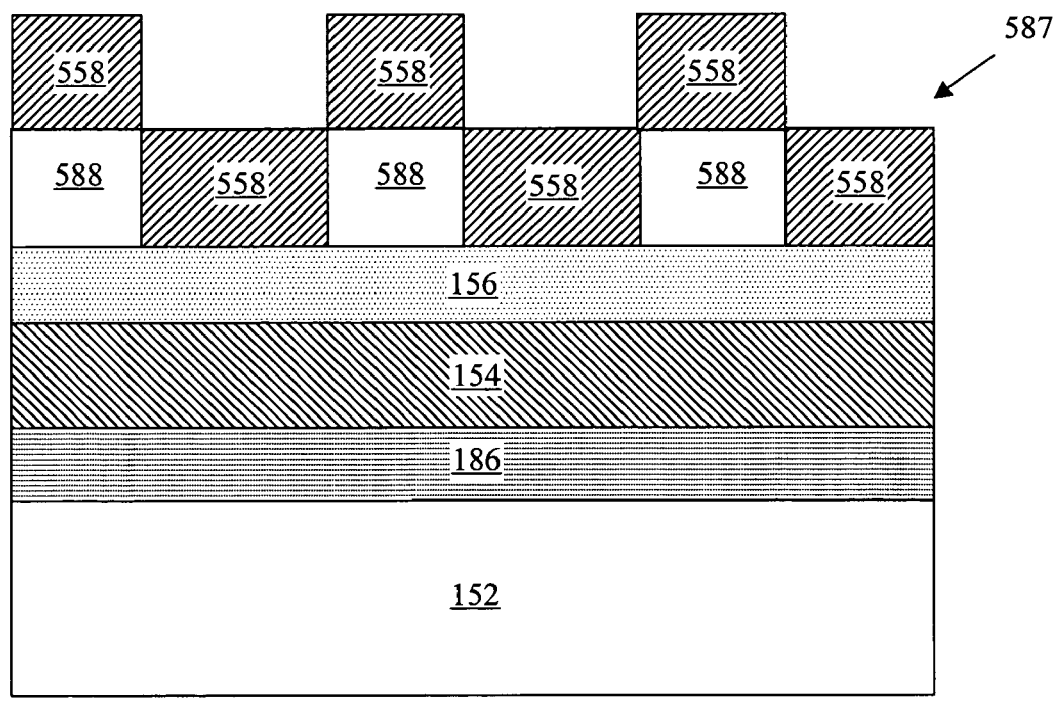
Figure 7D:
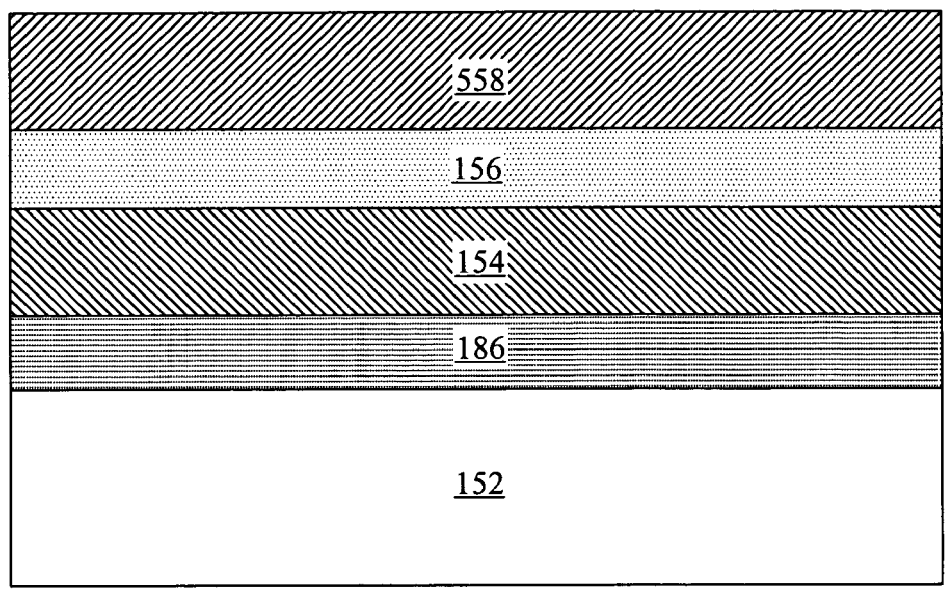
FIGS. 7D and 7E are cross-sectional views of process steps of an alternative embodiment of a method in accordance with the present invention for forming the media device of FIG. 7A.
Figure 7E:
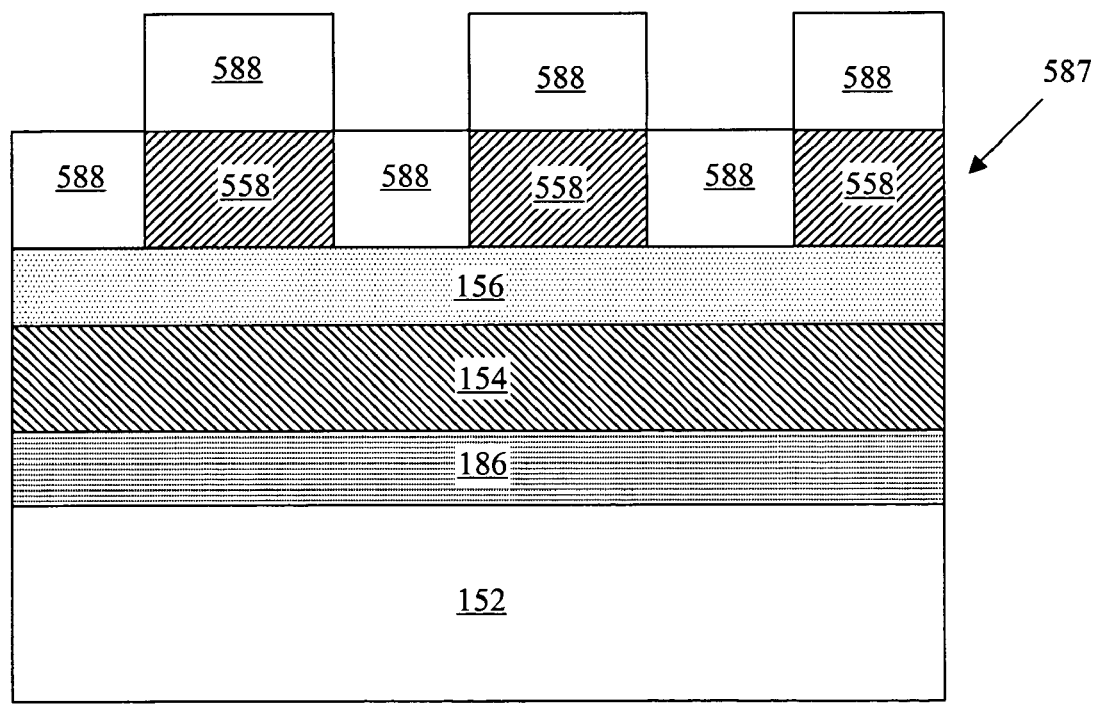

Referring to the media device 550 of FIG. 7A, the insulating layer 186, the under-layer 154, and the recording media 156 are formed over the substrate 152 as continuous layers. Referring to FIGS. 7B and 7C, where an insulating material is then formed over the stack (FIG. 7B), the insulated material is patterned and etched to form an inhibiting matrix 588 having vias. The vias are then subsequently filled by forming the over-layer 558 within the vias, creating the plurality of cells 587. Alternatively, where the over-layer 558 is formed over the stack (FIG. 7D), the over-layer 558 is patterned and etched to form cells 587. The recording media 156 not disposed beneath the remaining over-layer 558 is exposed. Referring to FIG. 7E, a material having insulating properties is deposited or otherwise formed over the exposed recording media 156 to form the inhibiting matrix 588. The surface of media can be substantially planarized by CMP. The lubricant adhesion layer 259 and the lubricant 151 are then formed over the planarized surface of the media device 550.

As shown in FIGS. 6A and 7A, the interface between the inhibiting matrix 488/588 and the cells 487/587 is a sidewall having substantially vertical walls. Such substantially vertical walls are formed by an anisotropic etch process, such as by reactive ion etching (RIE). One of skill in the art can appreciate the myriad different techniques for forming a media device 450/550 having approximately vertical sidewalls. However, referring to FIG. 6J it can be desirable to form sidewalls having a slope less than vertical (i.e., approximately 90 degrees) so that the cells 687 taper at the under-layer 154. In a preferred embodiment, the width of the cell 687 is 30 nm on the top (i.e., nearest the cell/tip interface, cell/lubricant, or cell/over-layer interface) and the stack thickness of the cell 687 is 50 nm, while the pitch between the cells 687 is roughly 50 nm. A minimum sidewall angle can be defined as an angle formed such that the recording media 656 and the under-layer 154 have sufficient electrical contact. For example, in an embodiment, the cells 687 can taper at most 16 degrees. Forming sidewalls with tapers in semiconductor structures is known in other technologies to be achievable by a number of different techniques, including nano-imprinting lithography (NIL), reducing photoresist thickness and reducing selectivity to the insulating material.

The current through the cell 687 is focused by the shape of the cell 687. Such current focusing can increase signal contrast, increasing the robustness of multi-bit recording, for example. Further, because the cell 687 tapers near the interface of the recording media 656 and the under-layer 154, the dielectric is thicker between the portion of the cells including the recording media 656 relative to the portion of the cells including over-layer 658. A higher ratio of cross-sectional area of insulating material to cross-sectional area of recording media 656 can mean potentially lower thermal interference.

Defining patterns in the media device 450/550/650 requires a technique for delineating features less than 0.1 um in dimension. In preferred embodiments, a class of process techniques known as nano-imprinting lithography (NIL) can be applied to define required patterns for the media device 450/550/650. Nano-scale alignment may not be required in structures and fabrication methods where NIL process techniques are employed. NIL process techniques can include thermal NIL, UV-NIL, or step-flash imprinting lithography (SFIL). Such process techniques are capable of resolving features having dimensions smaller than 10 nm, with reasonable throughput at reasonable cost. A mold for applying such techniques can be fabricated, for example, with electron beam ("e-beam") lithography or ion-beam lithography. In other embodiments, patterns can be transferred to the media device 450/550/650 using some other process technique or class of process techniques, including optical lithography techniques. Such techniques include extreme ultraviolet lithography (EUVL), X-ray lithography, e-beam lithography, and ion beam lithography. Where multi-bit recording is used, the density of the pattern is less relevant, and the pattern transfer technique applied can be chosen based on some factor other than feature width, such as uniformity and yield. One of skill in the art will appreciate the limitations and benefits of applying the different techniques for transferring patterns to the media device 450/550/650 and can appreciate the variations that can be applied to such techniques. Such variations are contemplated as being within the scope of the present invention.

Figure 8A:
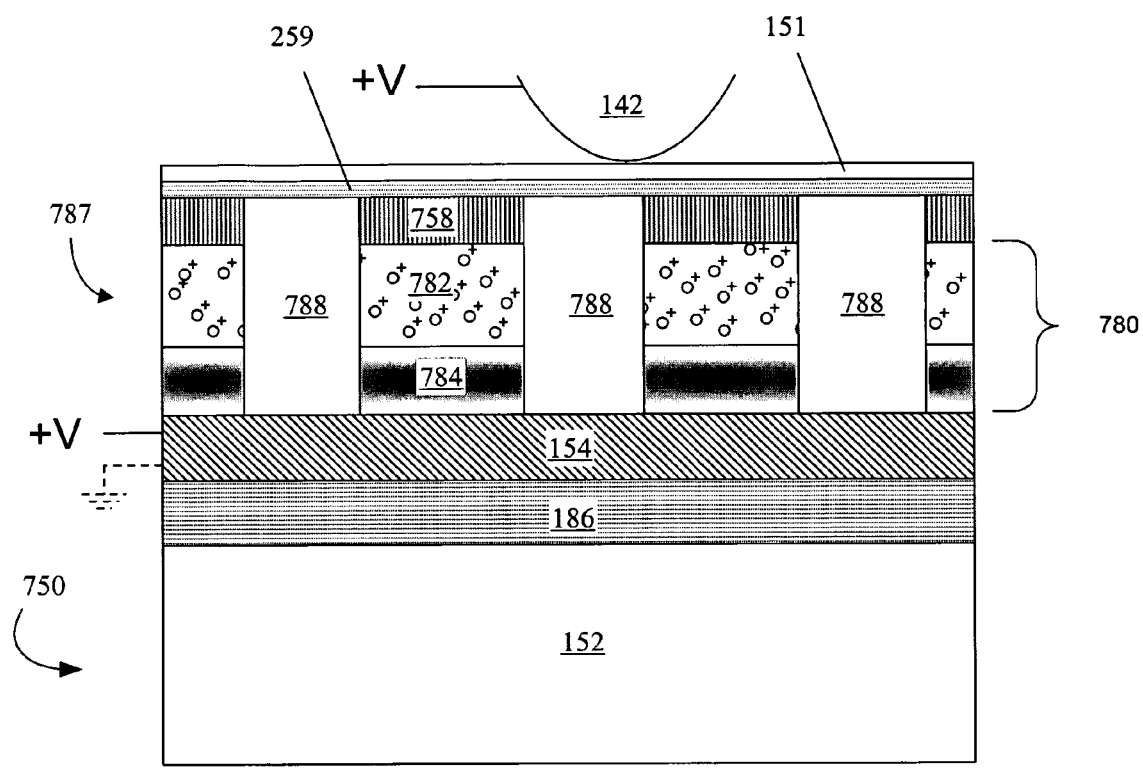
FIG. 8A is a cross-sectional view of a portion of an alternative embodiment of a media device in accordance with the present invention, the media device having isolated cells including a recording media comprising a polarity-dependent memory layer.
Figure 8B:
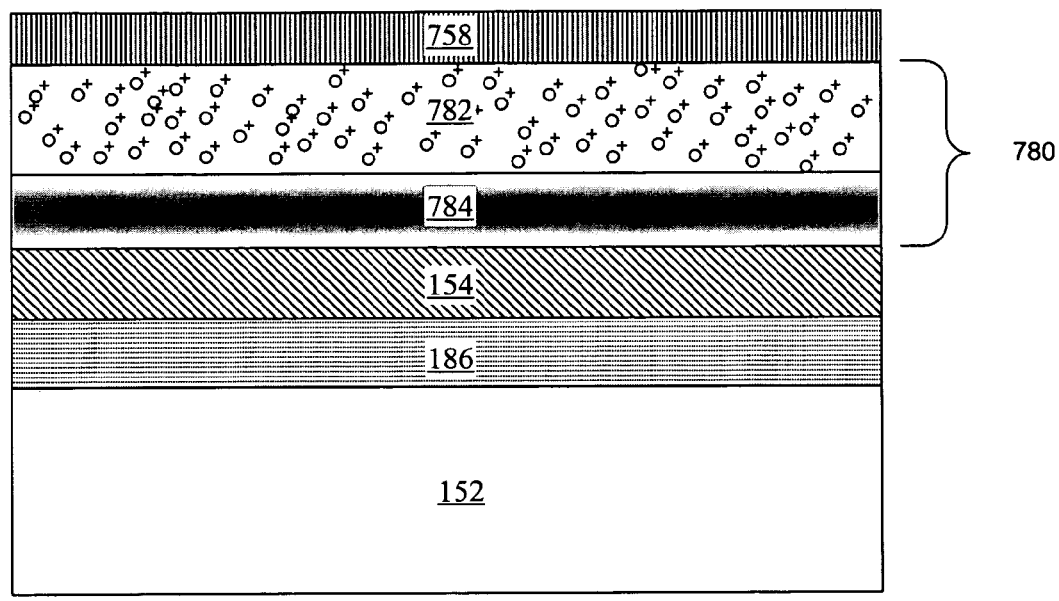
FIGS. 8B and 8C are cross-sectional views of process steps of an embodiment of a method in accordance with the present invention for forming the media device of FIG. 8A.
Figure 8C:
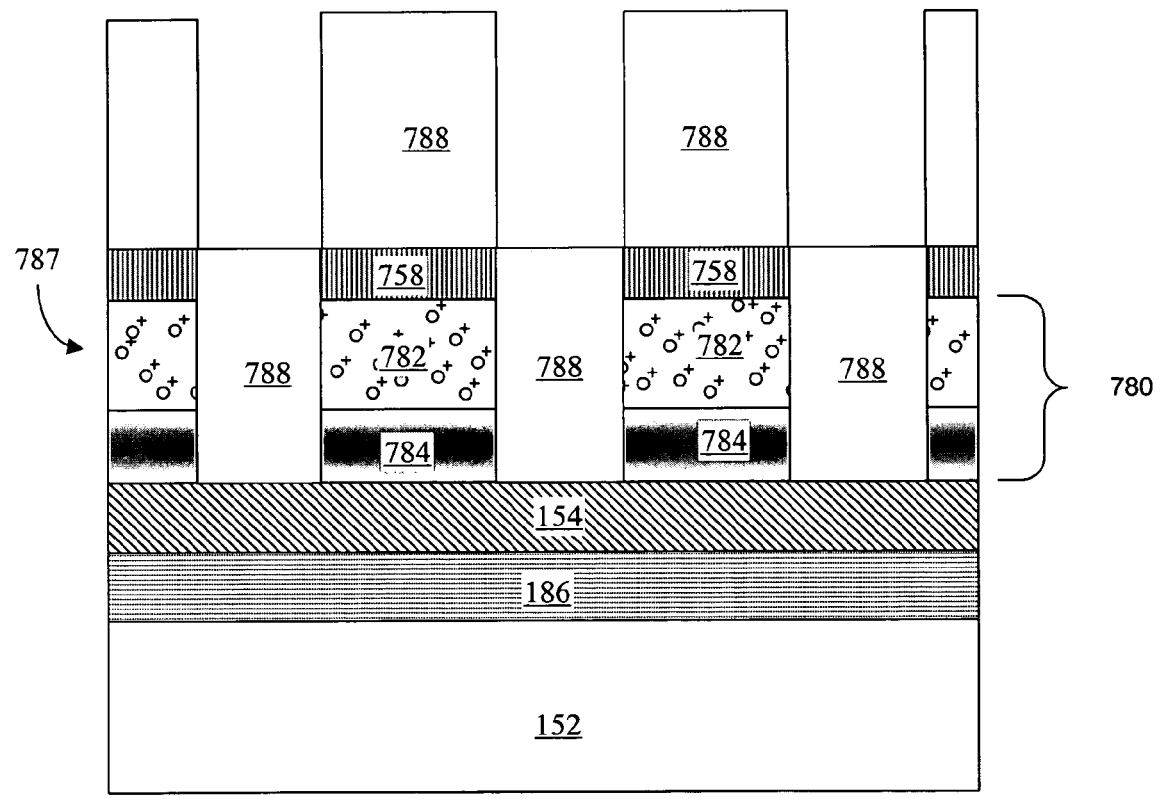

FIGS. 8A-8C are cross-sections of patterned media devices for use with still further embodiments of systems and methods in accordance with the present invention. The media devices 750/850 include a substrate 152, an optional insulating layer 186 disposed over the substrate 152, a continuous under-layer 154 (i.e., bottom electrode) disposed over the substrate 152 and the insulating layer 186 (where present), a discontinuous layer of recording media 780/880 formed over the under-layer 154, a discontinuous over-layer 758/858 (i.e., top electrode) formed over the recording media 780/880, a lubricant 151 disposed over the surface of the media device 750/850, and optionally a lubricant adhesion layer 259 disposed between the lubricant 151 and the surface of the media device 750/850. As above, the substrate 152 can comprise silicon (Si), gallium arsenide (GaAs), or some other semiconductor material. The insulating layer 186 can optionally be included where it is desired that the bottom electrode 154 be insulated from the substrate 152. The insulating layer 186 can comprise one of an oxide and a nitride material, or some other material having thermal and electrical insulating properties, thereby insulating the recording media 780/880 from the substrate 152.

Referring to FIG. 8A, in an embodiment the media device 750 includes a plurality of cells 787 disposed within an inhibiting matrix 788, the plurality of cells 887 comprise the polarity-dependent memory layer 780 and the top electrode 758. In such embodiments, the plurality of cells 887 and the inhibiting matrix 888 are disposed over a continuous bottom electrode 154. In an embodiment, the bottom electrode 154 can comprise one or more of tungsten, platinum, gold, aluminum, and copper. It may be desired that the material chosen for forming the bottom electrode 154 further be chosen based on additional properties, such as adhesion characteristics and uniformity of deposition, etc. One of ordinary skill in the art can appreciate the myriad different materials having good electrical conductivity and one or more favorable properties for forming the bottom electrode 154. The bottom electrode 154 should provide for good electrical conduction through the polarity-dependent memory layer 780, though it need not draw away heat as efficiently as in embodiments where the recording media comprises a phase change material. Much lower currents can be applied to the media device 750 where the polarity-dependent memory layer 780 is used as the recording media, and the material is heated (incidentally) to a much lower temperature. The polarity-dependent memory layer 780 is a discontinuous layer that includes an ion source layer 784 and a solid electrolyte layer 782. The ion source layer 784 and the solid electrolyte layer 782 can comprise materials as described above with reference to FIGS. 5A-5C. As above, the bottom electrode 154 acts as an anode (i.e., the positive electrode in an electrolytic circuit), and a positive voltage can be applied to the bottom electrode 154, or alternatively the bottom electrode 154 can be grounded. As shown in FIG. 8A, the solid electrolyte layer 782 is disposed over the ion source layer 784. However, in other embodiments, the ion source layer 784 can be disposed over the solid electrolyte layer 782. For convenience, only the embodiment of FIGS. 8A (and 8D below) will be discussed, though one of ordinary skill in the art will appreciate alternative arrangements of the polarity-dependent memory layer 780/880.

The top electrode 758 is a discontinuous layer disposed over the polarity-dependent memory layer 780. The top electrode 758 should provide an ion barrier to prevent unintentional migration of ions from the polarity-dependent memory layer 780 into the top electrode 758. As above, the top electrode 758 can comprise a material selected to prevent physical damage to the recording media 780 and/or to the tip when the tip 142 contacts the top electrode 758. The top electrode 758 can comprise a material that is resistant to wear, thereby extending the lifetime of the top electrode 758 and/or the tip 142. In a preferred embodiment, the top electrode 758 comprises a material having a high conductance, such as, for example, a refractory metal (e.g., molybdenum, indium, platinum, iridium and iridium oxide, etc.). However, the class of materials need not necessarily be defined by the maximum temperature of the media device because an indicia in a polarity-dependent memory layer is not exclusively, or typically, a result of a temperature dependent process. The separation of the cells 787 by the inhibiting matrix 788 resists shunting of current applied to the top electrode 758, therefore the top electrode 758 need not comprise a material having low lateral conductivity. However, where desired the top electrode 758 can comprise a material having a low conductance characteristic, and a high hardness characteristic. Alternatively, the top electrode 758 can comprise an anisotropic columnar material that conducts current more readily through a film than across a film, such as a co-deposited film as described above, or some metal nitride such as TiN or MoN having similar properties. Titanium nitride (TiN) is a hard material that conducts poorly.

As above, the media device 750 can optionally include a lubricant 151 comprising a continuous film over the surface of the media device 750. The lubricant 151 can be formed, deposited, adhered, or otherwise placed, positioned or applied over the surface of the media device 750. In some embodiments, the lubricant 151 can be a liquid, while in other embodiments, the lubricant 151 can be a non-liquid, such as molybdenum disulfide. In still other embodiments, the lubricant 151 can be a form of carbon. The lubricant 151 can be applied to the surface of the media device 750 using myriad different techniques. In an embodiment, the lubricant 151 can be deposited on the surface of the media device 750 using a deposition process. In another embodiment, the lubricant 151 can be sprayed onto surface of the media device 750.

In a preferred embodiment a lubricant adhesion layer 259, for example amorphous carbon, nitrogenated amorphous carbon, hydrogenated amorphous carbon, and DLC, is disposed between the lubricant 151 and the surface of the media device 750. The lubricant 151 is a monolayer comprising a plurality of polymer chains, the polymer chains being adapted to bond to the lubricant adhesion layer 259. Polymer chains can preferentially bond to the lubricant adhesion layer 259 to resist adhesion of the polymer chains to a contact (i.e., the tip 142) or to resist becoming displaced as a result of one or both of friction and stiction. The lubricant adhesion layer 259 provides a uniform surface to which the lubricant 151 can bond.

In still further embodiments, it may be desired that the lubricant 151 be a monolayer having both bound and mobile phase, for example Fomblin Z-DOL with additives. As described above, such lubricants are capable of providing self-healing surfaces that are effective at elevated temperatures. One of skill in the art will appreciate the myriad different lubricants that can be employed to provide a desired relationship between a tip 142 and the media device 750/850, and the myriad different techniques for applying such lubricant 151.

The media device 750 can be formed using traditional semiconductor manufacturing processes for depositing or growing layers of film in sequence using deposition chambers (e.g., chemical vapor deposition (CVD) chambers, plasma vapor deposition (PVD) chambers) and/or furnaces, for instance, and etching patterns within selected layers of film to form discontinuous layers. For example, referring to the media device 750 of FIG. 8A, the insulating layer 186 and the bottom electrode 154 are formed over the substrate 152 as continuous layers. One of an insulating material and both the polarity-dependent memory layer 780 and the top electrode 758 is formed over the bottom electrode 154. Referring to FIGS. 8B and 8C, in a preferred embodiment the polarity-dependent memory layer 780 and the top electrode 758 are formed over the bottom electrode 154. The polarity-dependent memory layer 780 and the top electrode 758 are patterned and etched to form cells 787. The underlayer 154 not disposed beneath the cells 787 is exposed. A material having insulating properties is deposited or otherwise formed over the exposed underlayer 154, resulting in the inhibiting matrix 788. Alternatively, where the insulating material is formed over the bottom electrode 154, the insulated material is patterned and etched to form an inhibiting matrix 788 having vias. The vias are then subsequently filled by successive forming of the polarity-dependent memory layer 780 (which requires multiple processing steps as discussed above) and the top electrode 758 to form the plurality of cells 787. The surface of the media device 750 can be substantially planarized by CMP. The lubricant adhesion layer 259 and the lubricant 151 are then formed over the planarized surface of the media device 750.

Figure 8D:
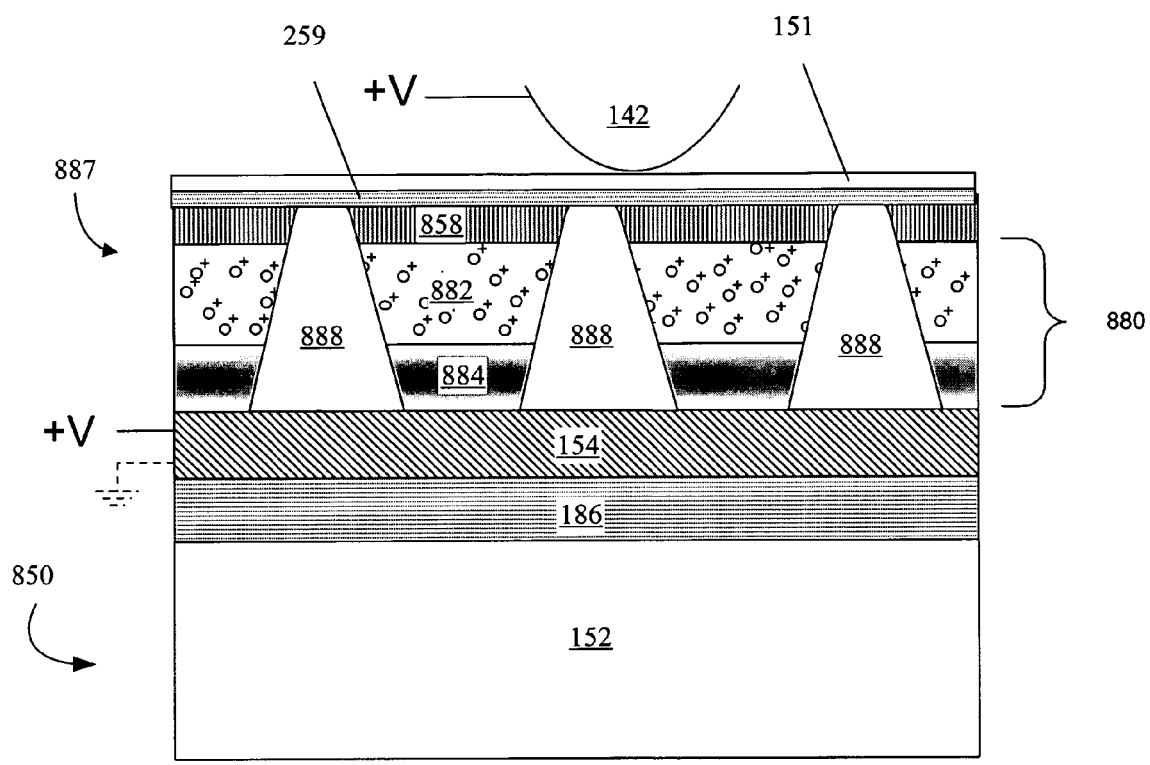
FIG. 8D is a cross-sectional view of a portion of a still further embodiment of a media device in accordance with the present invention, the isolated cells having tapered sidewalls.

As shown in FIG. 8A, the interface between the inhibiting matrix 788 and the cells 787 is a sidewall having a substantially vertical arrangement relative to the planar surface of the media device 750. Such substantially vertical walls are formed by an anisotropic etch process such as by reactive ion etching (RIE). One of ordinary skill in the art can appreciate the myriad different techniques for forming a media device 750 having approximately vertical sidewalls. However, referring to FIG. 8D it can be desirable form sidewalls having a slope less than vertical (i.e., 90 degrees) so that the cells 887 taper at the bottom electrode 154. In a preferred embodiment, the width of the cell 887 is 30 nm on the top (i.e., nearest the cell/tip interface, cell/lubricant, or cell/over-layer interface) and the stack thickness of the cell 887 is 50 nm, while the pitch between the cells 887 is roughly 50 nm. A minimum sidewall angle can be defined as an angle formed such that the recording media 856 and the under-layer 154 have sufficient electrical contact. For example, in an embodiment, the cells 887 can taper at most 16 degrees. Forming sidewalls with tapers in semiconductor structures is known in other technologies to be achievable by a number of different techniques, including NIL, reducing photoresist thickness and reducing selectivity to the insulating material.

The current through the cell 887 is focused by the shape of the cell 887. Such current focusing can increase signal contrast, increasing the robustness of multi-bit recording, for example. Further, because the cell 887 tapers near the interface of the recording media 856 and the under-layer 154, the dielectric is thicker between the portion of the cells including the recording media 856 relative to the portion of the cells including over-layer 858. A higher ratio of cross-sectional area of insulating material to cross-sectional area of recording media 856 can mean potentially lower thermal interference.

As above, patterns can be defined in the media device 750/850, in preferred embodiments, by applying nano-imprinting lithography (NIL). In other embodiments, patterns can be transferred to the media device 750/850 using some other process technique or class of process techniques, including optical lithography techniques such as extreme ultra-violet lithography (EUVL), X-ray lithography, e-beam lithography, and ion beam lithography. Though, as mentioned above, nano-scale alignment may not be required in structures and fabrication methods where NIL process techniques are employed. Where multi-bit recording is used, the density of the pattern is less relevant, and the pattern transfer technique applied can be chosen based on some factor other than feature width, such as uniformity and yield. One of skill in the art will appreciate the limitations and benefits of applying the different techniques for transferring patterns to the media device 750/850 and can appreciate the variations that can be applied to such techniques. Such variations are contemplated as being within the scope of the present invention.

In other embodiments where patterned media is employed, similarly to continuous media, the recording media can be a media other than a phase change material or a polarity-dependent memory layer. For example, the media device can be a charge storage-type media. Charge storage media stores data as trapped charges in dielectrics. Thus, for charge storage media, the media would be a dielectric material that traps charges when in a written state. Changing media back to an unwritten state simply requires the removal of the trapped charges. For instance, a positive current can be used to store charges in media. A negative current can then be used to remove the stored charges from media.

Isolating cells within an inhibiting matrix can substantially minify shunting, thereby potentially increasing a signal-to-noise ratio. A higher signal-to-noise ratio can improve the robustness of a system applying a multi-bit recording scheme for recording data. To store two bits per indicia, a minimum of four resistivity levels are required (00, 01, 10, 11). Patterning media to form cells electrically isolated from one another can provide sufficient signal-to-noise ratio to achieve four level recording in recording medias comprising GST or other phase change materials, as well as polarity-dependent memory materials.

Pattern Media Defining Servo and Timing Information

Inclusion of a patterning step can provide the benefit of enabling servo information and timing information to be pre-defined within the overall pattern. Pre-defined servo information and timing information can simplify a manufacturing process by eliminating the need to write servo and timing information to the continuous media. Including pre-defined servo information and timing information can also reduce variation in positioning of such information, simplifying a servo technique to make finding and recovering data more robust.

In an embodiment of a system and method for defining information in a patterned media in accordance with the present invention, timing information can be included in a pitch of a pattern. For example, if a region between cells is a relatively high resistance value ($R_{max}$) and the recording media are always programmed to have a lower resistance value than the region between cells (e.g., in a range such as 0.1 $R_{max}$ to 0.8 $R_{max}$) then the position of a tip over a cell can be detected by sensing that a current flowing from the tip to the recording media is above a minimum value. In an embodiment, the clock information can be twice (or some other multiple) the bit frequency so that frequency discrimination is possible for detecting the clock in combination with resistance level shifting. This provides a simple technique for self-clocking to control the writing and reading of data even where the scanning velocity jitters in time.

In an alternative embodiment, the tip current can be sensed by a comparator circuit to form a digital signal that measures as a "high" value when the tip is over a cell and measures as a "low" value when the tip is in between cells. When moving the tip relative to the media, the period of a digital signal can be measured and used as a feedback signal to control the velocity. For more accuracy, the output from several comparator circuits from multiple tips can be averaged.

A patterning step can be applied to define myriad different features corresponding to servo and timing information. Such features can be designed into the master pattern simply by eliminating cells to encode digital information. Read-only (RO) cells can be patterned in place of read/write cells. RO cells could consist of a fully conductive region forming a low resistance between the media surface and the underlay or substrate. In one embodiment, the RO cell resistance can be set to a value lower than the lowest possible indicium in a cell having recording media. The RO cell or a series of RO cells inserted in a line of data cells can be detected easily. Further the detection signal to noise ratio can be improved. Track ID information and sync marks can be included inline with the data cells to assist the servo with positioning verification and prevent errors in data writing and reading. By storing the Track ID and sync patterns in the RO cell patterns, it is possible to verify that the tip is always on a desired track and that the tip starts at the proper down track region. Several copies of the track ID and sync pattern can be spaced along the down track direction to ensure that the tip stays aligned with the cells.

An alternative embodiment of a system and method can be applied having reduced mask steps relative to methods and systems including RO cells. In such an embodiment some media cells can be programmed so that the cells are easily changeable and therefore function as "write-once" (WO) cells. For example, recording media including a polarity-dependent memory layer can be written to form very low resistances (e.g., on the order of 100 ohms with large currents of about 1 mA–normal write currents are a factor of 100 less). In such embodiments, off-track servo burst patterns can be employed to align tips and help identify down-track position. With the aid of servo tracking, specific groups of cells can be formatted by permanently writing the desired track ID and other information into the media cells. Such methods and systems can achieve improved signal-to-noise ratio and improve the efficiency of encoding sync and ID information over the technique of encoding sync and ID information by omitting data cells. Such methods can also be used to enhance the servo burst patterns by applying large write currents at a tip's initial traverse over such regions, improving read-back quality.

Figure 11A:
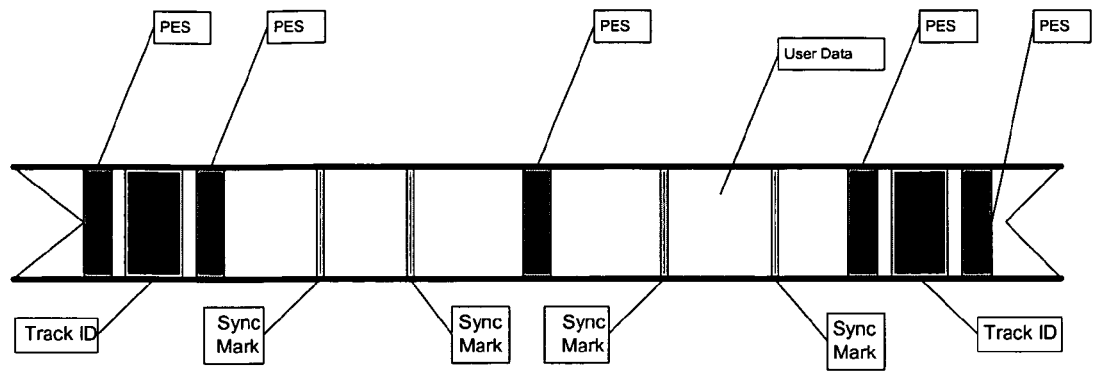
FIG. 11A is a representation of an embodiment of a sample track and servo information arrangement within the track in accordance with the present invention.

A patterning step can allow for adding special features such as, for example, framing marks, synchronization (sync) marks, track identification (ID) codes, and servo burst patterns for measuring position error signals (PES) to be either intermixed with data patterns or optionally placed in separate regions for dedicated servo use. A framing mark allows the identification of the beginning and end of a data track. A sync mark allows the identification of a region of a data track. A track ID allows identification of an individual track in a group of tracks. An embodiment of one such servo and timing information arrangement within one or more tracks is represented in FIG. 11A. The representation includes PES blocks for maintaining a tip aligned on track, sync mark blocks for timing, and track ID blocks. The servo and timing information can be arranged to achieve a desired or necessary level of processing for timing and positioning. The servo and timing information arrangement illustrated in the representation of FIG. 11A is just one of myriad different arrangements. In other embodiments, more or fewer blocks can be arranged similarly or differently to achieve a desired result. For example, where a dedicated servo structure is used in parallel with a data storage structure, a data storage structure design may be desired having fewer blocks dedicated to servo and timing information. A degree of precision in forming a plurality of tips can also influence servo and timing arrangement, making use of such information as PES blocks more or less important. Further, the arrangement is not meant to imply a necessary combination of elements. For example, a track ID block need not necessarily be preceded and succeeded by PES blocks, or a user data block need not include multiple sync mark blocks.

Figure 11B:
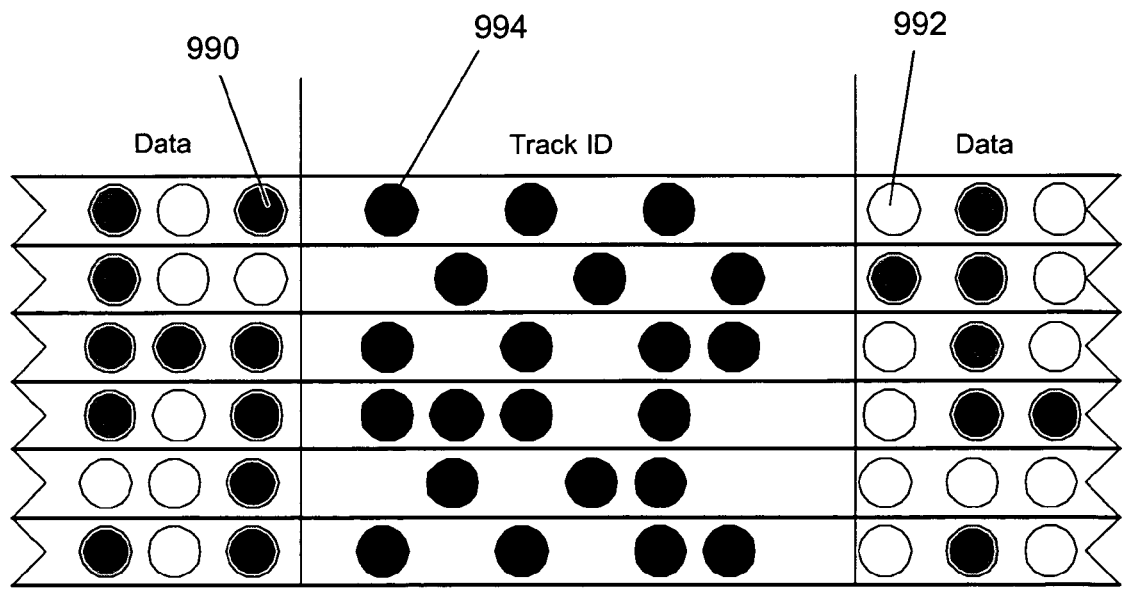
FIG. 11B is a expanded view of a track identification block from the representation of FIG. 11A across a range of tracks.

FIG. 11B is an expanded view of a track ID block arranged within a user data block across a plurality of tracks. As shown, the user data block can include two levels of information (a low resistance state 990 and a high resistance state 992); however, as described above each cell (or domain in a mixed continuous/patterned media as described below) can actually have a plurality of resistance levels or ranges of resistance states to store two or more bits in a single cell (or domain). The track ID block shown includes a pattern of low resistance cells (or domains) 994 that when read across the length of the track can be used to determine a track number. The track ID block can span as much of the available surface along a track as is necessary to satisfactorily identify a track, so that the track ID block can contain fewer or more cells (or domains) than is shown in FIG. 11B.

Figure 11C:
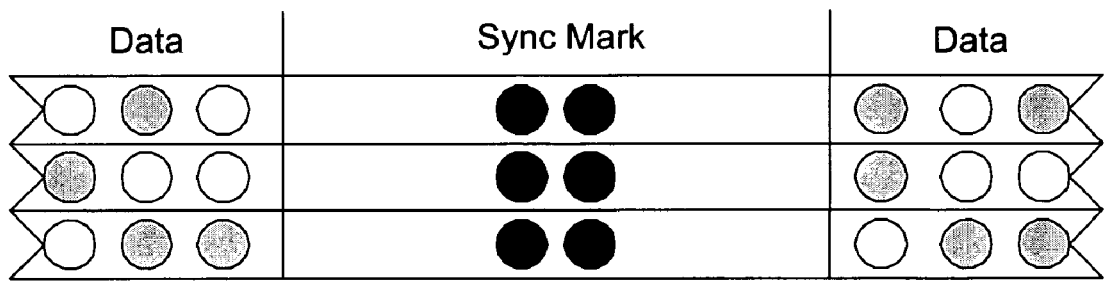
FIGS. 11C-11D are embodiments of sync mark patterns that can be used in servo information arrangement patterns such as shown in FIG. 11A.
Figure 11D:
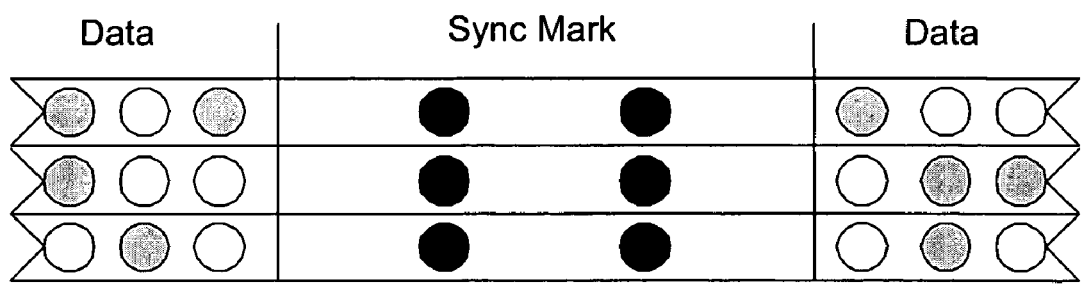

FIGS. 11C and 11D are expanded views of examples of a sync mark within a user data block across a plurality of tracks. The sync marks can arranged preferably (though not necessarily) in a uniform pattern across tracks; however, the sync marks can contain far more combinations of low resistance cells (or domains) along the track-wise length of the sync mark block than can be shown. As shown in FIG. 11D, the low resistance cells (or domains) need not be arranged adjacent to one another. The arrangement and number of low resistance cells (or domains) defining a sync mark within a sync mark block can be determined based a plurality of factors to produce a signal with preferably a high signal-to-noise ratio. Further, the length of the sync mark block can vary from the sync mark blocks shown in FIGS. 11C and 11D.

Figure 11E:
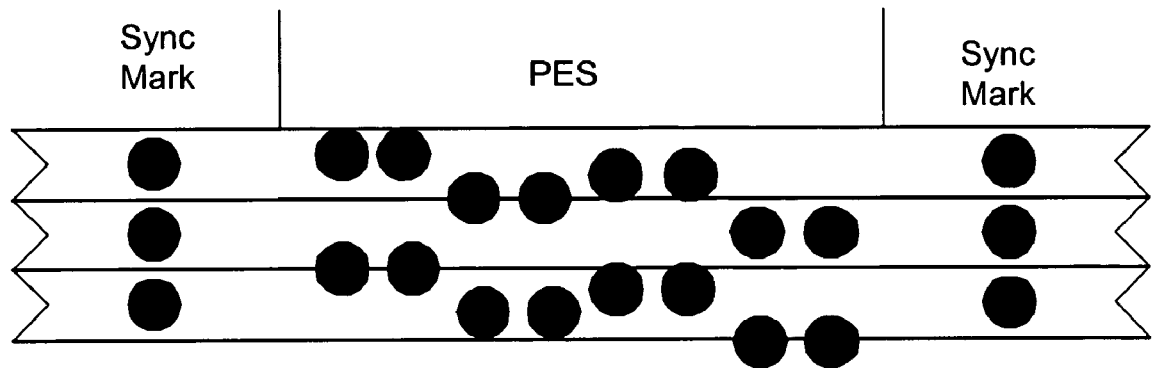
FIGS. 11E-11F are embodiments of position error signal (PES) schemes that can be employed in servo information arrangement patterns such as shown in FIG. 11A.

A servo system can include across track position sensing mechanism to maintain tips centered on a track (and therefore on the cells or domains). A common method of providing servo position information in the disk drive industry is to insert A-B-C-D bursts of servo patterns every N data bits to allow demodulation of a servo position error signal (PES). These methods require placing groups of marks at different off-track distances from the data track. When the tip passes though these regions the relative amplitudes or timing information can be demodulated to form a signal that is proportional to the off-track distance. In the absence of patterned media, these marks must be written into the media using a servo writer or self servo writing methods. Often this requires additional position sensors to place the marks and can add to the complexity of the storage device. FIG. 11E is an expanded view of one such PES burst arrangement having low resistance cells (or domains) corresponding to A-B-C-D bursts, each burst in the arrangement being represented by two low resistance cells (or domains) adjacent to one another along the track.

Figure 11F:
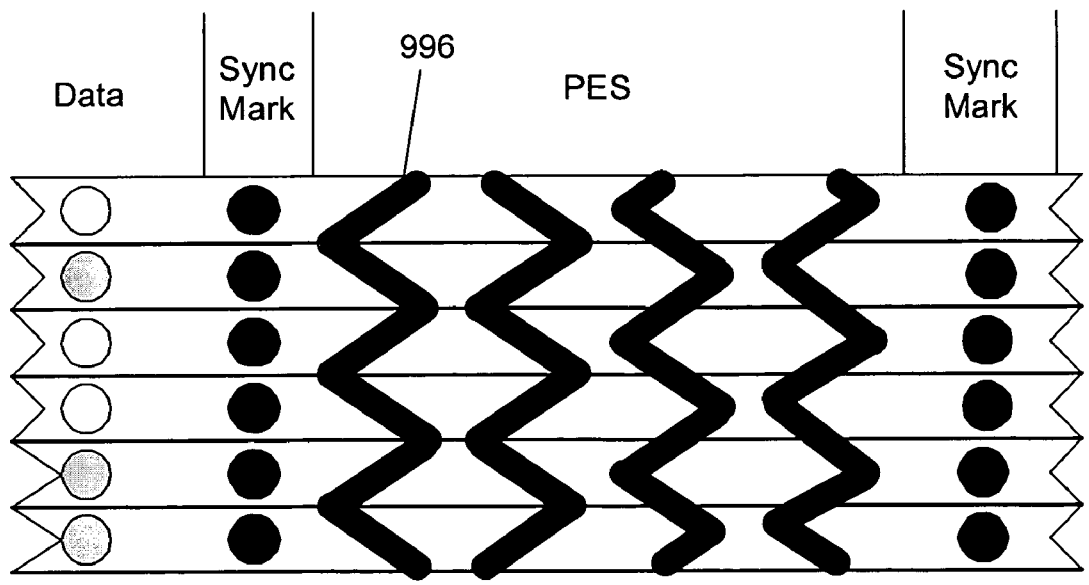

An alternative embodiment of an across track position sensing mechanism to maintain tips centered on cells is illustrated in FIG. 11F. Patterning of the media can enable the definition of lines of low, varying, or varied resistance. In the servo arrangement of FIG. 11F includes four PES lines 996 arranged in a zig-zag pattern, a first and second line (from left to right on the page) being patterned inverse to one another and a third and fourth line being patterned inverse to one another and out of phase relative to the first and second line. A tip traversing a track can encounter the sync mark and detect the timing between the sync mark and the lines (which varies across the track as the line zig-zags) to determine where along the lines the tip is positioned, and thus where across the track(s). The PES arrangements of FIGS. 11E and 11F are merely examples, and upon illumination by these teachings, one of ordinary skill in the art will appreciate the myriad different arrangements of PES cells (or domains), lines or other features to identify fine positioning of a tip across one or more tracks that can be employed in embodiments of systems and methods in accordance with the present invention.

Still further, isolating cells within an inhibiting matrix can reduce jitter noise, because each transition between bits is predefined, reducing the propagation of error that occurs between writing and reading due to vibration and movement of the tip. The noise and variability of a pre-defined pattern can be notably smaller than the noise and variability attributable to the mechanics of the tip.

Partially Patterned Media

In still further embodiments, it may be desired that a patterning step be included to define servo information and timing information, while providing a continuous media for storing data, thereby eliminating the need to write servo and timing information to the continuous media, while allowing a maximum density of the data storage to be limited by the continuous media.

As above, servo and timing patterns can be defined in the media device, in preferred embodiments, by applying nano-imprinting lithography (NIL), or alternatively using some other process technique or class of process techniques, including optical lithography techniques such as extreme ultra-violet lithography (EUVL), X-ray lithography, e-beam lithography, and ion beam lithography. A technique can be chosen based on a trade-off of benefits between storage density and the cost and robustness of the pattern transfer technique. One of skill in the art will appreciate the limitations and benefits of applying the different techniques for transferring servo and timing patterns to the media device and can appreciate the variations that can be applied to such techniques. Such variations are contemplated as being within the scope of the present invention.

In such embodiments including a hybrid solution of patterned servo and timing information and continuous media, the recording media can be a phase change material or a polarity-dependent memory layer, as described above, or alternatively some other media such as a charge storage-type media.

As above, in an embodiment of a system and method for defining information in a patterned media in accordance with the present invention, timing information can be included in a pitch of a pattern. For example, if a region between cells is a relatively high resistance value ($R_{max}$) and the recording media are always programmed to be lower than the region between cells (e.g., in a range such as 0.1 $R_{max}$ to 0.8 $R_{max}$) then the position of a tip over a cell can be detected by sensing that a current flowing from the tip to the recording media is above a minimum value. This provides a simple technique for self-clocking to control the writing and reading of data even where the scanning velocity jitters in time.

In an alternative embodiment, the tip current can be sensed by a comparator circuit to form a digital signal that measures as a "high" value when the tip is over a cell and measures as a "low" value when the tip is in between cells. When moving the tip relative to the media, the period of a digital signal can be measured and used as a feedback signal to control the velocity. For more accuracy, the output from several comparator circuits from multiple tips can be averaged.

Read only (RO) cells can also be patterned in place of read/write cells. Read only cells could consist of a fully conductive region forming a low resistance between the media surface and the underlay or substrate. In one embodiment, the RO cell resistance can be set to a value lower than the lowest possible indicium in a cell having recording media. The RO cell or a series of RO cells inserted in a line of data cells can be detected easily. Further the detection signal to noise ratio can be improved. Track ID information and sync marks can be included inline with the data cells to assist the servo with positioning verification and prevent errors in data writing and reading. By storing the Track ID and sync patterns in the RO cell patterns, it is possible to verify that the tip is always on a desired track and that the tip starts at the proper down track region. Several copies of the track ID and sync pattern can be spaced along the down track direction to ensure that the tip stays aligned with the cells.

As above, an alternative embodiment of a system and method can be applied having reduced mask steps relative to methods and systems including RO cells. In such an embodiment some media cells can be programmed so that the cells are easily changeable and therefore function as "write-once" (WO) cells. For example, recording media including a polarity-dependent memory layer can be written to form very low resistances (e.g., on the order of 100 ohms with large currents of about 1 mA–normal write currents are a factor of 100 less). In such embodiments, off-track servo burst patterns can be employed to align tips and help identify down-track position. With the aid of servo tracking, specific groups of cells can be formatted by permanently writing the desired track ID and other information into the media cells. Such methods and systems can achieve improved signal-to-noise ratio and improve the efficiency of encoding sync and ID information over the technique of encoding sync and ID information by omitting data cells. Such methods can also be used to enhance the servo burst patterns by applying large write currents at a tip's initial traverse over such regions, improving read-back quality.

As above, a patterning step can allow for adding special features such as, for example, framing marks, sync marks, track identification codes (track ID), and servo burst patterns to be either intermixed with the data patterns or optionally placed in separate regions for dedicated servo use. A framing mark allows the identification of the beginning and end of a data track. A sync mark allows the identification of a region of a data track. A track ID allows identification of an individual track in a group of tracks. All of these patterns can be designed into the master pattern simply by eliminating cells to encode digital information.

Referring back to FIG. 11A, in such embodiments where a hybrid solution of patterned servo and timing information and continuous media are employed, the user data blocks can comprise a continuous media; therefore, few or no cells are defined within the user data blocks. Rather, domains are defined across the user data block. Use of a continuous media can allow for increased densities of user data, at least along the length of the track in the direction of traverse, though not necessarily across the width of the track.

Forming Metal Cantilevered Tips

Figure 9A:
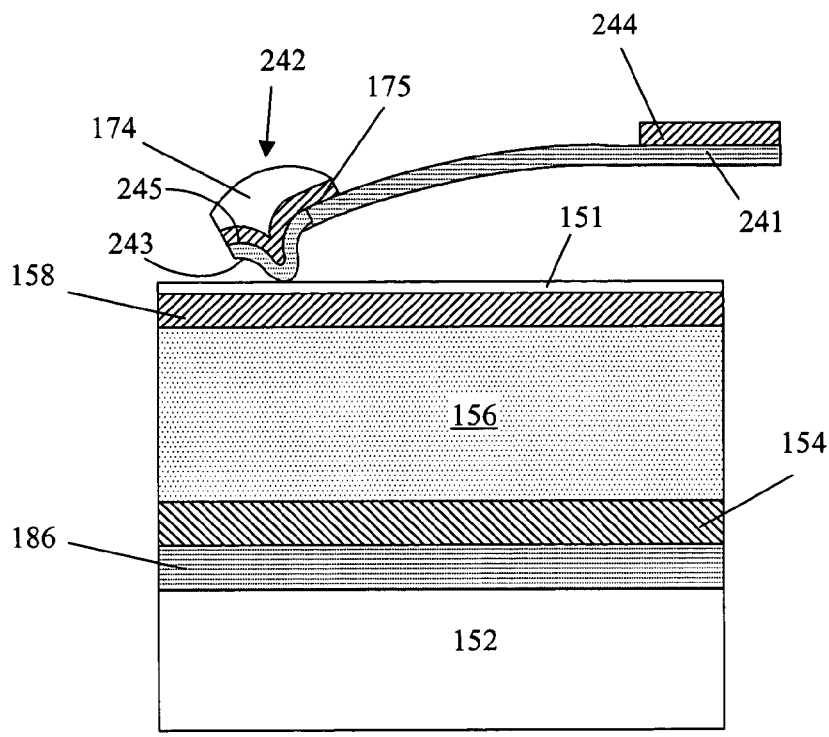
FIG. 9A is a cross-sectional view of a portion of an embodiment of a system in accordance with the present invention.
Figure 9B:
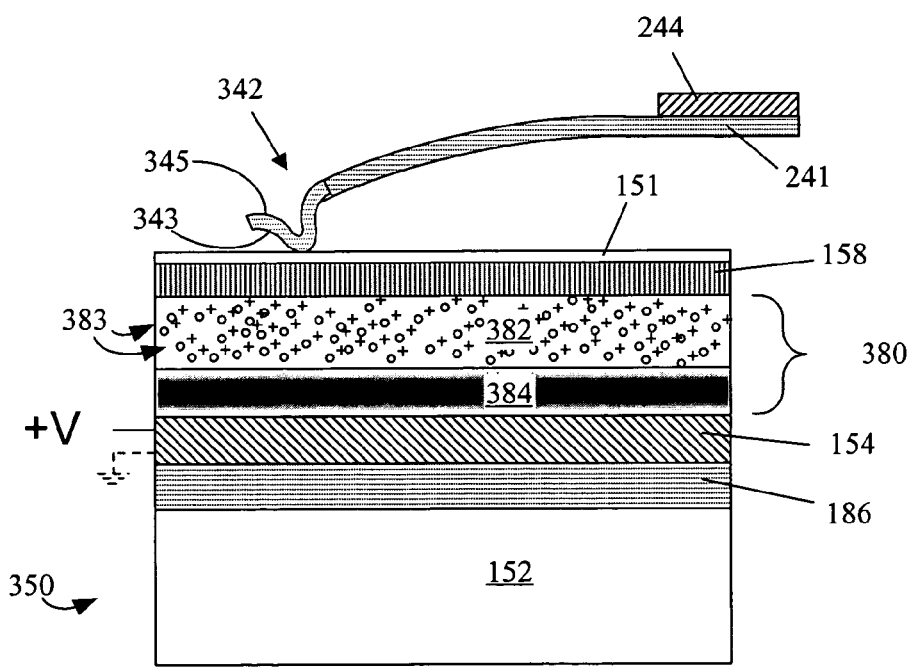
FIG. 9B is a cross-sectional view of a portion of an alternative embodiment of a system in accordance with the present invention.

Embodiments of cantilevered tips and methods of forming such cantilevered tips for use with systems and methods in accordance with the present invention are shown in FIGS. 9A and 9B. Such embodiments of tips 242/342 can be self-deployable and can include contact surfaces 243/343 comprising a conductive metal or metal alloy. The tips 242/342 are operably associated with a platform 244 by a cantilever 241, and are biased such that the tips 242/342 are urged against the media surface (e.g., a lubricant 151 on the surface). The biased cantilever 241 is connected at a proximal end and disconnected at a distal end associated with the tip 242/342 so that the tip 242/342 can move in the vertical plane relative to the platform 244 while remaining in electrical communication with the media device 150/350.

Referring to FIG. 9A, an embodiment of a tip 242—referred to herein as a "reinforced" tip 242—is shown in electrical communication with a media device 150 such as shown in FIG. 1A through 1C, having a recording media 156 comprising a phase change material (e.g., GST). The tip 242 is connected with a tip platform 244 by a cantilever 241 comprising a material capable of having a stress gradient applied such that the cantilever 241 forms a leaf spring capable of applying a bias against a surface of the media device 150. The tip 242 includes a contact surface 243. The electrically conductive layer forming the contact surface 243 is electrically conductive and preferably comprises a layer of metal, such as platinum, iridium, alloys of such metals, or some other metal or metal alloy. The contact surface 243 has a thickness ranging, in embodiments, approximately between 10 nm and 200 nm. A posterior surface 245 of the tip 242 behind the contact surface 243 (relative to the tip-media surface interface) can have an indented shape, the indentation within the posterior surface 245 being approximately the shape of the contact surface 243. A portion of silicon 174 or other reinforcing material is disposed over the posterior surface 245 to further provide mechanical strength to the tip 242, resisting deformation and bending of the tip 242 due to the forces present at the tip-media surface interface. A layer of insulating dielectric 175, for example silicon dioxide, is shown disposed between the silicon and the posterior surface 245. The reliability of such a reinforced tip 242 is significantly high, resisting wear and damage during use.

The cantilever 241 operably connecting the reinforced tip 242 with a tip platform 244 can comprise myriad different metals and metal alloys. For example, the cantilever 241 can comprise nickel, chrome, molybdenum, some other metals and alloys. A cantilever material should be chosen having high yield strength, good electrical conductivity, and compatibility with coincident processing steps applied during manufacturing of the reinforced tips 242 and tip platforms 244 (and associated structures). The cantilever can have a thickness ranging, in embodiments, approximately between 100 nm and 1000 nm, and preferably between 250 nm and 500 nm.

FIG. 9A shows the reinforced tip 242 positioned so that the reinforced tip 242 contacts the surface of the media device 150. The reinforced tip 242 and media device 150 comprise a portion of an embodiment of a system in accordance with the present invention. However, in other embodiments the system can comprise the reinforced tip 242 operably associated with some other media device, such as a patterned media device having a recording media comprising GST, or a recording media comprising a patterned or unpatterned polarity-dependent memory layer. A plurality of media devices have been described herein, and myriad other media devices can result from such teachings. All such media devices are intended to be within the scope of embodiments of systems and methods of the present invention. Such systems and methods are likewise not intended to be limited to the specific geometries and structure shown in FIG. 9A, as variations will be obvious to one of skill in the art upon understanding the teachings contained herein.

Referring to FIG. 9B, an alternative embodiment of a tip 342—referred to herein as a "hollow" tip 342—is shown in electrical communication with a media device 350 such as shown in FIGS. 5A through 5C, having a recording media 380 comprising a polarity-dependent memory layer. As above, the tip 342 is connected with a tip platform 244 by a cantilever 241 comprising a material capable of having a stress gradient applied such that the cantilever 241 forms a leaf spring capable of apply a bias against a surface. The tip 342 includes a contact surface 343. The contact surface 343 is electrically conductive and preferably comprises a layer of metal, such as platinum, iridium, alloys of such metals, or some other metal or metal alloy. A posterior surface 345 of the tip 342 can have an indented shape, the indentation within the posterior surface 345 being approximately the shape of the contact surface 343. However, the tip 342 does not have a silicon portion 174 reinforcing the contact surface 343, and as such the posterior surface 345 can be considered "hollow" when compared with the posterior surface 243 of the tip 242 of FIG. 9A. The electrically conductive layer forming the contact surface 343 has a thickness ranging, in embodiments, approximately between 10 nm and 200 nm. The hollow tip 342 has significantly lower mass than the reinforced tip 242. A tip having lower mass can have a higher resonance with the media device, and as such can operate at a higher speed. Increased speed can provide higher data transfer rate and an advantage where short access time is desired.

The cantilever 241 operably connecting the hollow tip 342 with a tip platform 244 can comprise myriad different metals and metal alloys. For example, the cantilever 241 can comprise nickel, chrome, molybdenum, some other metals and alloys. A material should be should be chosen having high yield strength, good electrical conductivity, and compatibility with coincident processing steps applied during manufacturing of the hollow tips 342 and tip platforms 244 (and associated structures). The cantilever can have a thickness ranging, in embodiments, approximately between 100 nm and 1000 nm, and preferably between 250 nm and 500 nm.

FIG. 9B shows the hollow tip 342 positioned so that the hollow tip 342 contacts the surface of the media device 350. The hollow tip 342 and media device 350 comprise a portion of an embodiment of a system in accordance with the present invention. However, in other embodiments the system can comprise the hollow tip 342 operably associated with some other media device, such as a patterned media device having a recording media comprising polarity-dependent material layer, or a recording media comprising patterned or unpatterned GST. A plurality of media devices have been described herein, and myriad other media devices can result from such teachings. All such media devices are intended to be within the scope of embodiments of systems and methods of the present invention. Such systems and methods are likewise not intended to be limited to the specific geometries and structure shown in FIG. 9A, as variations will be obvious to one of skill in the art upon understanding the teachings contained herein.

Figure 10A:
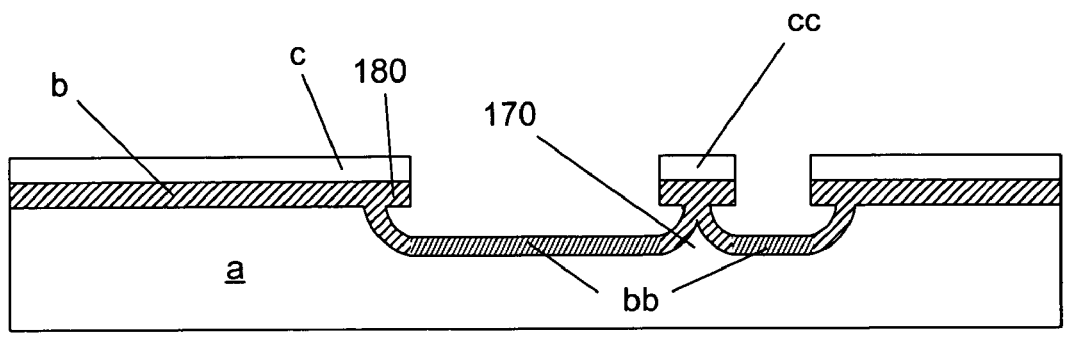
FIGS. 10A-10F illustrates a series of film stacks arranged in progressive processing order for forming an embodiment of a tip for use with media in accordance with the present invention.

Tips 242/342 such as those described above can be formed by a number of manufacturing steps applying conventional semi-conductor process techniques. For example, an embodiment of a method of forming a tip 242 such as shown in FIG. 9A is illustrated in the stack diagrams of FIGS. 10A-10F, which show an example of a series of process steps for forming the structure shown in FIG. 9A. The method can include growing a layer of thermal oxide b over a silicon substrate a. The thermal oxide b can be grown, for example in a diffusion process, using well-known diffusion process techniques. A material having high selectivity relative to thermal oxide (such as silicon nitride) can be deposited over the thermal oxide b to form a hardmask layer c. A pattern can be defined within the hardmask c using well-known photolithography techniques. The pattern can define the masked tip area surrounded by an unmasked cavity area, and the wafer can be isotropically etched so that a nascent tip structure 170 surrounded by a shallow cavity is formed. A second layer bb of thermal oxide is grown, consuming additional silicon that help form a structure 170 defining the sharp tip, and forming a film stack as shown in FIG. 10A.

An oxide etch removes the second layer bb of thermal oxide and causes the hard mask c positioned over the tip structure 170 to fall off, leaving a silicon tip. During this oxide etching step, the oxide layer is undercut under the hard mask layer c, removing the hanging portion of the oxide layer. In some cases additional thermal oxidation and oxide etching steps can be applied in order to adjust the height of the silicon tip and/or the radius of curvature of the silicon tip.

Figure 10B:
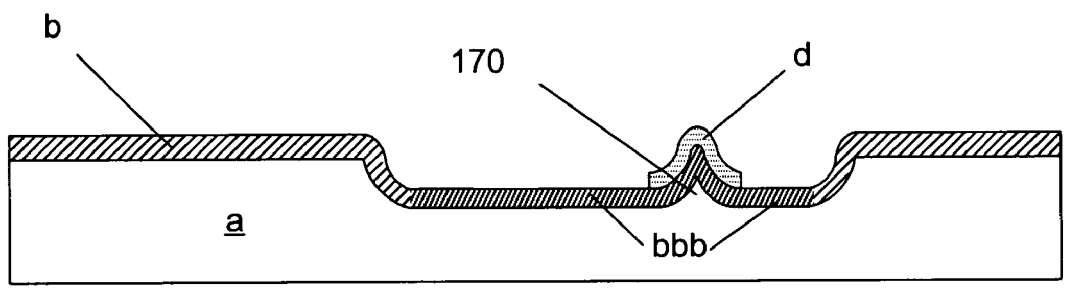
Figure 10C:
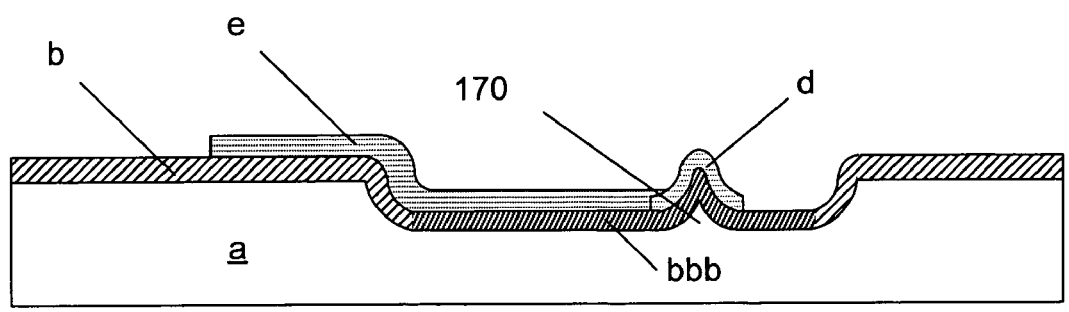
Figure 10D:
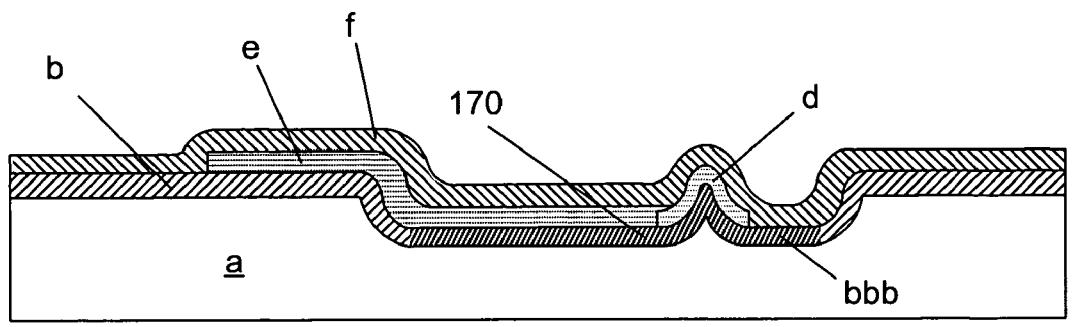

Referring to FIG. 10B, a third layer bbb of thermal oxide can be grown. At the next step the hard mask c is removed from the wafer using selective etching, which does not affect silicon dioxide and therefore does not change the shape of the sharp tip. For example, a silicon nitride hard mask can be removed in phosphoric acid which etches neither silicon dioxide nor silicon, leaving the thermal oxide layers b/bbb over the tip structure 170. A first layer d of metal can be deposited, for example by sputtering. This first layer d covers the tip area, and is also referred to herein as "tip metal." Thickness of the tip metal d is chosen to provide a required radius of curvature of the contact surface 243 of the tip 242. The tip metal d has high electrical conductivity, is wear resistant and chemically inert. Platinum, iridium, refractory metals, and combination of these metals can be used in a tip metal material. The tip metal d can include an adhesion layer in order to provide strong mechanical connection to the underlayer bbb of thermal oxide. The tip metal d can be etched to form the contact surface 243 of the tip 242. Alternatively, a lift-off process also can be used for patterning of the tip metal d. Referring to FIG. 10C, a second layer e of metal (also referred to herein as the cantilever metal) can be deposited over the stack and etched to form the cantilever pattern. Preferably, the cantilever pattern is formed inside the shallow cavity area 180. In this case the cantilever does not have steps after release. The cantilever metal e overlaps with the tip metal d. As shown in FIG. 10D, once the cantilever pattern is defined, a dielectric layer f (also referred to herein as a stabilization film) is deposited on top of the cantilever pattern. The dielectric is preferably silicon dioxide or silicon nitride deposited by plasma enhanced chemical vapor deposition (PECVD) at an elevated temperature (typically 350-400 degrees C.).

Exposure of the cantilever metal e to the dielectric deposition process provides several benefits. First, an elevated temperature during dielectric deposition process causes inter-diffusion of metal atoms between the tip metal d and the cantilever metal e, providing good mechanical and electrical connection between the tip metal d and cantilever metal e. Second, exposure of the cantilever metal e to an elevated temperature during dielectric deposition and subsequent cooling down causes significant stresses at the interface between the cantilever metal e and the thermal oxide b/bbb and between the cantilever metal e and the deposited dielectric layer f. These stresses have a thermo-mechanical nature and occur because of a difference in thermal expansion coefficients between the cantilever metal e and the thermal oxide b/bbb and the deposited dielectric layer f. A magnitude of the thermo-mechanical stress is high enough to overcome or significantly change the stress gradient in the cantilever metal e created by the deposition process. The thermo-mechanical stress in the cantilever metal e created during the dielectric deposition process is very repeatable, because it is determined by the temperature difference between ambient temperature and elevated temperature used during the deposition process. Therefore, deposition of dielectric layer allows stabilization of the cantilever metal e parameters and decreases the effect of stress gradient variation in the cantilever metal e as deposited due to technological process variations. Third, as can be seen from FIG. 10D, a bottom portion of the cantilever metal e is in mechanical contact with the bulk of the wafer and the top layer of the cantilever metal e contacts a relatively thin layer of deposited dielectric f. Therefore, the top and the bottom portions of the cantilever metal e are exposed to different conditions and it can be expected that there will be larger thermo-mechanical deformation of the bottom portion of the cantilever metal e than deformation of the top portion of the cantilever metal e. This creates a reproducible stress gradient in the cantilever metal e which can be used to obtain a desired out of plane initial bending of the cantilever after release. In other embodiments, alternative methods of creating a desired stress gradient in the cantilever metal e and enforcing good mechanical and electrical connections between the tip metal d and the cantilever metal e can be used. Such methods can be used, either together with the described process step of dielectric deposition or in substitution of the dielectric deposition step. Annealing at an elevated temperature in a specified atmosphere, for example, in an inert atmosphere of argon or nitrogen is an example of such an alternative method. One of ordinary skill in the art will appreciate the different methods known in the art for forming such a stress gradient.

Figure 10E:
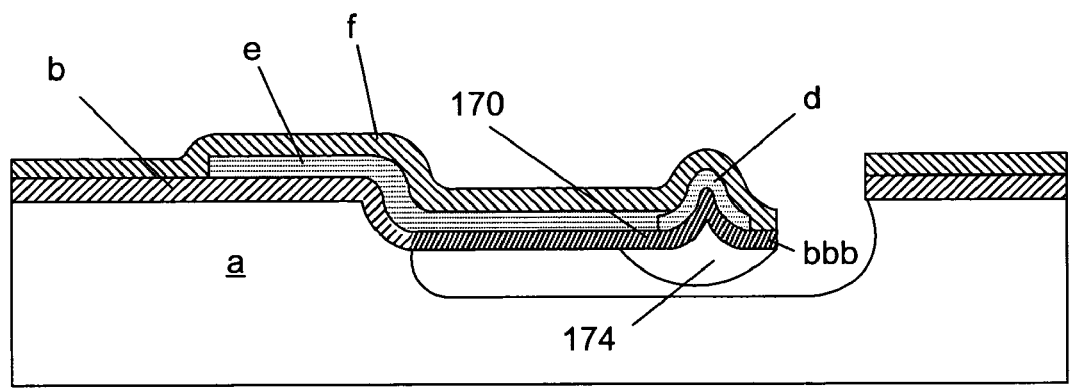
Figure 10F:
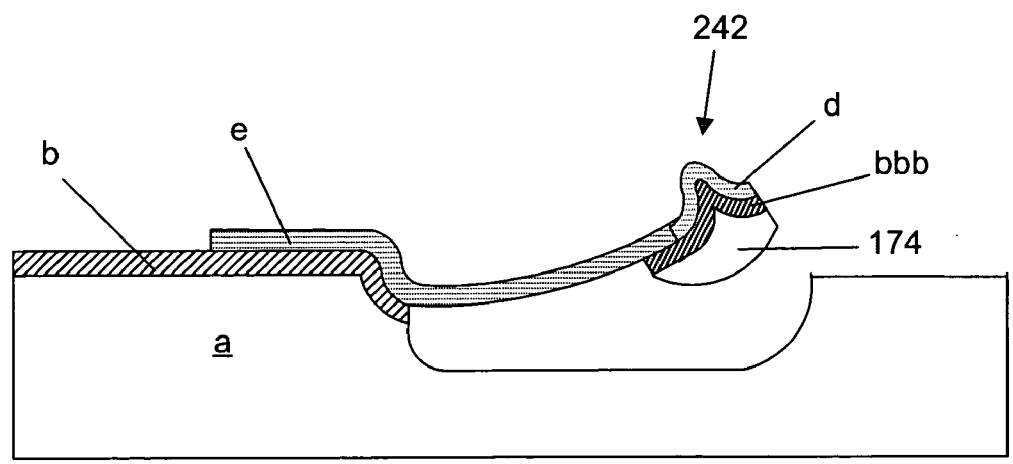

The wafer can be patterned and etched to remove a portion of the deposited oxide layer f and the thermal oxide layer bbb around the cantilever and the tip structure. Referring to FIG. 10E, etching of dielectric layers f and bbb is followed by silicon etching. Preferably, silicon etching contains two steps. The first step creates a trench around the cantilever and the tip, and the second step undercuts and releases the cantilever. Reactive ion etching (RIE) is preferably used in the first step. Wet anisotropic etching of silicon is preferably used in the second step. (For example, aqueous solutions of potassium hydroxide can be used at the second step.) The deposited oxide layer f can serve as a mask during the second step to protect the cantilever metal e and the tip metal d. Wet anisotropic etching can provide better control of the undercut and, therefore, better control of cantilever length and bending. Alternatively, isotropic etching of silicon can be used at the second step. Preferably, the same pattern defined for dielectric etching is used also in the first step and in the second step.

Depending on the mask layout used for silicon etching, the resulting structure can have a piece of silicon 174 under the tip 170 as shown in FIG. 10E or have a hollow tip as described above and shown in FIG. 9B. A known in the art technique utilizing corner compensation structures can be used to preserve a piece of silicon 174 and a portion of thermal oxide bbb under the tip 170 at the end of etching.

The final step in the cantilever/tip fabrication process is wet etching of dielectric layers. It is used to remove the exposed thermal oxide bbb from the underside of the cantilever 241 and the deposited oxide f, releasing the cantilever 241 which when released is urged by the stress gradient to form an approximately arcuate shape, like a leaf spring. Further, removing the deposited oxide f exposes the contact surface d of the tip 242.

Figure 10G:
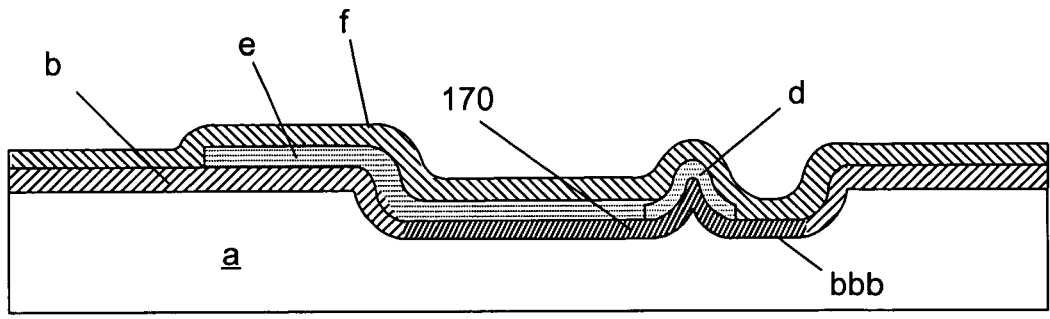
FIGS. 10G-10I illustrates a series of film stacks arranged in progressive processing order for forming an alternative embodiment of a tip for use with media in accordance with the present invention.
Figure 10H:
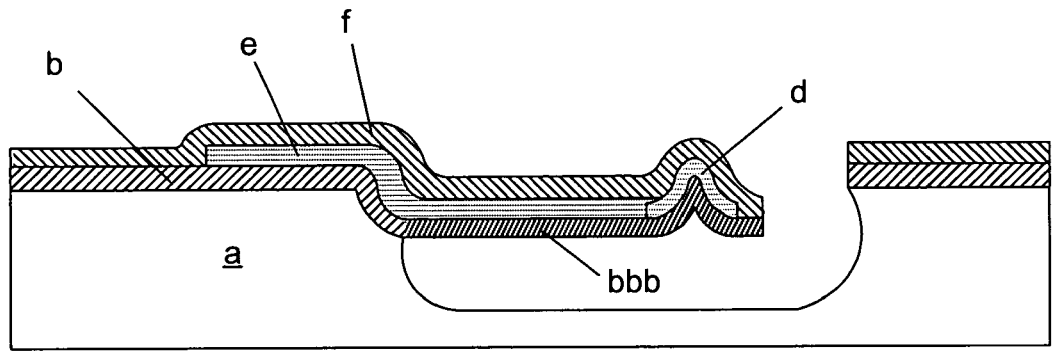
Figure 10I:
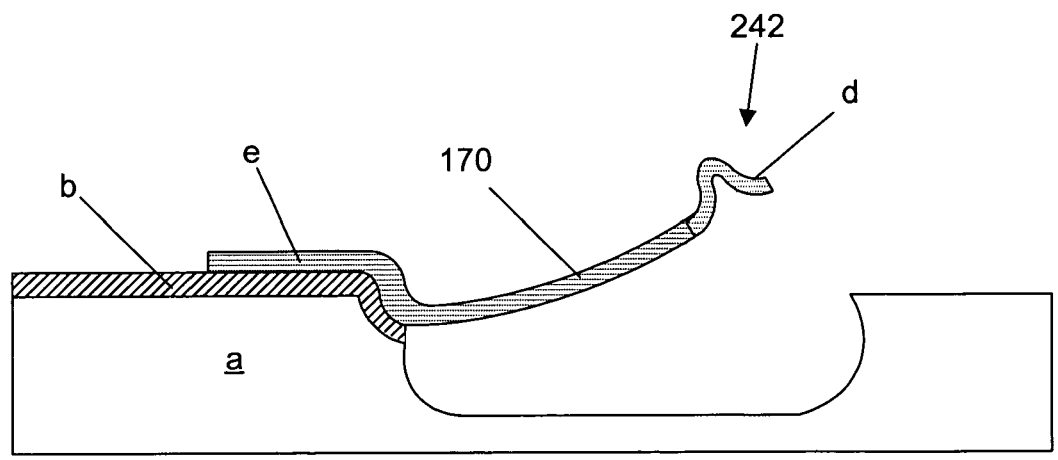

Alternatively, an embodiment of a method of forming a tip 342 such as shown in FIG. 9B is illustrated in the stack diagrams of FIGS. 10G-10I, which show an example of a series of process steps for forming the structure shown in FIG. 9B. Once the second layer of metal e has been deposited and etched, as described above with regards to FIGS. 10A-10C, a layer of deposition oxide f, for example such as PECVD oxide, can be formed over the film stack such that a stress gradient is formed across the cantilever structure. The wafer can be patterned and etched to remove a portion of the deposited oxide layer f and the thermal oxide layer bbb around the cantilever and the tip structure. Referring to FIG. 10H, wet anisotropic etching of silicon can be used to undercut the cantilever 241. Alternatively, an isotropic etch can then be performed to undercut and define the tip 342 and the cantilever 241. The film stack can be etched such that all of the silicon is removed from behind the contact surface 243 of the tip 342. Referring to FIG. 10I, an isotropic etch can then be performed to remove the deposited oxide f and the exposed thermal oxide bbb under the tip 342 and cantilever 241. The resulting structure has a hollow tip 343 at the end of the cantilever 241 which when released is urged by the stress gradient to form an approximately arcuate shape, like a leaf spring. Further, removing the deposited oxide f exposes the contact surface d of the tip 342. The tip 342 is a hollow structure as shown in FIG. 9B.

While process steps have been described with some level of specificity in providing detailed descriptions of FIGS. 10A-10F, one of skill in the art will appreciate that multiple different variations in the process steps illustrated and described will become apparent to those skilled persons after reviewing the present teachings. The scope of the present invention is therefore not intended to be limited to those process steps, those film stacks, and those structures described coincident with the descriptions of particular embodiments of methods for forming tip structures as described above and shown in FIGS. 9A and 9B.

The foregoing description of the present invention have been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A system comprising:
   a media including:
   a substrate,
   an inhibiting matrix formed over the substrate, and
   a plurality of cells disposed within the inhibiting matrix,
   wherein at least one of the cells includes a recording media, and
   wherein a sidewall profile of the at least one cell tapers such that a width of a portion of the cell closest to the substrate is narrower than a width of a portion of the cell farthest from the substrate; and
   a tip electrically connectable with the media;
   wherein when the tip is positioned over the at least one cell and a voltage potential is applied to the tip, an indicium is formed in the recording media.

2. The system of claim 1, wherein the recording media is a phase change material.

3. The system of claim 1, wherein the recording media comprises a solid electrolyte layer and an ion source layer arranged between the solid electrolyte layer and the substrate.

4. The system of claim 3, wherein when a write voltage potential is applied across the recording media, a conductive structure forms in the solid electrolyte layer.

5. A system comprising:
   a media;
   a tip electrically connectable with the media;
   wherein the media includes:
   an underlayer,
   an inhibiting matrix between the underlayer and the tip, and
   a plurality of cells disposed within the inhibiting matrix,
   wherein at least one of the cells includes a recording media, and
   wherein the at least one cell is wider near the tip and narrower near the underlayer;
   wherein when the tip is positioned over the at least one cell and a voltage potential is applied to the tip, an indicium is formed in the recording media.

6. The system of claim 5, wherein the recording media is a phase change material.

7. The system of claim 5, wherein the recording media comprises a solid electrolyte layer and an ion source layer arranged between the solid electrolyte layer and the underlayer.

8. The system of claim 7, wherein when a write voltage potential is applied between the underlayer and the tip, a conductive structure forms in the solid electrolyte layer which conductive structure electrically bridges the underlayer and the tip.

9. A system comprising:
   a media including:
   a substrate,
   an electrically insulating layer formed over the substrate, and
   a plurality of cells disposed within the electrically insulating layer,
   wherein at least one of the cells includes phase change material, and
   wherein a sidewall profile of the at least one cell tapers such that a width of a portion of the cell closest to the substrate is narrower than a width of a portion of the cell farthest from the substrate; and
   a tip electrically connectable with the media;
   wherein when the tip is positioned over the at least one cell and a voltage potential is applied to the tip, a current is drawn through the at least one cell such that at least a portion of the phase change material is heated to a threshold temperature.

* * * * *